(12) United States Patent
Sackmann et al.

(10) Patent No.: US 12,467,031 B2
(45) Date of Patent: Nov. 11, 2025

(54) LASER-ASSISTED REPOSITIONING OF A MICRO-OBJECT AND CULTURING OF AN ATTACHMENT-DEPENDENT CELL IN A MICROFLUIDIC ENVIRONMENT

(71) Applicant: Bruker Cellular Analysis, Inc., Emeryville, CA (US)

(72) Inventors: Eric K. Sackmann, Oakland, CA (US); Nathan J. Ver Heul, Oakland, CA (US); Ryan M. Cooper, Oakland, CA (US); Alexander J. Mastroianni, Alameda, CA (US); Annamaria Mocciaro, San Francisco, CA (US); Vincent Haw Tien Pai, Berkeley, CA (US); Randall D. Lowe, Jr., Emeryville, CA (US); Hector D. Neira-Quintero, Emeryville, CA (US); Patrick N. Ingram, Emeryville, CA (US); Smriti Sridhar, Emeryville, CA (US)

(73) Assignee: BRUKER CELLULAR ANALYSIS, INC., Emeryville, CA (US)

( * ) Notice: Subject to any disclaimer, the term of this patent is extended or adjusted under 35 U.S.C. 154(b) by 1105 days.

(21) Appl. No.: 17/401,783

(22) Filed: Aug. 13, 2021

(65) Prior Publication Data
US 2022/0033758 A1 Feb. 3, 2022

Related U.S. Application Data

(63) Continuation of application No. PCT/US2020/018388, filed on Feb. 14, 2020.
(Continued)

(51) Int. Cl.
*C12M 1/00* (2006.01)
*C12M 1/34* (2006.01)
(Continued)

(52) U.S. Cl.
CPC ............ *C12M 41/36* (2013.01); *C12M 23/16* (2013.01); *C12M 23/20* (2013.01); *C12M 23/22* (2013.01); *C12N 1/04* (2013.01); *C12N 2529/10* (2013.01)

(58) Field of Classification Search
CPC ..... B01L 2200/0668; B01L 2200/0673; B01L 2300/0864; B01L 2400/0454;
(Continued)

(56) References Cited

U.S. PATENT DOCUMENTS

| 6,294,063 B1 | 9/2001 | Becker et al. |
| 6,379,929 B1 | 4/2002 | Burns et al. |

(Continued)

FOREIGN PATENT DOCUMENTS

| CN | 101275114 A | 10/2008 |
| CN | 102181361 A | 9/2011 |

(Continued)

OTHER PUBLICATIONS

Chen et al.; Thermally-actuated, phase change flow control for microfluidic systems; Lab on a Chip; 5(11); pp. 1277-1285; Aug. 2005.

(Continued)

*Primary Examiner* — Lydia Edwards
(74) *Attorney, Agent, or Firm* — Shay Glenn LLP

(57) ABSTRACT

Methods for laser-assisted repositioning of a micro-object and for culturing an attachment-dependent biological cell within a microfluidic device are described herein. Laser illumination is used to controllably create a bubble which repositions the micro-object. Further, methods of culturing an attachment-dependent biological cell are described, where the methods may include laser-assisted repositioning.

25 Claims, 27 Drawing Sheets

Specification includes a Sequence Listing.

Related U.S. Application Data

(60) Provisional application No. 62/806,612, filed on Feb. 15, 2019.

(51) Int. Cl.
  *C12M 3/06* (2006.01)
  *C12N 1/04* (2006.01)

(58) Field of Classification Search
  CPC . B01L 3/502761; C12M 23/16; C12M 23/20; C12M 23/22; C12M 31/02; C12M 33/00; C12M 41/36
  See application file for complete search history.

(56) References Cited

U.S. PATENT DOCUMENTS

| | | |
|---|---|---|
| 6,408,878 B2 | 6/2002 | Unger et al. |
| 6,942,776 B2 | 9/2005 | Medoro |
| 6,958,132 B2 | 10/2005 | Chiou et al. |
| 7,090,759 B1 | 8/2006 | Seul |
| 7,699,969 B2 | 4/2010 | Manaresi et al. |
| 7,956,339 B2 | 6/2011 | Ohta et al. |
| 8,037,903 B2 | 10/2011 | Wang et al. |
| 8,581,167 B2 | 11/2013 | Lean et al. |
| 8,685,344 B2 | 4/2014 | Sudarsan et al. |
| 8,921,055 B2 | 12/2014 | Chapmen |
| 9,144,806 B2 | 9/2015 | Chen et al. |
| 9,403,172 B2 | 8/2016 | Short et al. |
| 10,058,865 B2 | 8/2018 | Breinlinger et al. |
| 10,690,628 B2 | 6/2020 | Chapman et al. |
| 10,723,988 B2 | 7/2020 | Lowe et al. |
| 10,799,865 B2 | 10/2020 | Lowe et al. |
| 11,007,520 B2 | 5/2021 | Lowe et al. |
| 2003/0008364 A1 | 1/2003 | Wang et al. |
| 2003/0175947 A1 | 9/2003 | Liu et al. |
| 2004/0032793 A1 | 2/2004 | Falcon |
| 2004/0072278 A1 | 4/2004 | Chou et al. |
| 2004/0086870 A1 | 5/2004 | Tyvoll et al. |
| 2004/0191789 A1 | 9/2004 | Manaresi et al. |
| 2004/0197905 A1 | 10/2004 | Hafeman |
| 2005/0112548 A1 | 5/2005 | Segawa et al. |
| 2005/0129581 A1 | 6/2005 | McBride et al. |
| 2005/0175981 A1 | 8/2005 | Voldman et al. |
| 2006/0091015 A1 | 5/2006 | Lau |
| 2006/0154361 A1 | 7/2006 | Wikswo et al. |
| 2006/0177350 A1 | 8/2006 | Sano et al. |
| 2006/0263612 A1 | 11/2006 | Chen et al. |
| 2007/0095669 A1 | 5/2007 | Lau et al. |
| 2007/0183934 A1 | 8/2007 | Diercks et al. |
| 2007/0292312 A1 | 12/2007 | Bachman et al. |
| 2007/0292941 A1 | 12/2007 | Handique et al. |
| 2008/0003142 A1 | 1/2008 | Link et al. |
| 2008/0013092 A1 | 1/2008 | Maltezos et al. |
| 2008/0223721 A1 | 9/2008 | Cohen et al. |
| 2008/0302732 A1 | 12/2008 | Soh et al. |
| 2009/0021728 A1 | 1/2009 | Heinz et al. |
| 2009/0023608 A1 | 1/2009 | Hung et al. |
| 2009/0170186 A1 | 7/2009 | Wu et al. |
| 2009/0286300 A1 | 11/2009 | Le Vot et al. |
| 2010/0003666 A1 | 1/2010 | Lee et al. |
| 2010/0173393 A1 | 7/2010 | Handique et al. |
| 2010/0273681 A1 | 10/2010 | Cerrina et al. |
| 2011/0003325 A1 | 1/2011 | Durack |
| 2011/0030808 A1 | 2/2011 | Chiou et al. |
| 2011/0053151 A1 | 3/2011 | Hansen et al. |
| 2011/0117634 A1 | 5/2011 | Halamish et al. |
| 2011/0143964 A1 | 6/2011 | Zhou et al. |
| 2011/0262906 A1 | 10/2011 | Dimov et al. |
| 2011/0306108 A1 | 12/2011 | Douglas-Hamilton et al. |
| 2012/0009671 A1 | 1/2012 | Hansen et al. |
| 2012/0015347 A1 | 1/2012 | Singhal et al. |
| 2012/0024708 A1 | 2/2012 | Chiou et al. |
| 2012/0118740 A1 | 5/2012 | Garcia et al. |
| 2012/0156675 A1 | 6/2012 | Lueerssen et al. |
| 2012/0315203 A1 | 12/2012 | Baroud et al. |
| 2012/0325665 A1 | 12/2012 | Chiou et al. |
| 2013/0115606 A1 | 5/2013 | Hansen et al. |
| 2013/0118905 A1 | 5/2013 | Morimoto et al. |
| 2013/0130232 A1 | 5/2013 | Weibel et al. |
| 2013/0146459 A1 | 6/2013 | Bazant et al. |
| 2013/0171628 A1 | 7/2013 | Di Carlo et al. |
| 2013/0190212 A1 | 7/2013 | Handique et al. |
| 2013/0204076 A1 | 8/2013 | Han et al. |
| 2013/0261021 A1 | 10/2013 | Bocchi et al. |
| 2014/0045277 A1 | 2/2014 | Gordon et al. |
| 2014/0116881 A1 | 5/2014 | Chapman et al. |
| 2015/0018226 A1 | 1/2015 | Hansen et al. |
| 2015/0064702 A1 | 3/2015 | Handique et al. |
| 2015/0151298 A1 | 6/2015 | White et al. |
| 2015/0151307 A1 | 6/2015 | Breinlinger et al. |
| 2015/0165436 A1 | 6/2015 | Chapman et al. |
| 2015/0306598 A1 | 10/2015 | Khandros et al. |
| 2015/0306599 A1 | 10/2015 | Khandros et al. |
| 2016/0160259 A1 | 6/2016 | Du |
| 2016/0171686 A1 | 6/2016 | Du et al. |
| 2016/0184821 A1 | 6/2016 | Hobbs et al. |
| 2016/0199837 A1 | 7/2016 | Breinlinger et al. |
| 2016/0252495 A1 | 9/2016 | Ricicova et al. |
| 2016/0257918 A1 | 9/2016 | Chapman et al. |
| 2016/0312165 A1* | 10/2016 | Lowe, Jr. ............... C12M 23/16 |
| 2017/0021366 A1 | 1/2017 | Chapman et al. |
| 2017/0165667 A1 | 6/2017 | Beaumont et al. |
| 2017/0355595 A1 | 12/2017 | Breinlinger et al. |
| 2018/0015473 A1 | 1/2018 | Bharadwaj et al. |
| 2018/0298318 A1 | 10/2018 | Kurz et al. |
| 2019/0240665 A1 | 8/2019 | Lionberger et al. |

FOREIGN PATENT DOCUMENTS

| | | |
|---|---|---|
| EP | 1065378 A2 | 1/2001 |
| JP | 2006090870 A | 4/2006 |
| JP | 2011000079 A | 1/2011 |
| JP | 2014219261 A | 11/2014 |
| KR | 20100008222 | 1/2010 |
| WO | WO01/035071 A2 | 5/2001 |
| WO | WO02/088702 A2 | 11/2002 |
| WO | WO2005/100541 A2 | 10/2005 |
| WO | WO2008/119066 A1 | 10/2008 |
| WO | WO2010/115167 A2 | 10/2010 |
| WO | WO2010/147078 A1 | 12/2010 |
| WO | WO2010/147942 A1 | 12/2010 |
| WO | WO2012/037030 A2 | 3/2012 |
| WO | WO2012/072823 A1 | 6/2012 |
| WO | WO2013/019491 A1 | 2/2013 |
| WO | WO2015/061497 A1 | 4/2015 |
| WO | WO2015/164846 A1 | 10/2015 |
| WO | WO2015/164847 A1 | 10/2015 |
| WO | WO2016/172350 A1 | 10/2016 |
| WO | WO2016/172454 A1 | 10/2016 |
| WO | WO2017/048975 A1 | 3/2017 |
| WO | WO2017/095917 A1 | 6/2017 |
| WO | WO2017/181135 A2 | 10/2017 |
| WO | WO2017/205830 A1 | 11/2017 |
| WO | WO2018/064640 A1 | 4/2018 |
| WO | WO2018/067872 A1 | 4/2018 |
| WO | WO2018/071448 A1 | 4/2018 |
| WO | WO2018/102747 A1 | 6/2018 |
| WO | WO2018/102748 A1 | 6/2018 |
| WO | WO2019/018801 A1 | 1/2019 |
| WO | WO2019/075476 A2 | 4/2019 |
| WO | WO2019/079787 A1 | 4/2019 |
| WO | WO2020/168258 A1 | 8/2020 |
| WO | WO2020/223555 A1 | 11/2020 |

OTHER PUBLICATIONS

Chiou et al.; Massively Parallel Manipulation of Single Cells and Microparticles Using Optical Images; Nature; (436) pp. 370-372; Jul. 2005.

Chiou; Massively parallel optical manipulation of single cells, mirco- and nano-particles on optoelectronic devices; University of California at Berkeley: 147 pages (Dissertation); (year of pub.

(56) References Cited

OTHER PUBLICATIONS sufficiently earlier than effective US filing date and any foreign priority date) Fall 2005.
Chung et al., Imaging single-cell signaling dynamics with a deterministic high-density single-cell trap array; Anal. Chem.; 83(18); pp. 7044-7052; 14 pages (Author Manuscript); Aug. 23, 2011.
CN101275114A, Lou—Machine Translation, Oct. 1, 2008, 8 pages.
CN102181361A_Harbin Inst Qu-Machine Translation, Sep. 14, 2011, 6 pages.
Communication pursuant to Article 94(3) EPC; EP Application 168826683-1101; Jan. 4, 2020; 6 pages.
Debra et al.; Fabrication and performance testing of a steady thermocapillary pump with no moving parts; Proceedings of the MEMS 2002 IEEE International Conference; Las Vegas, NV, USA; pp. 109-112; Jan. 20-24, 2002.
Hsu et al.; Sorting of Differentiated Neurons Using Phototransistor-Based Optoelectronic Tweezers for Cell Replacement Therapy of Neurodegenerative Diseases; Transducers 2009 Conf.; pp. 1598-1601; Jun. 2009.
Hua et al.; Microfluidic actuation using electrochemically generated bubbles; Analytical Chemistry; 74(24); pp. 6392-6396; Dec. 2002.
Hung et al.; Continuous Perfusion Microfluidic Cell Culture Array for High-Throughput Cell-Based Assays; Biotech and Bioengineering 89(1); pp. 1-8 ; Jan. 2005.
Iliescu et al.; Continuous field-flow separation of particle populations in a dielectrophoretic chip with three dimensional electrodes; Applied Physics Letters 90(23); pp. 234104, 4pages; Jun. 2007.
International Search Report and Written Opinion of PCT App. PCT/US2016/069249; mailed Apr. 28, 2017; 14 pages.
JP2006090870_A Aicia Eng Ltd_Fujii—Machine Translation, Apr. 6, 2006, 12 pages.
JP2014219261A_Konica_Tsukagoshi—Machine Translation, Nov. 20, 2014, 13 pages.
KIPO computer-generated English language translation of KR 201000008222A_Kyun; 10 pages.
Leu et al.; Design and fabrication of thermocapillary micro bubble pump; Advanced Materials research; 528; pp. 23-26; (year of pub. sufficiently earlier than effective US filing date and any foreign priority date) 2012.
Liu et al.; Optofluidic control using photothermal nanoparticles; Nature Materials; 5(1); pp. 27-32; Jan. 2006.
Nevill et al.; Integrated Microfluidic Cell Culture and Lysis on a Chip; Lab Chip; (12) pp. 1689-1695; Oct. 2007.
Ohta et al.; Optically Controlled Cell Discrimination and Trapping Using Optoelectronic Tweezers; IEEE Journal of Selected Topics in Quantum Electronics, 13 (2); pp. 235-243; Apr. 23, 2007.
Ritchie et al.; Reconstitution of Membrane Proteins in Phospholipid Bilayer Nanodiscs; Methods Enzymol; 464; pp. 211-231; 23 pages; (Author Manuscript); Jan. 2009.
Somaweera et al.; "Generation of a Chemical Gradient Across an Array of 256 Cell Cultures in a Single Chip"; Analyst; 138(19); pp. 5566-5571; 14 pgs.; (Author Manuscript); Oct. 2013.
Valley et al.; A Unified Platform for Optoelectrowetting and Optoelectronic Tweezers; Lab Chip; 11(7); pp. 1292-1297; Jan. 2011.
Valley et al.; Optoelectronic Tweezers as a Tool for Parallel Single-Cell Manipulation and Stimulation; IEEE Trans Biomed Circuits Syst.; 3(6); pp. 424-431; Dec. 2009.
Vercruysse et al. ; A high speed miniaturized cell sorter with lens-free imaging and thermal bubble based jet flow sorting; 18th International Conference on Miniaturized Systems for Chemistry and Life Science; pp. 382-384; Oct. 26-30, 2014.
WO2010147078, University of Tokyo, Machine Translation, Dec. 23, 2010; 12 pages.
Xie et al.; Exploring bubble oscillation and mass transfer enhancement in acoustic-assisted liquid-liquid extraction with a microfluidic device; Scientific Reports; 5(1); pp. 1-9; Jul. 2015.
Xu et al.; Recent Trends in Dielectrophoresis; Informacije MIDEM; 40(4) pp. 253-262; Dec. 2010.
Yi et al.; Microfluidics Technology for Manipulation and Analysis of Biological Cells; Anal Chim Acta; (560) pp. 1-23; Feb. 2006.
Zhang et al.; Laser-induced thermal bubbles for microfluidics applications; Lab on a Chip; 11(7); pp. 1389-1395; (year of pub. sufficiently earlier than effective US filing date and any foreign priority date) 2011.

\* cited by examiner

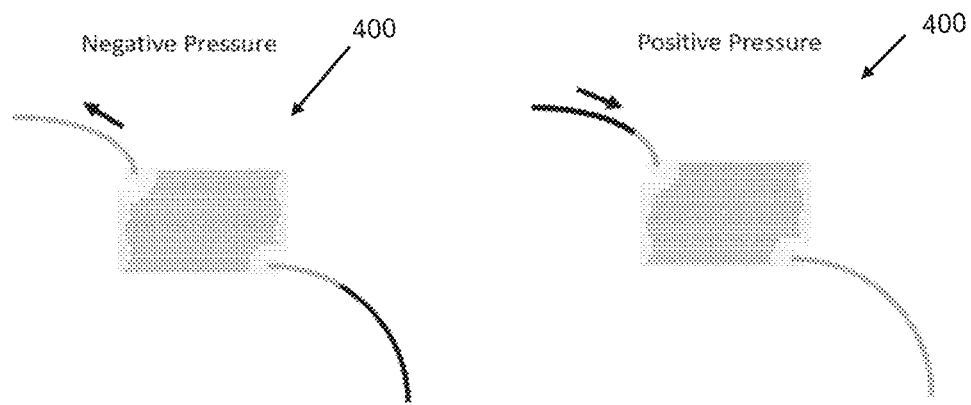
FIG. 6A  FIG. 6B
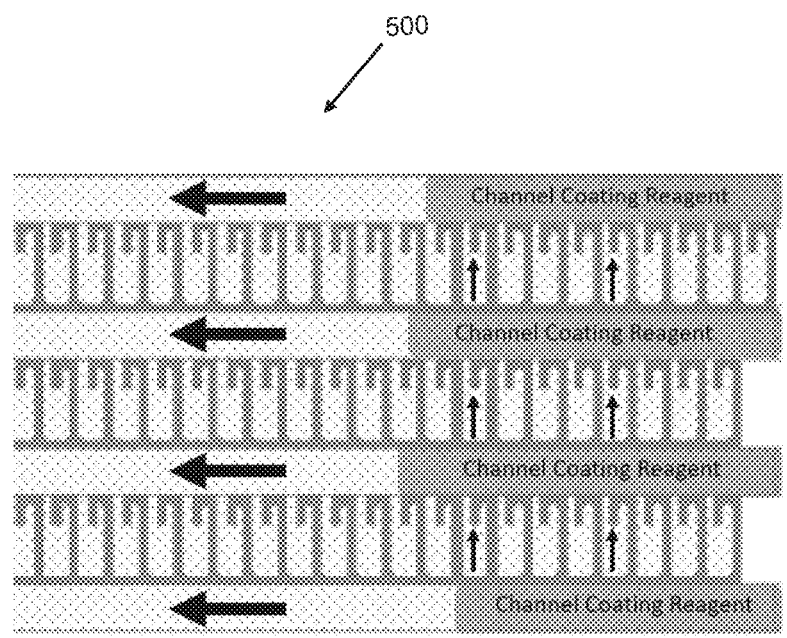
FIG. 7

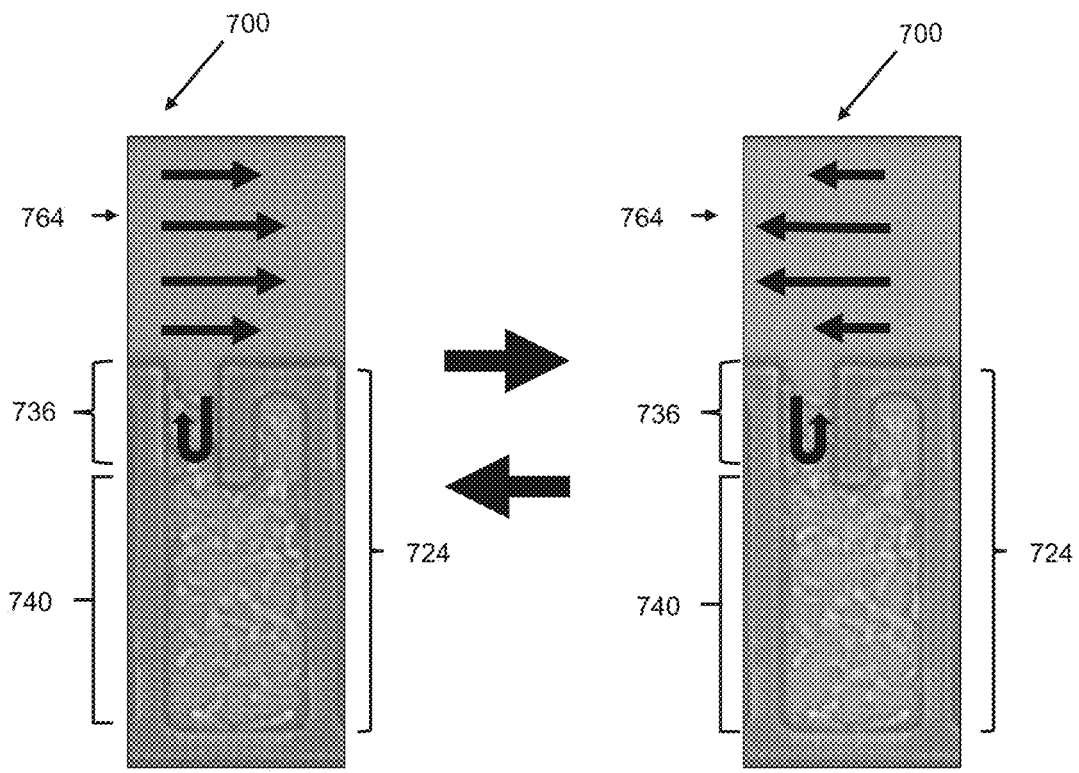
FIG 9A  FIG 9B
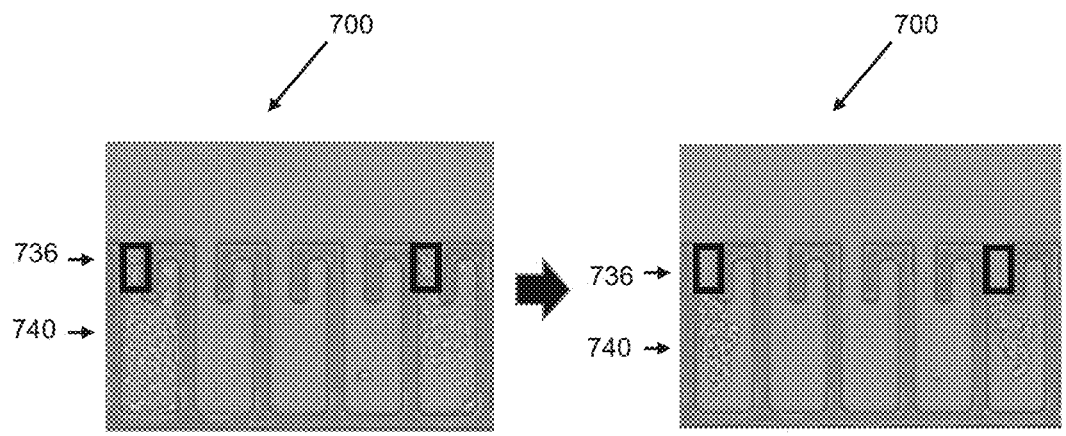
FIG 10A  FIG 10B

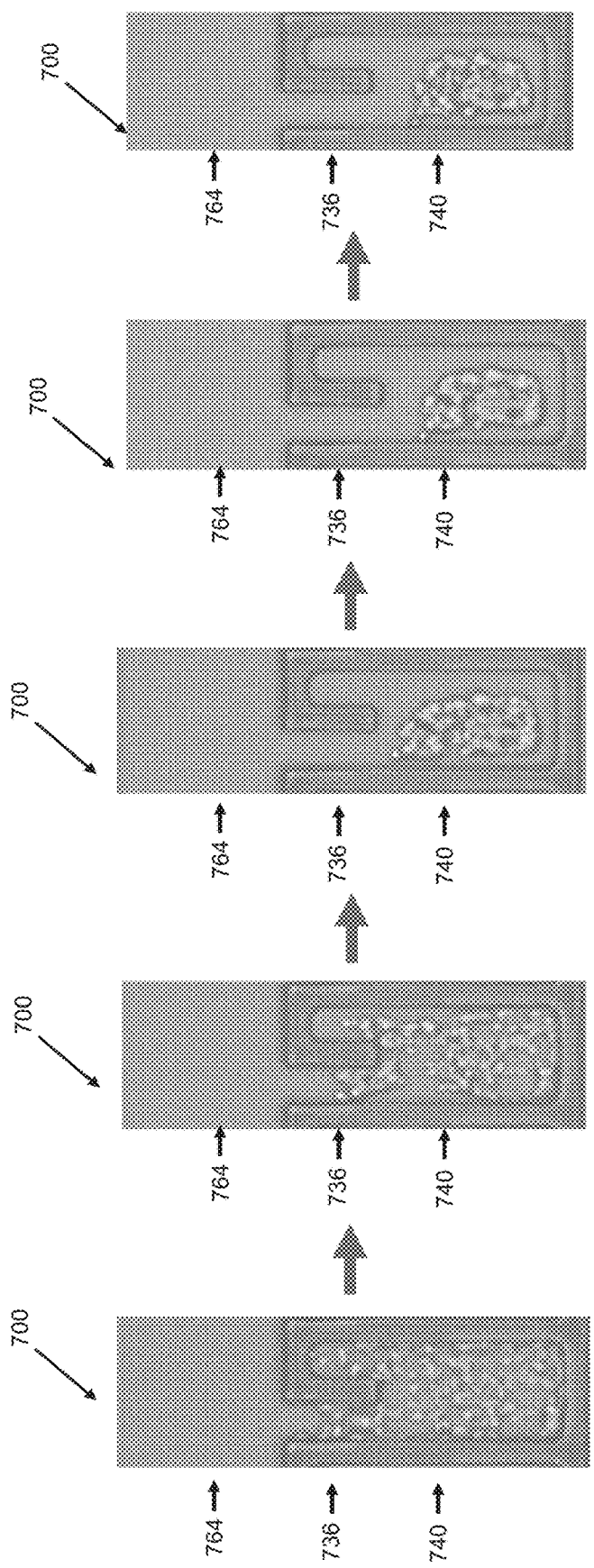

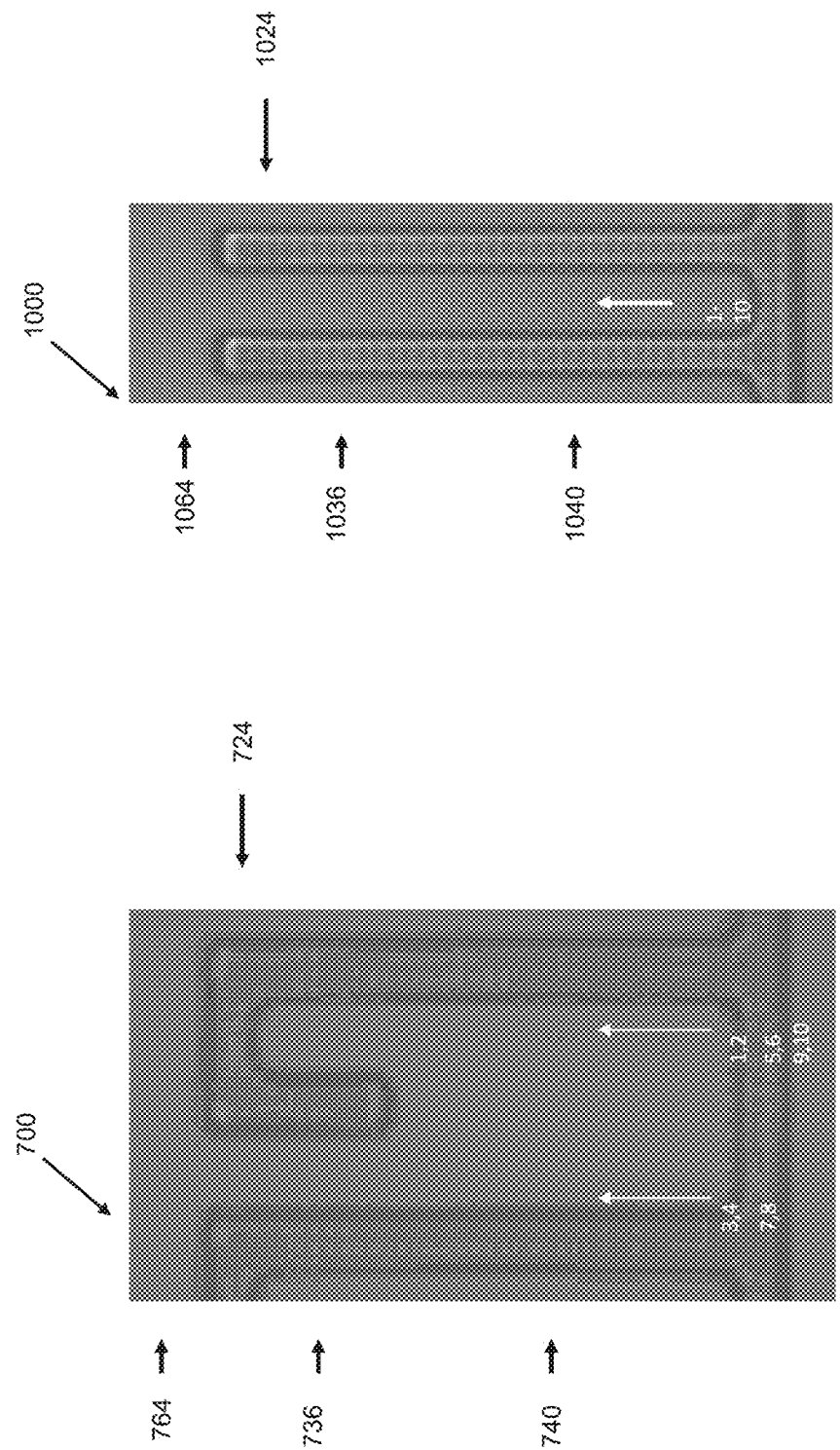

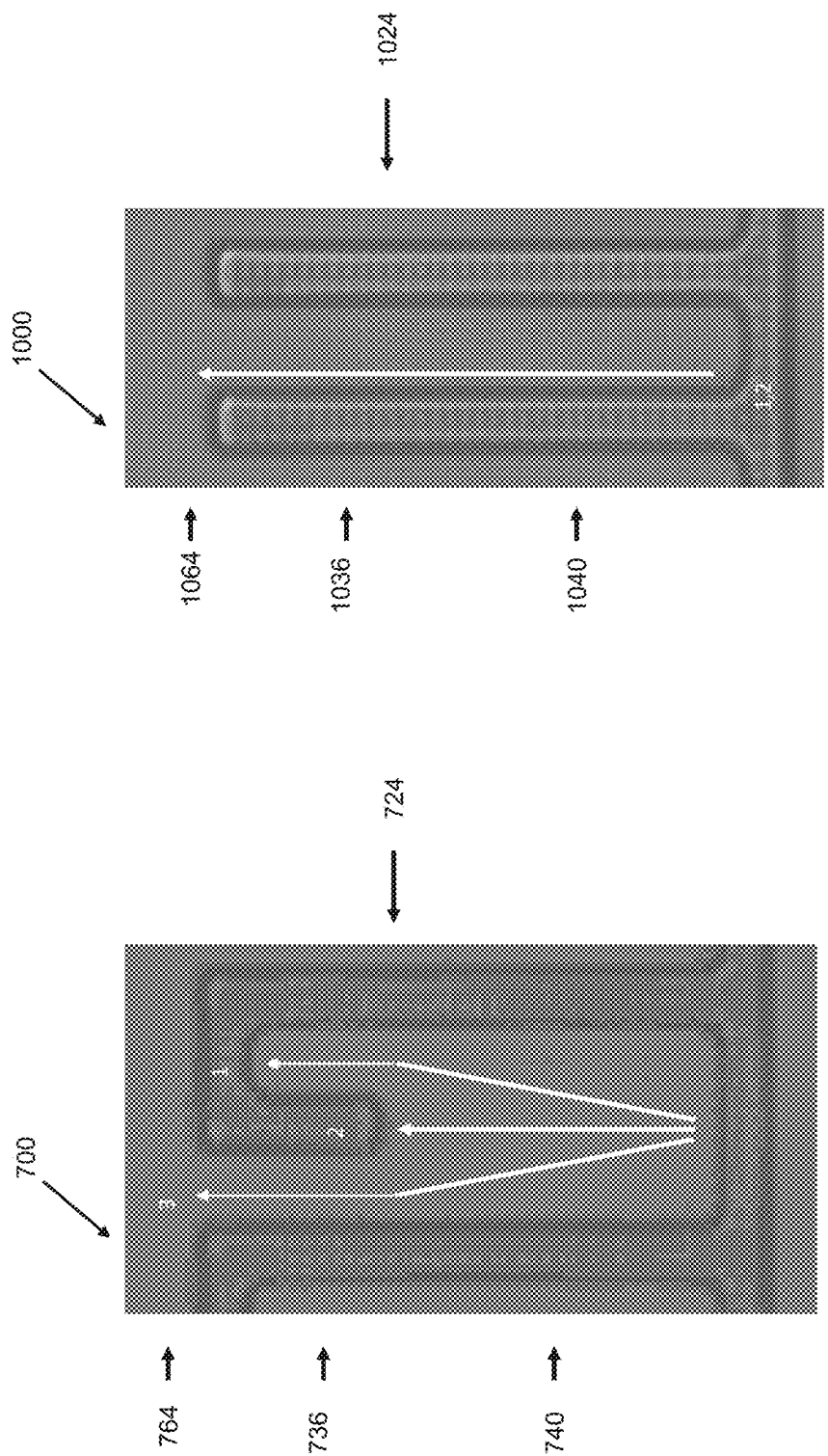

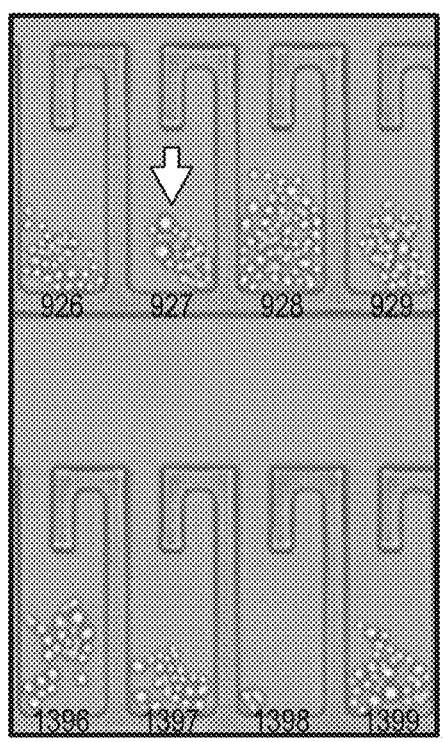
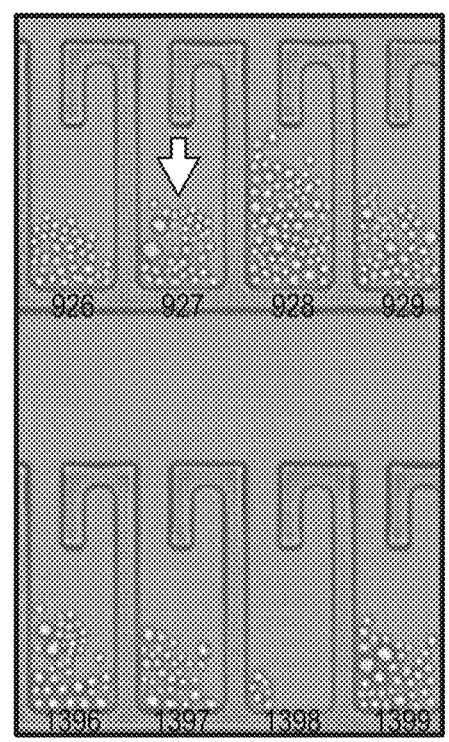
*FIG. 14A*          *FIG. 14B*
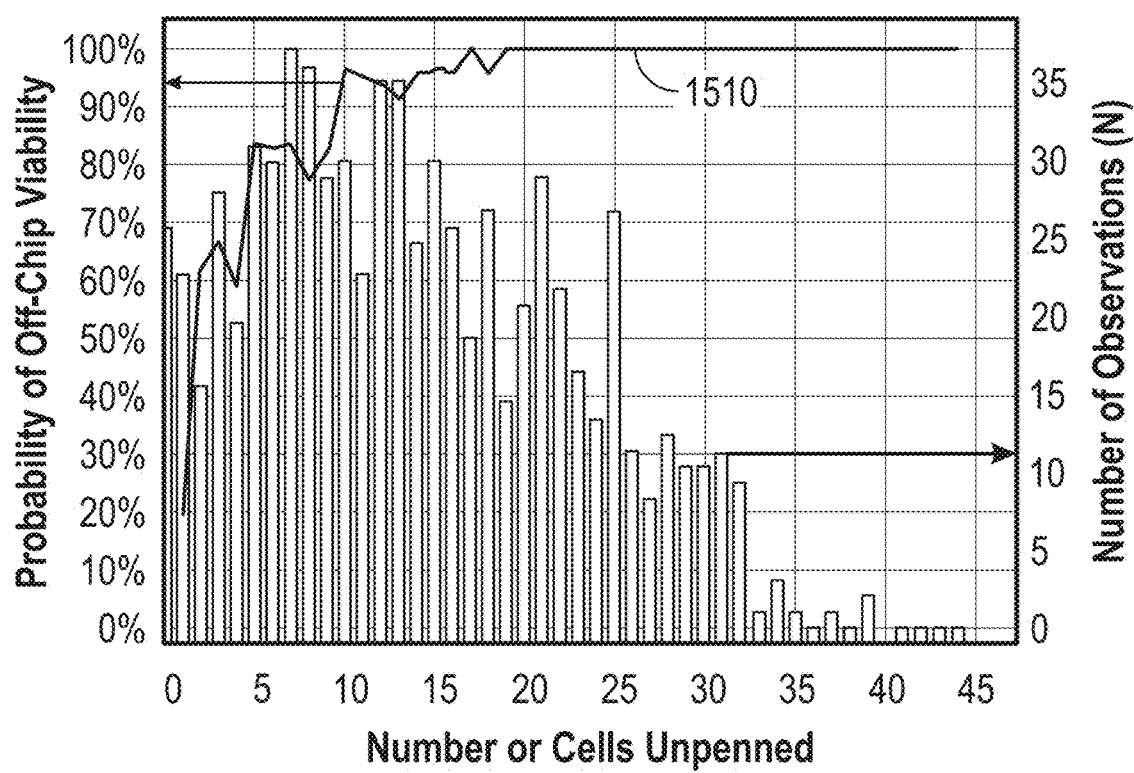
*FIG. 15*

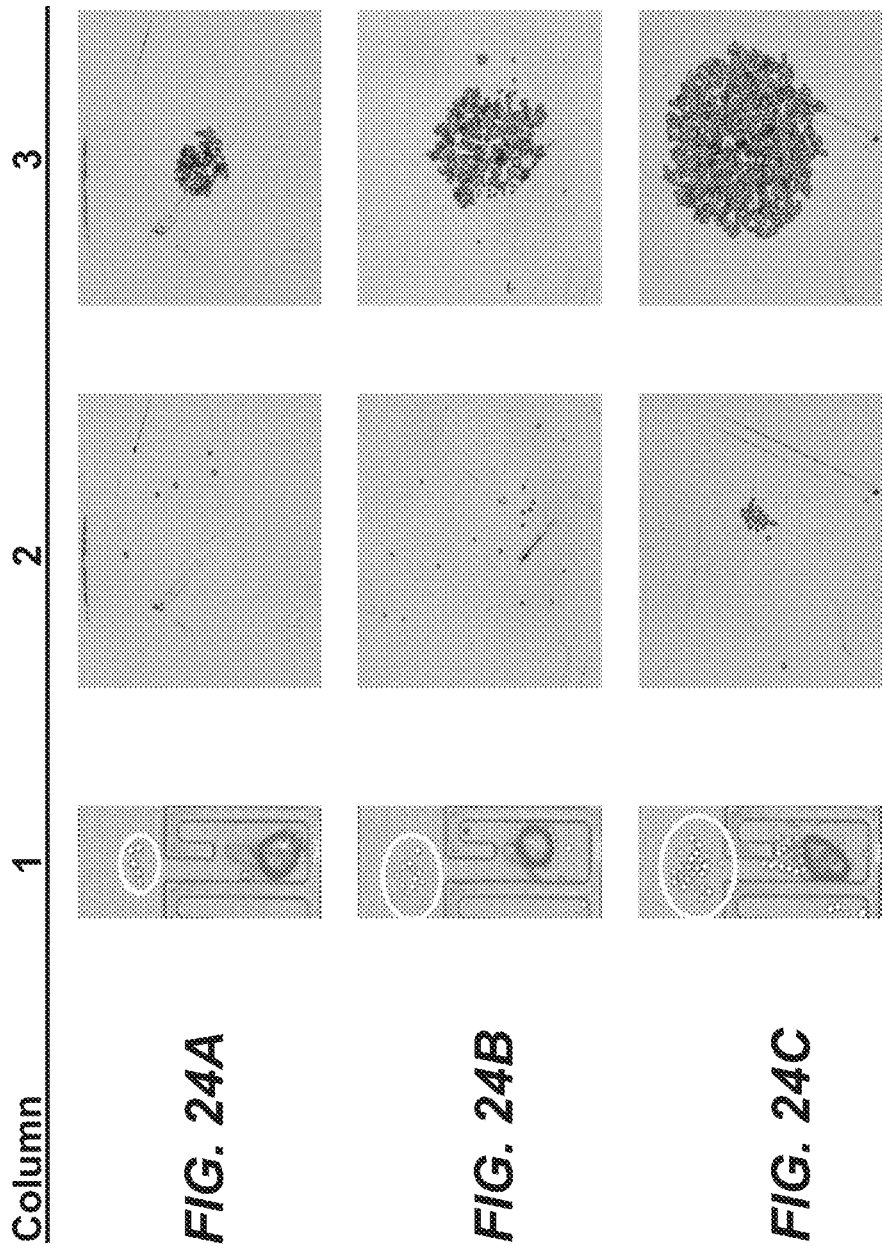

LASER-ASSISTED REPOSITIONING OF A MICRO-OBJECT AND CULTURING OF AN ATTACHMENT-DEPENDENT CELL IN A MICROFLUIDIC ENVIRONMENT

CROSS REFERENCE TO RELATED APPLICATIONS

This application is a continuation of International Application No. PCT/US2020/018388, filed Feb. 14, 2020, entitled "LASER-ASSISTED REPOSITIONING OF A MICRO-OBJECT AND CULTURING OF AN ATTACHMENT-DEPENDENT CELL IN A MICROFLUIDIC ENVIRONMENT", which claims priority from U.S. Provisional Application No. 62/806,612, filed Feb. 15, 2019, entitled "LASER-ASSISTED REPOSITIONING OF A MICRO-OBJECT AND CULTURING OF AN ATTACHMENT DEPENDENT CELL IN A MICROFLUIDIC ENVIRONMENT", the contents of each of which are incorporated herein by reference in their entirety.

SEQUENCE LISTING

The instant application contains a Sequence Listing which has been submitted electronically in ASCII format and is hereby incorporated by reference in its entirety. Said ASCII copy, created on Aug. 13, 2021, is named SeqListing_13691-705-300_ST25.txt and is 1 KB in size.

BACKGROUND

Microfluidic devices have become convenient platforms for processing and manipulating micro-objects such as biological cells. Methods of repositioning micro-objects, including biological cells or beads, are needed for precise manipulation and selective processing. Further, certain classes of biological cells require attachment to a support to be maintained viably and to expand, providing challenges while culturing, assaying and/or exporting adherent cells within a microfluidic environment. Some embodiments of the present invention are directed to methods for culturing attachment-dependent cells within a microfluidic environment and methods for laser-assisted export thereof.

SUMMARY OF THE DISCLOSURE

In a first aspect, a method of repositioning a micro-object disposed in a chamber of a microfluidic device is provided, where the method includes: directing laser illumination upon a starting position on an inner surface of the chamber to generate an illumination area, where: the microfluidic device includes the chamber and a flow region for containing a first liquid medium, where the chamber includes an opening to the flow region, and the starting position is disposed within a sub-region of the chamber distal to the opening to the flow region; and moving the laser illumination relative to the microfluidic device, thereby changing the position of the illumination area such that, upon completion of the change, the laser illumination is at a final position, where the change in the position of the illumination area induces the repositioning of the micro-object at least towards the opening of the chamber to the flow region. The micro-object may be a bead, a biological cell, or a daughter cell derived from the cell. In some variations, the micro-object may be an attachment-dependent cell. In some other variations, the micro-object may be a non-adherent biological cell. In some variations, when the micro-object is a bead, the bead may further include moieties covalently or non-covalently associated with the bead, where the moieties may include one or more of fluorescent moieties, nucleic acid moieties, protein or peptide moieties; antigens; small molecule signaling moieties, or chemical/biological species capable of use in an assay. In some other variations, the micro-object is a plurality of micro-objects and the plurality of micro-objects may include at least one biological cell and at least one bead. In some embodiments the at least one biological cell may be an adherent cell. In some other embodiments the at least one biological cell may be a non-adherent cell. In some embodiments, at least one biological cell and at least one bead may be disposed in the chamber of the microfluidic device.

Moving the laser illumination relative to the microfluidic device may controllably generate a bubble having a trajectory within the chamber, where the generated bubble may induce the repositioning of the micro-object. In some variations, the repositioning of the micro-object may result in the micro-object being exported from the chamber into the flow region. In some variations, the method may further include exporting the micro-object from the flow region and out of the microfluidic device.

In some variations, the micro-object may be a biological cell, where the biological cell may be exported out of the microfluidic device and into a culturing vessel, and where the biological cell may have a probability of viability of at least 60% upon further culturing. In some variations, the biological cell may be a plurality of biological cells and exporting may include exporting at least 5, 6, 7, 10, or 20 biological cells out of the microfluidic device and into the culturing vessel. In some variations, the biological cell may be an adherent biological cell.

In some other variations, where the micro-object may be a biological cell, where the biological cell may be exported out of the microfluidic device and into a culturing vessel, the biological cell may be a non-adherent biological cell. In some other variations, the biological cell may have a probability of viability of at least 80% upon further culturing. In some embodiments, the biological cell may be a plurality of biological cells and exporting may include exporting at least 9, 10, 15, or 20 biological cells out of the microfluidic device to the culturing vessel. In some variations, the biological cell may be a non-adherent biological cell. In some other variations, the biological cell may be an adherent biological cell.

In some variations, the change in the position of the illumination area may occur at a fixed rate, creating a path of laser illumination between the starting position and the final position. In some variations, the laser illumination may be continuous during the change in the position of the illumination area.

In some variations, the chamber may include a sequestration pen including: an isolation region for containing a second fluidic medium, the isolation region having a single opening; and a connection region fluidically connecting the isolation region to the flow region, where the isolation region of the microfluidic sequestration pen may be an unswept region of the micro-fluidic device. In some variations, the micro-object may be disposed within the isolation region of the sequestration pen. In some variations, the connection region of the sequestration pen may include a proximal opening into the flow region having a width $W_{con}$ ranging from about 20 microns to about 100 microns and a distal opening into the isolation region of the sequestration pen, and where a length $L_{on}$ of the connection region from the proximal opening to the distal opening may be as least 1.0 times the width $W_{con}$ of the proximal opening of the connection region.

In some variations, directing the laser illumination may further include introducing an export medium into the flow region of the microfluidic device, and allowing components of the export medium to diffuse into the chamber. In some variations, a temperature of the export medium may be about 5° C. to about 10° C. cooler than a temperature of the microfluidic device. In some variations, the temperature of the export medium may be about 5° C. to about 10° C. cooler than a temperature of the first liquid medium.

In some variations, the method may further include using dielectrophoretic (DEP) forces to reposition the micro-object. In some variations, the micro-object may be repositioned to a position within the chamber closer to the opening to the flow region, the position not disposed at the starting position of the laser illumination. In some variations, the micro-object may be repositioned to a position within the chamber closer to the opening to the flow region, the position not disposed along a path of laser illumination including the starting position and the ending position. In some variations, repositioning using DEP forces may be performed before directing the laser illumination upon the starting position on the inner surface of the chamber.

In some variations, moving the laser illumination relative to the microfluidic device may include moving the microfluidic device relative to the laser.

In some variations, directing the laser illumination upon the starting position of the inner surface of the chamber may include directing the laser illumination upon a base or a cover of the chamber. In some variations, directing the laser illumination upon the starting position of the inner surface of the chamber may not include directing the laser illumination upon a wall of the chamber.

In some variations, the starting position on the inner surface of the chamber may be at least 5 microns or at least 10 microns away from an inner surface of a wall of the chamber.

In some variations, the steps of directing the laser illumination and changing the position of the laser illumination are repeated at least once. In some variations, for each repetition, directing laser illumination upon a starting position of the inner surface of the chamber may include directing the laser illumination upon a unique starting position. In some variations, directing and moving the laser illumination may include illuminating multiple paths from the same starting position upon the inner surface of the chamber, each path stopping at a different final position upon the inner surface of the chamber.

In some variations, changing the position of the illumination area may include illuminating a path along the inner surface of the chamber in a direction parallel to the inner surface of a wall of the chamber.

In some variations, changing the position of the illumination area upon an inner surface of the chamber may include traversing about 20% to about 70% of a length of the inner surface of the chamber.

In some variations, directing the laser illumination upon the starting position on the inner surface of the chamber may include illuminating with a laser having a power of less than about 1300 mW. In some variations, directing the laser illumination upon the starting position on the inner surface of the chamber may include illuminating with a laser having a power from about 300 mW to about 600 mW.

In some variations, the illumination area may be greater than or equal to a circular area including a diameter of 5 um. In some variations, the illumination area may be a circular area including a diameter from 5 um to 50 um.

In some variations, changing the position of the illumination area upon the inner surface of the chamber may include illuminating a path along the inner surface of the chamber, where a first section of the path may be illuminated with laser illumination having a first power from about 400 mW to about 600 mW or about 1000 mW to about 1300 mW, and where a second section of the path may be illuminated with laser illumination having a power about 1% to about 10% less than the power of the laser illumination used to illuminate the first section of the path. In some variations, the second section of the path may be closer to the opening of the chamber to the flow region than the first section of the path. In some variations, the second position on the inner surface of the chamber may be closer to the opening of the chamber than the first position.

In some variations, directing the laser illumination may be performed for about 40 msec to about 200 msec.

In some variations, the laser illumination may be moved at about 1 micron/sec to about 350 microns/sec (e.g., when the micro-object may be an attachment-dependent cell). In some variations, the laser illumination may be moved at less than 70 microns/sec (e.g., when the micro-object may be a biological cell that may be a non-adherent cell).

In some variations, the microfluidic device further may include a single inlet through which the first medium can be input into the flow region; and a single outlet through which the first medium can be removed from the flow region. In some variations, the microfluidic device may include a base, a microfluidic circuit structure disposed on the base, and a cover, where the base, the microfluidic circuit structure, and the cover collectively define the chamber. In some variations, the microfluidic circuit structure may include the flow region.

In some variations, the method may further include relocating the micro-object using dielectrophoretic forces. In some variations, the dielectrophoretic forces may be optically actuated.

In some variations, the inner surface of the chamber of the microfluidic device may include a surface coating. In some embodiments, the surface coating may promote adhesion of the attachment dependent cell. In some variations, the inner surface of the chamber may include a surface coating including a mixture of surface modifying ligands. In some variations, at least one of the mixture of surface modifying ligands may include a peptide having an adhesive binding motif. In some embodiments, the adhesive binding motif of the peptide may be an RGD motif. In some variations, at least one of the surface modifying ligands may not promote adhesion (e.g., a polymer, such as PEG or dextran). In some variations, the mixture of surface modifying ligands may include a mixture of adhesion promoting ligands and non-adherent ligands having a ratio from 0:100 m/m to 10:90 or 0.1:99.9 m/m.

In some variations, the method may further include contacting the micro-object in the chamber with a disengagement reagent prior to directing laser illumination upon the starting position on the inner surface of the chamber. In some variations, the disengagement reagent may include a peptidase (e.g., trypsin). In some variations, the peptidase may include a recombinant cell-dissociation enzyme.

In some variations, the method may further maintaining the disengagement reagent in contact with the micro-object for a predetermined period of time based at least in part on a shape or a size of the chamber.

In some variations, the chamber may include a plurality of micro-objects disposed therein, and where the method further may include counting the number of micro-objects in the plurality. In some embodiments, the counting may be automated. In some embodiments, the counting may be performed before the repositioning of the plurality of micro-objects. In some embodiments, the counting may be performed or after the repositioning of the plurality of micro-objects.

In some variations, the chamber may include a plurality of micro-objects disposed therein, and the repositioning further may include exporting a subset of the plurality of micro-objects from the chamber into the flow region.

In some variations, the microfluidic device may include a plurality of chambers, where each of the plurality of chambers may include at least one micro-object disposed therein, and where the micro-object(s) in at least a subset of the plurality of chambers are repositioned. In some variations, the micro-object(s) in the subset of the plurality of chambers are exported from their respective chambers into the flow region. In some embodiments, exporting from each chamber of the subset of the plurality of chambers may be performed sequentially. In other embodiments, exporting from each chamber of the subset of the plurality of chambers may be performed substantially contemporaneously.

In some variations, when the micro-object(s) disposed in each of the plurality of chambers are attachment-dependent cells, the method further may include repeatedly contacting the attachment-dependent cells with a disengagement reagent during the sequential exports.

In another aspect, a method of culturing an attachment-dependent cell within a microfluidic environment is provided, including: introducing an attachment-dependent cell into a chamber of a microfluidic device, where the microfluidic device may include a base, a microfluidic circuit structure disposed on the base, and a cover which collectively define a microfluidic circuit, where said microfluidic circuit may include: a flow region for containing a flow of a first fluidic medium, where an inner surface of the flow region (e.g., one or more surfaces, or all surfaces of the flow region) may include a first surface coating; and the chamber, where the chamber has a single opening to the flow region, and where an inner surface of the chamber (e.g., one or more surfaces, or all surfaces of the chamber) may include a second surface coating, where the second surface coating promotes adhesion of the attachment-dependent cell; culturing the attachment-dependent cell in the chamber for a first period of time; disengaging the attachment-dependent cell from the coated inner surface of the chamber; and exporting the attachment-dependent cell from the chamber. In some variations, exporting the attachment-dependent cell from the chamber may include the method of any one of embodiments 1 to 67.

In some variations, the second surface coating may promote cell spreading of the attachment dependent cell.

In some variations, the chamber may include a sequestration pen, and further the sequestration pen may include: an isolation region for containing a second fluidic medium, the isolation region having a single opening; and a connection region fluidically connecting the isolation region to the flow region, where the isolation region of the microfluidic sequestration pen may be an unswept region of the microfluidic device. In some variations, the connection region of the sequestration pen may include a proximal opening into the flow region having a width $W_{con}$ ranging from about 20 microns to about 100 microns and a distal opening into the isolation region of the sequestration pen, and where a length $L_{on}$ of the connection region from the proximal opening to the distal opening may be as least 1.0 times the width $W_{con}$ of the proximal opening of the connection region. In some variations, the flow region may include a microfluidic channel and the chamber opens to the microfluidic channel.

In some variations, the first surface coating may include covalently bound surface modifying ligands. In some variations, the first surface coating may include polyethylene oxide moieties, carboxylic acid moieties, or a combination of polyethylene oxide moieties and carboxylic acid moieties.

In some variations, the method may further include contacting an inner surface of the chamber with a chamber surface coating reagent, thereby forming the second surface coating. In some variations, introducing the attachment-dependent cell and contacting the inner surface of the chamber with a chamber surface coating reagent may be performed by introducing the attachment-dependent cell in a solution including the chamber coating reagent.

In some variations, disengaging the attachment-dependent cell from the coated inner surface may include introducing a cell disengagement reagent into the flow region (or microfluidic channel) and letting it diffuse into the chamber, thereby disrupting the adhesion of the at least one attachment-dependent cell. In some variations, the cell disengagement reagent may include a peptidase. In some variations, the method may further include maintaining the cell disengagement reagent in contact with the attachment-dependent cell for a predetermined period of time based at least in part on a shape of the chamber or a size of the chamber.

In some variations, exporting the attachment-dependent cell from the chamber may include directing laser illumination along a portion of a surface of the chamber. In some variations, the surface of the chamber may be the inner surface of the chamber. In some variations, directing laser illumination along the portion of the surface of the chamber may include moving the microfluidic device relative to the laser.

In some variations, directing laser illumination may include illuminating with a laser having a power of less than about 1300 mW.

In some variations, exporting the attachment dependent cell from the chamber further may include introducing an export medium into the flow region (or microfluidic channel) of the microfluidic device and allowing components of the export medium to diffuse into the chamber. In some variations, a temperature of the export medium may be about 5° C. to about 10° C. cooler than a temperature of the microfluidic device. In some variations, a temperature of the export medium may be about 5° C. to about 10° C. cooler than a temperature of the first liquid medium.

In some variations, exporting the at least one attachment-dependent cell from the chamber may include exporting the at least one attachment-dependent cell into the flow region. In some variations, exporting the at least one attachment-dependent cell from the chamber into the flow region further may include using dielectrophoretic forces. In some variations, the method may further include exporting the at least one attachment-dependent cell from the chamber into a staging area in the flow region. In some variations, exporting the at least one attachment-dependent cell from the chamber into the staging area in the flow region further may include using dielectrophoretic forces.

In some variations, the first period of time may include a period of time sufficient for the attachment-dependent cell to divide into one or more daughter cells. In some variations, exporting the attachment-dependent cell may include exporting at least a subset of the one or more daughter cells.

In some variations, the first period of time may include a period of time sufficient for the attachment-dependent cell to form a clonal population of daughter cells. In some variations, exporting the attachment-dependent cell may include exporting at least a subset of the clonal population of daughter cells.

In some variations, the method may further include culturing a remaining population of daughter cells for a second period of time after exporting has been performed.

In some variations, the second surface coating may include a mixture of surface modifying ligands. In some variations, at least one ligand of the mixture of surface modifying ligands may include a peptide having an adhesive binding motif. In some variations, the adhesive binding motif of the peptide may be an RGD motif.

In some variations, at least one ligand of the mixture of surface modifying ligands may not promote adhesion (e.g., a polymer, such as PEG or dextran). In some variations, at least 0.5% of ligands in the mixture of surface modifying ligands may include a peptide having an adhesive binding motif.

In some variations, the microfluidic device further may include a single inlet through which the first medium can be input into the flow region; and a single outlet through which the first medium can be removed from the flow region. In some variations, the microfluidic circuit structure and the cover is an integral structure of the microfluidic device.

In some variations, introducing the attachment-dependent cell into the chamber may include using dielectrophoretic forces.

In another aspect, a kit for culturing attachment-dependent cells is provided, including a chamber surface functionalization reagent.

In some variations, the chamber surface functionalization reagent may include a first molecule comprising a first reactive moiety for reacting with a prepared surface of a chamber of a microfluidic device and a first surface functionalization moiety, where the first reactive moiety may be covalently attached to the first surface functionalization moiety. The first reactive moiety may include an alkynyl moiety. In some variations, the first surface functionalization moiety may be a biotin moiety or a streptavidin moiety.

In some variations, the kit may further include a chamber surface coating reagent, where the chamber surface coating reagent may include a first molecule including a reactive moiety for reacting with a functionalized surface of a chamber (e.g., a surface functionalization moiety of the functionalized surface of the chamber) and a first surface modifying ligand, and where the reactive moiety of the first molecule of the chamber surface coating reagent is covalently attached to the first surface modifying ligand. In some variations, the reactive moiety of the first molecule of the chamber surface coating reagent may be a streptavidin moiety or a biotin moiety. In some variations, the first surface modifying ligand may promote micro-object adhesion.

In some variations, the first surface modifying ligand may be a peptide including an adhesive motif. In some variations, the first surface modifying ligand may be a peptide including a RGD sequence, a LDV sequence, an IKVAV sequence (SEQ ID NO: 1), or a YIGSR sequence (SEQ ID NO: 2).

In some variations, the chamber surface coating reagent may include a mixture of the first molecule and a second molecule, where the second molecule may include a second reactive moiety for reacting with the functionalized surface of the chamber (e.g., a surface functionalization moiety of the functionalized surface of the chamber), and a second surface modifying ligand, where the second reactive moiety may be covalently attached to the second surface modifying ligand, and where the second surface modifying ligand may not promote micro-object adhesion. In some variations, the ratio of the first molecule of the chamber surface coating reagent to the second molecule of the chamber surface coating reagent may be from about 0.1:99.9 m/m to about 10:90 m/m. In some variations, the second surface modifying ligand may include polyethylene oxide moieties, carboxylic acid moieties or a combination of polyethylene oxide moieties and carboxylic acid moieties. In some variations, the second surface modifying ligand may include a PEG polymer.

In some variations, the first molecule of the chamber surface coating reagent and the second molecule of the chamber surface coating reagent may be provided in separate containers.

In some variations, the chamber surface functionalization reagent may include a first molecule including a reactive moiety for reacting with a prepared surface of a chamber of a microfluidic device and a first surface functionalization moiety, and where the reactive moiety of the first molecule of the chamber surface coating reagent is covalently attached to the first surface functionalization moiety. In some variations, the first reactive moiety of the first molecule of the chamber surface functionalization reagent may include an alkynyl moiety. In some variations, the first surface functionalization moiety of the first molecule of the chamber surface functionalization reagent may promote micro-object adhesion. In some variations, the first surface functionalization moiety of the first molecule of the chamber surface functionalization reagent may be a peptide including an adhesive motif. In some variations, the first surface modifying ligand of the first molecule of the chamber surface functionalization reagent may be a peptide including a RGD sequence, a LDV sequence, an IKVAV sequence (SEQ ID NO: 1), or a YIGSR sequence (SEQ ID NO: 2).

In some variations, the chamber surface functionalization reagent may include a mixture of the first molecule and a second molecule, where the second molecule may include a reactive moiety for reacting with the prepared surface of the chamber of the microfluidic device and a second surface modifying ligand, where the reactive moiety of the second molecule is covalently attached to the second surface modifying ligand, and where the second surface modifying ligand may not promote micro-object adhesion. In some variations, the ratio of the first molecule of the chamber surface functionalization reagent to the second molecule of the chamber surface functionalization reagent may be from about 0.1:99.9 to about 10:90 on a m/m basis. In some variations, the second surface modifying ligand may include polyethylene oxide moieties, carboxylic acid moieties or a combination of polyethylene oxide moieties and carboxylic acid moieties. In some variations, the second surface modifying ligand may include a PEG polymer. In some variations, the first molecule of the chamber surface functionalization reagent and the second molecule of the chamber surface functionalization reagent may be provided in separate containers.

In some variations, the kit may further include the microfluidic device including the chamber having the prepared surface.

In some variations, the kit may further include a disengagement reagent, and optionally, where the disengagement reagent may be a peptidase. The peptidase may be a trypsin or a trypsin-like peptidase.

In some variations, the kit may further include an export medium. The export medium may be a serum-free medium.

In another aspect, a method of repositioning a micro-object is provided, wherein the micro-object is disposed in a chamber of a microfluidic device, the chamber having an opening to a flow region of the microfluidic device, the method including: directing a pulse of laser illumination upon a first position on an inner surface of the chamber; directing laser illumination upon a second position on the inner surface of the chamber to generate an illumination area, the second position being different than the first position; and moving the laser illumination relative to the microfluidic device, thereby changing the position of the illumination area to a third position on the inner surface of the chamber, where the change in the position of the illumination area induces (or contributes to) the repositioning of the micro-object. In some embodiments, the third position of laser illumination may be proximal to the opening of the chamber.

In some variations, the moving of the laser illumination may controllably generate a bubble having a trajectory within the chamber, where the bubble and its trajectory induces (or contributes to) the repositioning of the micro-object. In some embodiments, the repositioning of the micro-object may move the micro-object towards the opening of the chamber. In some embodiments, the repositioning of the micro-object may result in the micro-object being exported from the chamber into the flow region.

In some variations, the method may further include applying a dynamic dielectrophoretic force to the micro-object, where the dynamic dielectrophoretic force may be moved at least in part toward the opening of the chamber. In some variations, the dynamic dielectrophoretic force may be applied to the micro-object prior to directing the pulse of laser illumination upon the first position. In some variations, the dynamic dielectrophoretic force may be applied to the micro-object after directing the pulse of laser illumination upon the first position and before directing the laser illumination upon the second position and moving the laser illumination. In some embodiments, the dynamic dielectrophoretic force may contribute to the repositioning of the micro-object.

In some embodiments, the chamber may include a single opening to the flow region. In some variations, the flow region may be configured to contain a first fluidic medium and the chamber includes a sequestration pen including: an isolation region for containing a second fluidic medium, the isolation region having a single opening; and a connection region fluidically connecting the isolation region to the flow region, where the isolation region of the microfluidic sequestration pen is an unswept region of the micro-fluidic device. In some variations, prior to being repositioned, the micro-object may be disposed within the isolation region of the sequestration pen. In some variations, the first position of laser illumination on the inner surface of the chamber may be in or proximal to the connection region. In some embodiments, the second position of illumination may be in the isolation region of the sequestration pen. In some variations, the third position of laser illumination may be in or proximal to the connection region of the sequestration pen.

In some variations, the sequestration pen may further include a hook region. In some embodiments, the first position of laser illumination on the inner surface of the chamber may be in or proximal to the hook region of the sequestration pen. In some embodiments, the third position of laser illumination may be proximal to the hook region. In some embodiments, the third position of laser illumination may be closer to the connection region than the second position of laser illumination.

In some variations, the change in the position of the laser illumination may occur at a fixed rate, creating a path of laser illumination between the starting position and the ending position. In some embodiments, the change in the position of the illumination area may occur with constant illumination.

In some embodiments, the micro-object may be a biological cell; the repositioning of the micro-object may result in the micro-object being exported from the chamber into the flow region; and the method may further include: exporting the biological cell from the flow region and out of the microfluidic device to a culturing vessel, where the biological cell may have a probability of viability of at least 80% upon further culturing. In some variations, the biological cell is a plurality of biological cells and exporting may include exporting at least 9, 10, 15, or 20 biological cells out of the microfluidic device to the culturing vessel. In some embodiments, the biological cell may be a non-adherent biological cell.

In some variations, changing the position of the laser illumination may be performed at less than 70 microns/sec when the micro-object is a biological cell that is a non-adherent cell. In some embodiments, changing the position of the laser illumination may be performed at 50 microns/sec when the micro-object is a biological cell that is a non-adherent cell.

In some variations, the illumination area is greater than or equal to a circular area including a diameter of 5 um. In some other variations, the illumination area may be equivalent to a circular area including a diameter from 5 um to 50 um.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 6A is a schematic representation of aspirated fluid introduction into channels of a microfluidic device from the outlet port using reduced pressure at an inlet port of the microfluidic device according to some embodiments of the disclosure.

FIG. 6B is a schematic representation of fluid introduction into channels of a microfluidic device under positive pressure from the inlet port using reduced pressure at the inlet port of the microfluidic device according to some embodiments of the disclosure FIG. 7 is a graphical representation of regioselective channel surface modification according to some embodiments of the disclosure.

FIG. 9A to 9B are schematic representations of preparation for exportation of cells from a sequestration pen of a microfluidic device according to some embodiments of the disclosure.

FIGS. 10A to 10B are photographic representations of sequestration pens before and after an export preparation process prior to exporting cells according to some embodiments of the disclosure.

FIGS. 11A to 11E are photographic representations over a forty-five minute period illustrating an export preparation process prior to exporting cells according to some embodiments of the disclosure.

FIGS. 12A to 12B are schematic representations of laser illumination paths for partial exports of cells from a sequestration pen in a microfluidic device according to some embodiments of the disclosure.

FIGS. 12C to 12D are schematic representations of laser illumination paths for full exports of cells from a sequestration pen in a microfluidic device according to some embodiments of the disclosure.

FIGS. 14A to 14B are photographic representations of non-adherent cells having some aggregated behavior before (FIG. 14A) and after (FIG. 14B) dissociation according to some embodiments of the disclosure.

FIG. 15 is a graphical representation of two measures of viability compared to the number of cells exported according to some embodiments of the disclosure.

FIGS. 24A to 24C are photographic representations of extracted cells and subsequent viability in further culturing according to some embodiments of the disclosure.

DETAILED DESCRIPTION

Figure 1A:
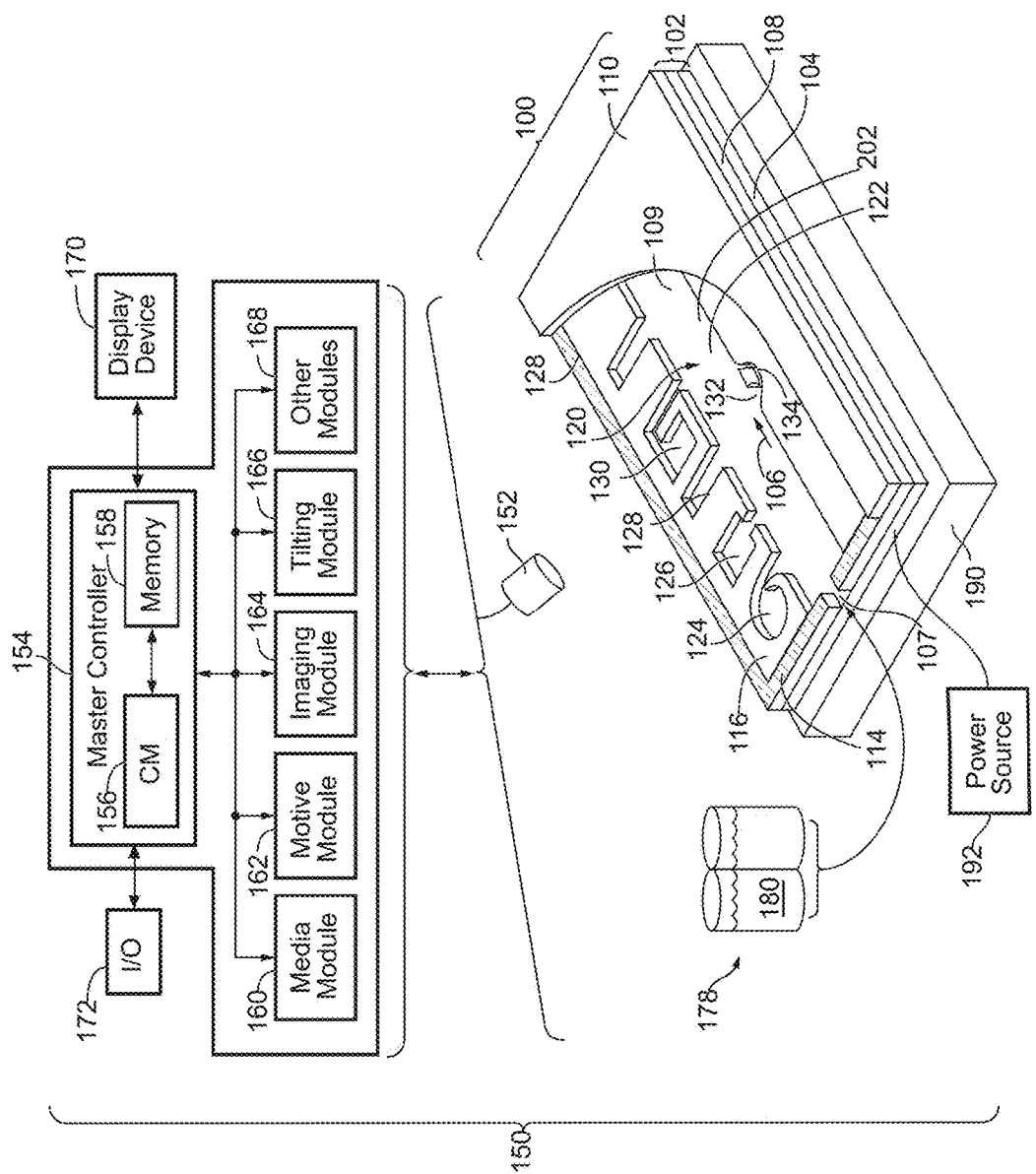
FIG. 1A illustrates a microfluidic device and a system with associated control equipment according to some embodiments of the disclosure.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "P".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Where dimensions of microfluidic features are described as having a width or an area, the dimension typically is described relative to an x-axial and/or y-axial dimension, both of which lie within a plane that is parallel to the substrate and/or cover of the microfluidic device. The height of a microfluidic feature may be described relative to a z-axial direction, which is perpendicular to a plane that is parallel to the substrate and/or cover of the microfluidic device. In some instances, a cross sectional area of a microfluidic feature, such as a channel or a passageway, may be in reference to a x-axial/z-axial, a y-axial/z-axial, or an x-axial/y-axial area.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein: μm means micrometer, $μm^3$ means cubic micrometer, pL means picoliter, nL means nanoliter, and μL (or uL) means microliter.

As used herein, the term "disposed" encompasses within its meaning "located."

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow path(s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 μL. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 microliters. The microfluidic circuit may be configured to have a first end fluidically connected with a first port (e.g., an inlet) in the microfluidic device and a second end fluidically connected with a second port (e.g., an outlet) in the microfluidic device.

As used herein, a "nanofluidic device" or "nanofluidic apparatus" is a type of microfluidic device having a microfluidic circuit that contains at least one circuit element configured to hold a volume of fluid of less than about 1 μL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 pL to 1 nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, one or more (e.g., all) of the at least one circuit elements are configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

A microfluidic device or a nanofluidic device may be referred to herein as a "microfluidic chip" or a "chip"; or "nanofluidic chip" or "chip".

A "microfluidic channel" or "flow channel" as used herein refers to flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is about 100,000 microns to about 500,000 microns, including any value therebetween. In some embodiments, the horizontal dimension is about 100 microns to about 1000 microns (e.g., about 150 to about 500 microns) and the vertical dimension is about 25 microns to about 200 microns, (e.g., from about 40 to about 150 microns). It is noted that a flow channel may have a variety of different spatial configurations in a microfluidic device, and thus is not restricted to a perfectly linear element. For example, a flow channel may be, or include one or more sections having, the following configurations: curve, bend, spiral, incline, decline, fork (e.g., multiple different flow paths), and any combination thereof. In addition, a flow channel may have different cross-sectional areas along its path, widening and constricting to provide a desired fluid flow therein. The flow channel may include valves, and the valves may be of any type known in the art of microfluidics. Examples of microfluidic channels that include valves are disclosed in U.S. Pat. Nos. 6,408,878 and 9,227,200, each of which is herein incorporated by reference in its entirety.

As used herein, the term "transparent" refers to a material which allows visible light to pass through without substantially altering the light as is passes through.

As used herein, "brightfield" illumination and/or image refers to white light illumination of the microfluidic field of view from a broad-spectrum light source, where contrast is formed by absorbance of light by objects in the field of view.

As used herein, "structured light" is projected light that is modulated to provide one or more illumination effects. A first illumination effect may be projected light illuminating a portion of a surface of a device without illuminating (or at least minimizing illumination of) an adjacent portion of the surface, e.g., a projected light pattern, as described more fully below, used to activate DEP forces within a DEP substrate. When using structured light patterns to activate DEP forces, the intensity, e.g., variation in duty cycle of a structured light modulator such as a DMD, may be used to change the optical power applied to the light activated DEP actuators, and thus change DEP force without changing the nominal voltage or frequency. Another illumination effect that may be produced by structured light includes projected light that may be corrected for surface irregularities and for irregularities associated with the light projection itself, e.g., fall-off at the edge of an illuminated field. Structured light is typically generated by a structured light modulator, such as a digital mirror device (DMD), a microshutter array system (MSA), a liquid crystal display (LCD), or the like. Illumination of a small area of the surface, e.g., a selected area of interest, with structured light improves the signal-to-noise-ratio (SNR), as illumination of only the selected area of interest reduces stray/scattered light, thereby lowering the dark level of the image. An important aspect of structured light is that it may be changed quickly over time. A light pattern from the structured light modulator, e.g., DMD, may be used to autofocus on difficult targets such as clean mirrors or surfaces that are far out of focus. Using a clean mirror, a number of self-test features may be replicated such as measurement of modulation transfer function and field curvature/tilt, without requiring a more expensive Shack-Hartmann sensor. In another use of structured light patterns, spatial power distribution may be measured at the sample surface with a simple power meter, in place of a camera. Structured light patterns may also be used as a reference feature for optical module/system component alignment as well used as a manual readout for manual focus. Another illumination effect made possible by use of structured light patterns is selective curing, e.g., solidification, of hydrogels within the microfluidic device.

As used herein, the "clear aperture" of a lens (or lens assembly) is the diameter or size of the portion of the lens (or lens assembly) that can be used for its intended purpose. In some instances, the clear aperture can be substantially equal to the physical diameter of the lens (or lens assembly). However, owing to manufacturing constraints, it can be difficult to produce a clear aperture equal to the actual physical diameter of the lens (or lens assembly).

As used herein, the term "active area" refers to the portion of an image sensor or structured light modulator that can be used, respectively, to image or provide structured light to a field of view in a particular optical apparatus. The active area is subject to constraints of the optical apparatus, such as the aperture stop of the light path within the optical apparatus. Although the active area corresponds to a two-dimensional surface, the measurement of active area typically corresponds to the length of a diagonal line through opposing corners of a square having the same area.

As used herein, an "image light beam" is an electromagnetic wave that is reflected or emitted from a device surface, a micro-object, or a fluidic medium that is being viewed by an optical apparatus. The device can be any microfluidic device as described herein. The micro-object and the fluidic medium can be located within such a microfluidic device.

As used herein, an "illumination area" is a region of illumination detected at a surface of the chip. For example, the illumination area can be incident upon a base (e.g., a substrate surface) or a surface of a cover. In some instances, the illumination area will not be incident upon a surface of a wall or wall material. The illumination area may have an area that is greater than or equal to a circular area comprising a diameter of 5 um, or may have an area equivalent to the area of a circle comprising a diameter from about 5 microns to about 50 microns. In some variations, the illumination area may have an area equivalent to a circle having a diameter of about 10 microns, about 25 microns, about 30 microns, about 35 microns, about 40 microns, about 45 microns, or about 50 microns. The illumination area can have any of a variety of shapes, including a circular shape, an ellipsoidal shape, a polygonal shape (e.g., triangular, square, rectangular, rhomboid, trapezoidal, pentagonal, hexagonal, heptagonal, octagonal, etc.), or an irregular shape (e.g., a composite shape formed from a combination of circular/ellipsoidal and polygonal shapes).

As used herein, the term "micro-object" refers generally to any microscopic object that may be isolated and/or manipulated in accordance with the present disclosure. Non-limiting examples of micro-objects include: inanimate micro-objects such as microparticles; microbeads (e.g., polystyrene beads, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins, carbohydrates, antigens, small molecule signaling moieties, or other chemical/biological species capable of use in an assay. Lipid nanorafts have been described, for example, in Ritchie et al. (2009) "Reconstitution of Membrane Proteins in Phospholipid Bilayer Nanodiscs," Methods Enzymol., 464:211-231.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

As used herein, "attachment-dependent cell" or "adherent cell" refers to cells that are dependent upon anchorage to another cell or structure for optimal viability and growth. Adhesion of the attachment-dependent cell triggers one or more intracellular signaling pathways implicated in a number of processes including growth. Attachment-dependent cells under an in-vitro culturing environment at least initially need adherence to a substrate that presents features that can substitute for the moieties that are generally present upon the extracellular matrix of cells, and typically is referred to as an adherent culturing condition. A majority of cells derived from vertebrates are attachment-dependent. This is in contrast to cell types which may grow floating in the culture medium, i.e., a suspension culture. Some vertebrate cell types such as hematopoietic cell lines and immortalized cell lines are not attachment dependent, and a number of attachment-dependent vertebrate cells may be adapted to grow suitably under suspension culture conditions. A cell that may grow in suspension are referred to herein as a "non-adherent cell".

A colony of biological cells is "clonal" if all of the living cells in the colony that are capable of reproducing are daughter cells derived from a single parent cell. In certain embodiments, all the daughter cells in a clonal colony are derived from the single parent cell by no more than 10 divisions. In other embodiments, all the daughter cells in a clonal colony are derived from the single parent cell by no more than 14 divisions. In other embodiments, all the daughter cells in a clonal colony are derived from the single parent cell by no more than 17 divisions. In other embodiments, all the daughter cells in a clonal colony are derived from the single parent cell by no more than 20 divisions. The term "clonal cells" refers to cells of the same clonal colony.

As used herein, a "colony" of biological cells refers to 2 or more cells (e.g. about 2 to about 20, about 4 to about 40, about 6 to about 60, about 8 to about 80, about 10 to about 100, about 20 to about 200, about 40 to about 400, about 60 to about 600, about 80 to about 800, about 100 to about 1000, or greater than 1000 cells).

As used herein, the term "maintaining (a) cell(s)" refers to providing an environment comprising both fluidic and gaseous components and, optionally a surface, that provides the conditions necessary to keep the cells viable and/or expanding.

As used herein, the term "expanding" when referring to cells, refers to increasing in cell number.

As used herein, the term "split export" when referring to processes of exporting micro-objects such as biological cells or micro-objects, refers to export from a region or a chamber of a microfluidic device of a portion of a plurality of micro-objects that is less than all of the plurality of micro-objects disposed within the region or chamber. A split export may be accomplished in 2, 3, 4 or more different exporting actions, to export the micro-objects in the region or chamber. In one embodiment, a split export may have a first export action and a second export action, where greater than or equal to: about 5%, about 10%, about 20%, about 30%, about 40, about 50%, about 60%, or about 70% of the plurality of micro-objects may be exported in the first export and the remainder of the plurality of micro-objects (e.g., the remainder of the plurality of micro-objects that are able to be exported) may be exported in the second export of the split export. In some variations, the second export of a split export may be subsequently performed at a time point greater than or equal to about 4 hours, about 8 hours, about 12 hours, about 24 hours, about 48 hours, about 72 hours, about 1 day, about 2 days, or about 4 days after the first export of the split export has been performed. When the micro-objects are biological cells, the remainder of cells remaining within the region or chamber after the first split export may be maintained under culturing conditions to maintain the remaining cells as viable cells and may further include expanding the remaining cells. The first export of the split export may export a number of micro-objects, said number of micro-objects can comprise greater than or equal to about 1, about 2, about 3, about 5, about 6, about 7, about 8, about 9, about 10, about 15, about 20 micro-objects.

As used herein, a "peptidase" is an enzyme that breaks peptide bonds in compounds such as proteins by hydrolysis of peptide bonds. The hydrolysis of peptide bonds in proteins typically yields amino acids and/or smaller protein fragments.

As used herein, "adhesive binding motif" refers to short peptide sequences capable of binding to cell surface adhesion receptors, such as integrin receptors, and initiating the intracellular signaling pathways implicated in adhesion. As an example, the extracellular matrix (ECM) protein fibronectin (FN) contains a well-known sequence Arg-Gly-Asp (or RGD) that can support cellular adhesion even when isolated from the larger FN protein. Also present in fibronectin is the sequence Leu-Asp-Val (or LDV), which may be used as an adhesive binding motif. Other sequences that support cellular adhesion include the Ile-Lys-Val-Ala-Val (or IKVAV; SEQ ID NO: 1) and Tyr-Ile-Gly-Ser-Arg (or YIGSR; SEQ ID NO: 2) adhesive binding motifs found in laminin, another ECM protein. The adhesive binding motif may consist of or comprise these cell surface binding sequences.

As used herein, "capture moiety" is a chemical or biological species, functionality, or motif that provides a recognition site for a micro-object. A selected class of micro-objects may recognize the capture moiety and may bind or have an affinity for the capture moiety. Non-limiting examples include antigens, antibodies, and cell surface binding motifs.

A "component" of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result.

The phrase "substantially no flow" refers to a rate of flow of a fluidic medium that, averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the microfluidic device.

As used herein, a "flow path" refers to one or more fluidically connected circuit elements (e.g. channel(s), region(s), chamber(s) and the like) that define, and are subject to, the trajectory of a flow of medium. A flow path is thus an example of a swept region of a microfluidic device. Other circuit elements (e.g., unswept regions) may be fluidically connected with the circuit elements that comprise the flow path without being subject to the flow of medium in the flow path.

As used herein, "isolating a micro-object" confines a micro-object to a defined area within the microfluidic device.

A microfluidic (or nanofluidic) device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a micro-fluidic device is an example of a swept region while an isolation region (described in further detail below) of a microfluidic device is an example of an unswept region.

The capability of biological micro-objects (e.g., biological cells) to produce specific biological materials (e.g., proteins, such as antibodies) can be assayed in such a microfluidic device. In a specific embodiment of an assay, sample material comprising biological micro-objects (e.g., cells) to be assayed for production of an analyte of interest can be loaded into a swept region of the microfluidic device. Ones of the biological micro-objects (e.g., mammalian cells, such as human cells) can be selected for particular characteristics and disposed in unswept regions. The remaining sample material can then be flowed out of the swept region and an assay material flowed into the swept region. Because the selected biological micro-objects are in unswept regions, the selected biological micro-objects are not substantially affected by the flowing out of the remaining sample material or the flowing in of the assay material. The selected biological micro-objects can be allowed to produce the analyte of interest, which can diffuse from the unswept regions into the swept region, where the analyte of interest can react with the assay material to produce localized detectable reactions, each of which can be correlated to a particular unswept region. Any unswept region associated with a detected reaction can be analyzed to determine which, if any, of the biological micro-objects in the unswept region are sufficient producers of the analyte of interest.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Laser assisted repositioning of micro-objects. A micro-object such as a biological cell, a daughter cell thereof, or a bead may be repositioned in a local environment, such as within a microfluidic device by a number of forces, forces can include but are not limited to gravity, fluidic flow induced by a mechanical pump, magnetic forces (e.g., for magnetic beads or cells labeled with magnetic particles/beads) electrowetting and/or dielectrophoresis (DEP). In order to more effectively reposition micro-objects from one location (e.g. a specific location where the micro-objects may have been cultured, maintained, or disposed within a microfluidic device) to another location (e.g. another area of the same microfluidic device or a separate device such as a multiwell plate), varying force vectors may be applied to achieve micro-object translocation. While dielectrophoresis (DEP), fluid displacement, and the like may be sufficient to move micro-objects in the desired manner, forces applied at different scale (e.g., a more powerful force or a more localized force), in different ways (convective forces, shear flow forces, impacting forces such as cavitation or contact with a meniscus of a bubble, or any combination thereof) and/or on different timescales (e.g., from milliseconds to minutes in duration) may also be employed to assist in moving micro-objects from a starting position and/or to an ending position.

In one non-limiting example, application of forces other than DEP may be useful to move micro-objects such as biological cells (which may include attachment-dependent cells or non-adherent cells) or beads which have been cultured/maintained/disposed within a microfluidic device for a period of time. The micro-objects may have become attached or aggregated to a surface of the microfluidic device such that DEP forces or gravity alone may not be sufficient to move the micro-objects from the attached or aggregated position. Therefore, forces having other characteristics may be useful in dislodging one or more biological cells for which DEP forces alone are not sufficient or where gravity or mechanically pumped fluidic flow cannot selectively and/or sufficiently dislodge a selected micro-object.

It has been surprisingly found that illumination of discrete selected regions on or within a microfluidic device using a coherent light source (e.g., a laser) can heat a portion of a fluidic medium within the microfluidic circuit of the microfluidic device to provide displacement or dislodgement force differing in scale, physical type and/or timescale from DEP, fluidic flow, gravity, etc., which are capable of repositioning micro-objects (including but not limited to biological cells and/or beads) and/or mixing fluidic media (which may contain micro-objects including biological cells) within the microfluidic device. The laser illumination may be directed upon a starting position of an inner surface of the microfluidic device, to generate an illumination area, thereby heating the portion of fluidic medium at the illumination area, controllably creating a bubble that displaces or dislodges the micro-objects, repositioning at least a portion of them. The repositioning of micro-objects may displace micro-objects from the adhesive or aggregated condition which did not permit forces like DEP, gravity, and in some cases, fluidic flow to operate successfully upon the micro-objects to, for example, reposition micro-objects from one region of a microfluidic device to another, extract the micro-objects from a chamber of a microfluidic device to reposition the micro-objects within a flow region of the microfluidic device, and/or export the micro-objects from the microfluidic device. The laser illumination may be directed upon an inner surface of a sub-region of a region or chamber of a microfluidic device containing micro-objects therein. In some variations, the position of the laser illumination may be changed, e.g., moved relative to the microfluidic device directed upon an ending position located at an inner surface of the microfluidic device, wherein the change in position of the laser illumination can induce the repositioning of the micro-object(s). Typically, the ending position of the laser illumination may be different from the starting position, but it need not be. The change in position of the laser illumination thereby changes the position of the illumination area, inducing repositioning of the micro-object(s). In some variations, repositioning a micro-object may include repositioning the micro-object at least towards an opening of a chamber to a flow region within the microfluidic device. Repositioning may include exporting the micro-object from a region of a microfluidic device or a chamber of a microfluidic device out of that region or chamber to a different region of the microfluidic device or to a location within a flow region of the microfluidic device.

The laser illumination may locally heat the surrounding cell media (i.e. fluidic medium), thereby increasing the local vapor pressure to create a vapor-fluid interface that produces a bubble. Bubble generation may be much more efficient at a liquid-chip interface than a gas-chip interface, to controllably produce a dislodging or displacing force to reposition a micro-object. Additional laser pulses at the same location of an existing bubble may not appreciably grow the bubble further, when the laser illumination is directed to the spot continually. Accordingly, when the laser illumination area is moved, change in the position of the laser illumination may controllably generate a bubble having a trajectory within the chamber such that the generated bubble induces the repositioning of the micro-object at least in part towards a desired location, such as an opening of a chamber within the microfluidic device. When the laser is moved at speeds described below, there is a constant liquid-chip interface for bubble generation which may coalesce with a previously generated bubble, so a bubble may be generated along a path over a period of time. Since the net time of bubble generation is the sum of the time of laser illumination along its path upon an inner surface of the microfluidic device, and not just a short pulse, a much larger bubble may be generated. Since the bubble may be generated in a specific trajectory and over a longer period of time, a larger, more sustained, and better controlled force with a directional component is created which improves movement and export of micro-objects.

Therefore, in some variations, the laser illumination may not be maintained at a stationary point (i.e., a single targeted point) during the laser illumination. The laser illumination (and resultant laser illumination area) may be moved along the selected inner surface of the microfluidic device during the entire period of time that it is activated. The bubble can be grown until it is thermodynamically favorable to stabilize and persist in the fluidic medium. The bubble may then displace the surrounding liquid phase and thereby dislodge the cells. Alternatively, as the bubble moves, the meniscus of the bubble may contact the micro-object(s) and dislodge them from the surface. In some variations, both a static laser illumination (laser illumination or pulse maintained at the same point throughout the duration of the pulse) and a dynamic laser illumination (e.g., laser illumination or pulse having a starting position and an ending position, which are not the same position) may be employed as part of a laser-assisted bubble repositioning method. One non-limiting example is shown in Example 2 and described in reference to FIGS. 17, 18, 19, 21, 22. In other variations, more than one laser illumination may be used in the process of extracting (e.g., unpenning) a micro-object from a region or a chamber of the microfluidic device.

In some variations, both a single biological cell and a non-living micro-object may be present within the same region or chamber (e.g., sequestration pen) and laser-assisted bubble dislodgement methods may be employed to reposition and eventually export only one of the two different types of micro-objects. For example, in some variations, it may be desired to export a bead from a chamber, while leaving the biological cell (or the lysed remains thereof) behind. In other variations, a biological cell may be repositioned and eventually exported from a region or chamber, leaving the bead behind. In alternate variations, a plurality of biological cells and a single non-living micro-object may be present within the same region or chamber (e.g., sequestration pen) and laser-assisted bubble dislodgement methods may be employed to reposition and/or eventually export a portion of the biological cells, a single biological cell, and/or the single non-living micro-object. In instances where a single biological cell and a plurality of non-living micro-objects are present within the same region or chamber (e.g., sequestration pen), laser-assisted bubble dislodgment methods may be employed to reposition and/or eventually export a single biological cell, a single non-living micro-object, and/or the plurality of non-living micro-objects.

Viability and Efficiency. Importantly, when the micro-object(s) being repositioned and/or eventually exported include biological cell(s), these methods of repositioning provide that at least a portion of the biological cells so repositioned are still viable. The generation of such repositioning forces may be applied more than once at the same discrete selected region or adjacent thereto (e.g. close to the micro-objects), such that repeated force can be applied to reposition micro-objects and/or to mix media (which may include micro-objects), while being sufficiently non-destructive towards the micro-objects. Laser-assisted bubble repositioning of biological cells may be employed as part of export processes where biological cells may be extracted from a region or a chamber (e.g., such as a sequestration pen), exported out of a flow region and out of the microfluidic device, for delivery to a well of an export well plate, where the biological cell may be cultured and/or expanded further. In some variations, the biological cell may have a probability of viability of at least about 20%, about 30%, about 35%, about 40%, about 45%, about 50%, about 55%, about 60%, about 65%, about 70%, about 75%, about 80%, about 85%, about 90%, about 95%, or about 100%. The probability of viability may be dependent upon the number of biological cells exported per sequestration pen, as discussed in detail in Experiments 1 and 2, and for FIG. 15 below. In some variations, more than about 1, about 2, about 5, about 6, about 7, about 9, about 10, about 12, about 14, about 15, about 17, about 20 cells or more may be repositioned by the laser-assisted bubble methods described herein, and may be successfully exported and cultured. In some variations, the biological cell exported after laser-assisted bubble repositioning may have a probability of viability of at least about 60% upon further culturing. The biological cell having the probability of viability of at least 60% upon further culturing may have been exported within a group of at least 5, 6, 7, 9, 10, 15, 20 or more biological cells from a chamber (e.g., a sequestration pen). The biological cell having the probability of viability of at least 60% upon further culturing may be an attachment-dependent (e.g., adherent) cell, or alternatively may be a non-adherent cell. The biological cell having the probability of viability of at least 60% upon further culturing may have been exported in a single export (e.g., all cells that are possibly exportable are exported in the same export process which may include both DEP and laser-assisted bubble processes); a first export of a split export process or may have been exported in a second export of a split-export process. In some other variations, the biological cell exported after laser-assisted bubble repositioning may have a probability of viability of at least about 80% upon further culturing. The biological cell having the probability of viability of at least 80% upon further culturing may have been exported within a group of at least 5, 6, 7, 9, 10 or 20 biological cells from a chamber (e.g., a sequestration pen). In some variations, the biological cell having the probability of viability of at least 80% upon further culturing may have been exported within a group of at least 9, 10, 15 or 20 biological cells from a chamber (e.g., a sequestration pen). The biological cell having the probability of viability of at least 80% upon further culturing may have been exported within a group of at least 5 or at least 9 biological cells from a chamber. The biological cell having the probability of viability of at least 80% upon further culturing may be an attachment-dependent (e.g., adherent) cell. Alternatively, the biological cell having the probability of viability of at least 80% upon further culturing may be a non-adherent cell. The biological cell having the probability of viability of at least 80% upon further culturing may have been exported in a single export (e.g., all cells that are possibly exportable are exported in the same export process which may include both DEP and laser-assisted bubble processes); a first export of a split export process or may have been exported in a second export of a split-export process.

The efficiency of extraction of micro-objects (e.g., biological cell or beads) from a region or a chamber (e.g., a sequestration pen) may be the probability of extracting the number of micro-objects from the region or chamber of a number of micro-objects as set by the user. For example, if the user has set an unpen number of at least 5 micro-objects from the region or chamber of a microfluidic device, the efficiency is the percentage (probability) of exports (e.g., from each sequestration pen of a field of view of a microfluidic device or all sequestration pens of a microfluidic device) that export at least 5 micro-objects as selected by the user. As discussed in detail below in Experiments 1 and 2, efficiencies of greater than about 80%, about 85%, about 90%, about 91%, about 92%, about 93%, about 94%, about 95% or more (e.g., 100%) may be obtained when employing variations of laser-assisted bubble displacement/dislodgement methods described herein, which may further include DEP assisted actions as well.

Regions of the microfluidic device to which laser illumination may be directed. The laser illumination may be directed upon an inner surface of a base of the microfluidic device, an inner surface of a cover of the microfluidic device (e.g., a cover of a chamber of the microfluidic device), an inner surface of a flow region of the microfluidic device (including a microfluidic channel of the flow region), or an inner surface of a chamber within the microfluidic device, each of which may be a sub-region of a region or a chamber containing micro-objects. The microfluidic device may further have one or more inlets through which the first medium can be input into the flow region; and one or more outlets through which the first medium can be removed from the flow region. In other variations, the microfluidic device may further have a single inlet through which the first medium can be input into the flow region; and a single outlet through which the first medium can be removed from the flow region. The base and the cover of the microfluidic device along with a microfluidic circuit structure disposed on the base, may collectively define the chamber. In some embodiments, the microfluidic circuit structure and the cover may be an integral structure of the microfluidic device, while in some other embodiments the microfluidic circuit structure and the cover may be separate structures. In some variations, the inner surface of the chamber (e.g., sequestration pen) may include a surface coating, which may be any surface coating as described herein. In some variations, the surface coating may promote adhesion of an attachment dependent biological cell. The surface coating, in some variations, may include a mixture of surface modifying ligands. In some variations, the mixture of surface modifying ligands may include a peptide having an adhesive binding motif, which may be any adhesive binding motif, such as, but not limited to an RGD motif, as described herein. In other variations, at least one of the surface modifying ligands does not promote adhesion. The mixture of surface modifying ligands may include a mixture of adhesion promoting ligands and non-adherent ligands (e.g., PEG containing ligands having no adhesive binding motifs) having a ratio from 0:100 to 10:90 m/m (molar/molar) or 0.1:99.9 m/m. For example, if the micro-objects include adherent cells, the mixture of surface modifying ligands may have a mixture of adhesion promoting ligands and non-adherent ligands in a ratio of about 1:99; 2:98; 3:97; 4:96; 5:95; 6:94; 7:93:8:92; 9:91 or 10:90 m/m. If the micro-objects include non-adherent cells or beads, the mixture of surface modifying ligands may have a ratio of adhesion promoting ligands and non-adherent ligands in a ratio of about 0:100 m/m, e.g., less than 1:99 m/m or no adhesion promoting ligands at all. In some further variations, none of the surface modifying ligands promote adhesion.

For the microfluidic device having a chamber, the microfluidic device may further include a flow region for containing a first liquid medium, and the chamber may open to the flow region. The chamber may contain a second liquid medium, which may be the same or different from the first liquid medium in the flow region. The chamber may have one or more openings to the flow region and/or microfluidic device, where optionally, one or more of the openings may be valved. When micro-object(s) within the chamber are repositioned by the laser illumination, repositioning may result in the micro-object(s) moving toward the flow region of the microfluidic device (e.g., closer to an opening of the chamber to the flow region). In some embodiments, repositioning of the micro-object(s) may result in the micro-object(s) being exported from the chamber into the flow region of the microfluidic device.

The chamber of the microfluidic device may also be a sequestration pen, and may have any feature of any sequestration pen described herein. In some variations, the chamber may be a sequestration pen including an isolation region for containing a second fluidic medium, the isolation region having a single opening; and a connection region fluidically connecting the isolation region to the flow region, where the isolation region of the microfluidic sequestration pen is an unswept region of the micro-fluidic device. In some embodiments, the laser illumination may be directed upon an inner surface of a base of the sequestration pen. The isolation region of the sequestration pen may contain a second fluidic medium. The isolation region may have a single opening; and a connection region fluidically connecting the isolation region to the flow region (or a microfluidic channel thereof), where the isolation region of the microfluidic sequestration pen is an unswept region of the micro-fluidic device. The isolation region is configured to enable substantially only diffusive fluidic communication between the flow region/microfluidic channel (e.g., a swept region) and the isolation region (e.g., an unswept region). The connection region of the sequestration pen may have a proximal opening into the flow region/microfluidic channel having a width $W_{on}$ ranging from about 20 microns to about 100 microns, or about 20 microns to about 500 microns and a distal opening into the isolation region of the sequestration pen, and may further have a length $L_{con}$ of the connection region from the proximal opening to the distal opening that may be at least 1.0 times a width $W_{con}$ of the proximal opening of the connection region. In some embodiments, the length $L_{con}$ of the connection region from the proximal opening to the distal opening that may be at least 1.5 times a width $W_{con}$ of the proximal opening of the connection region In various embodiments, the micro-object(s) which are repositioned by the laser illumination are disposed within the isolation region of the sequestration pen. The proximal opening of the connection region of the sequestration pen may open laterally to the flow region/microfluidic channel. That is, the inner surface of the base of the sequestration pen may be co-planar with an inner surface or the inner surface of a base of the flow region or the inner surface of the base of the microfluidic channel. The microfluidic device may further include a plurality of chambers (e.g., sequestration pens), each of which may contain at least one micro-object, and repositioning the micro-object may further include repositioning at least one micro-object from at least a subset of the plurality of chambers, and may further optionally include exporting the at least one micro-object from the subset of the plurality of chambers out of the microfluidic device. Export may be performed sequentially or substantially contemporaneously.

Laser illumination may be directed upon an inner surface of the microfluidic device at which the laser illumination is optimally focused or it may be directed upon an inner surface which the laser illumination is incident upon or directed through without being optimally focused thereupon.

The laser illumination may be directed upon a base or a cover of the microfluidic device or chamber thereof. The laser illumination may be transmitted through a transparent, substantially transparent, and/or translucent cover or base of the enclosure of the microfluidic device. In various embodiments, the laser illumination is not directed upon or at an inner surface of a wall of a chamber (e.g., the surface facing the interior space of the chamber) of the microfluidic device. The laser illumination may be incident upon more than one surface of the microfluidic device including that of the chamber of the microfluidic device, and thus the illumination may be absorbed by more than one surface, such as both the surface of the cover and the surface of the base. Some of the illumination may also be absorbed by media (including water and any solutes) present in the microfluidic device or chamber thereof. Thus, directing laser illumination upon a first position located at an inner surface of the chamber does not preclude the laser illumination from being incident upon other surfaces and materials located within the chamber, nor does it require that the first position is the primary point of absorption of the laser illumination within the chamber. In some instances, the laser illumination may be directed upon a base, inner surface, and/or cover of the microfluidic device without illuminating the walls of the microfluidic device.

Laser Illumination Characteristics. The coherent light source may be a laser characterized by a single wavelength (e.g., a red wavelength, such as 662 nm) or a range of wavelengths in (e.g., 720-1060 nm). A coherent light source may be a laser in the visible light spectrum (e.g., 380-700 nm), or may be a laser characterized by a wavelength in the infrared part of the spectrum (e.g., 700 nm-1 mm), or may be a laser having any other suitable wavelength or range of wavelengths. Without being bound by theory, the incident laser illumination may be transmitted through a transparent, substantially transparent, and/or translucent cover or base of the enclosure microfluidic device. After being transmitted through the cover or base of the enclosure, the incident illumination can be transmitted to the inner surface of the microfluidic device and intervening fluidic media, as described herein, which is configured to convert the laser illumination to thermal energy.

Temperature gradients introduced by the laser illumination may be modulated by increasing or decreasing the intensity of the laser illumination or by increasing or decreasing the period of time that the laser illumination is directed at a specific location. The intensity of the laser illumination may be modulated by increasing or decreasing the power of the laser. The laser illumination may have a power in a range from about 1 milliwatts to about 2500 milliwatts, as input into the optical train of the system, but is not limited to this range. In some embodiments, the power of the coherent light may be in a range of 100 milliwatts to about 2500 milliwatts; about 100 milliwatts to about 2000 milliwatts; about 100 milliwatts to about 1500 milliwatts; about 100 milliwatts to about 1000 milliwatts; about 100 milliwatts to about 750 milliwatts; 100 milliwatts to about 500 milliwatts; about 500 milliwatts to about 2500 milliwatts; about 500 milliwatts to about 2000 milliwatts; about 500 milliwatts to about 1500 milliwatts; about 500 milliwatts to about 1000 milliwatts; about 500 milliwatts to about 750 milliwatts; about 600 milliwatts to about 2500 milliwatts; about 600 milliwatts to about 2300 milliwatts; about 600 milliwatts to about 2100 milliwatts; about 600 milliwatts to about 1900 milliwatts; about 600 milliwatts to about 1700 milliwatts; about 600 milliwatts to about 1500 milliwatts; about 600 milliwatts to about 1300 milliwatts; about 600 milliwatts to about 1100 milliwatts; about 600 milliwatts to about 900 milliwatts; about 700 milliwatts to about 2500 milliwatts; about 700 milliwatts to about 2400 milliwatts; about 700 milliwatts to about 2300 milliwatts; about 700 milliwatts to about 2100 milliwatts; about 700 milliwatts to about 1900 milliwatts; about 700 milliwatts to about 1700 milliwatts; about 700 milliwatts to about 1500 milliwatts; about 700 milliwatts to about 1300 milliwatts; about 700 milliwatts to about 1100 milliwatts; about 800 milliwatts to about 2500 milliwatts; about 800 milliwatts to about 2400 milliwatts; about 800 milliwatts to about 2300 milliwatts; about 800 milliwatts to about 2100 milliwatts; about 800 milliwatts to about 1900 milliwatts; about 800 milliwatts to about 1700 milliwatts; about 800 milliwatts to about 1500 milliwatts; about 800 milliwatts to about 1300 milliwatts; about 800 milliwatts to about 1100 milliwatts; about 1000 milliwatts to about 2500 milliwatts; about 1000 milliwatts to about 2400 milliwatts; about 1000 milliwatts to about 2300 milliwatts; about 1000 milliwatts to about 2100 milliwatts; about 1000 milliwatts to about 1900 milliwatts; about 1000 milliwatts to about 1700 milliwatts; about 1000 milliwatts to about 1500 milliwatts; about 1000 milliwatts to about 1300 milliwatts; about 1200 milliwatts to about 2500 milliwatts; about 1200 milliwatts to about 2400 milliwatts; about 1200 milliwatts to about 2300 milliwatts; about 1200 milliwatts to about 2100 milliwatts; about 1200 milliwatts to about 1900 milliwatts; about 1200 milliwatts to about 1700 milliwatts; about 1200 milliwatts to about 1500 milliwatts; or any range therebetween selected from the above endpoints. Further, the power delivered to the surface of the microfluidic device may be different from the power input to the start of the optical train. To that end, the power of the laser illumination as measured at the outer surface of the microfluidic device may be a range of about 100 milliwatts to about 1500 milliwatts; about 100 milliwatts to about 1300 milliwatts; about 100 milliwatts to about 1000 milliwatts; about 100 milliwatts to about 800 milliwatts; about 100 milliwatts to about 750 milliwatts; about 100 milliwatts to about 600 milliwatts; about 200 milliwatts to about 1500 milliwatts; about 200 milliwatts to about 1300 milliwatts; about 200 milliwatts to about 1000 milliwatts; about 200 milliwatts to about 800 milliwatts; about 200 milliwatts to about 600 milliwatts; about 200 milliwatts to about 400 milliwatts; about 300 milliwatts to about 1500 milliwatts; about 300 milliwatts to about 1300 milliwatts; about 300 milliwatts to about 1000 milliwatts; about 300 milliwatts to about 800 milliwatts; about 300 milliwatts to about 600 milliwatts; about 400 milliwatts to about 1500 milliwatts; about 400 milliwatts to about 1000 milliwatts; about 400 milliwatts to about 800 milliwatts; about 400 milliwatts to about 600 milliwatts; or about 400 milliwatts to about 500 milliwatts;

The power of the laser illumination may also vary with the magnification level of the microscope objective. In some embodiments, when the optical train has a 4× objection, the power for the laser, as measured at the upper surface of the microfluidic device, may be selected to be about 300 mW to about 600 mW or about 400 mW to about 600 mW. To obtain power of about 300 mW to about 600 mW at the surface of the microfluidic device, power of about 700 mW to about 1300 mW is selected for power input to the optical train. To obtain power of about 400 mW to about 600 mW at the surface of the microfluidic device, power of about 1000 mW to about 1300 mW is selected for power input to the optical train. When using a 10× objective, the power for the laser may be selected to be about 1100 mW to 1300 mW, as measured at the upper surface of the microfluidic device. To obtain power of about 1100 mW to about 1300 mW at the surface of the microfluidic device, power of about 2200 mW to about 2400 mW is selected for power input to the optical train. Higher laser power may be selected for higher magnification objectives due to losses in the optical train. In some variations, the laser illumination is maintained at the same power during the entire period of illumination.

Light incident on an internal surface of the microfluidic device, typically a base (or substrate surface) or a cover surface, forms an illumination area. The size of the illumination area, may also be selected according to the dimensions of the region or chamber holding micro-objects to be repositioned. The illumination area (e.g., having a circular area) may be less than or equal to about 200 microns, about 150 microns, about 100 microns, about 90 microns, about 80 microns, about 70 microns, about 60 microns, about 50 microns, about 40 microns, about 30 microns, about 20 microns, about 10 microns, about 5 microns, or any value therebetween. For sequestration pens having a width of about 250 microns, configured similarly to sequestration pen 724 of FIG. 12A (and also shown in FIGS. 8A-8E, 9A-9B, 10A-10B, 11A-11E-12C, 14A-14B, 20A-20E, 23A-23G, and 24A-24C an objective of 4× may typically be used, where the diameter of the laser illumination area may be within a range of 20 microns and 60 microns (e.g., 40 microns) in diameter. For narrower sequestration pens, such as 1024 in FIGS. 12B and 12D (which may have a width of about 50 microns), the objective may be selected to be at higher magnification such as 10×, reducing the diameter of the projected laser illumination diameter to a range of 5 microns and 15 microns (e.g., approximately 10 microns), which may decrease or substantially eliminate damage to the walls of the sequestration pen. However, in some instances a higher laser power may typically be required for higher magnification objectives due to losses in the optical train.

The intensity of the laser illumination may also be modulated by increasing or decreasing the duty cycle of the laser. Hence, the laser illumination may be intermittent, and the laser may have a duty cycle of less than 100% (e.g., about 90%, about 80%, about 70%, about 60%, about 50%, about 45%, about 40%, about 35%, about 30%, about 25%, about 20%, about 15%, about 10%, about 5%, or less).

The effect upon the surrounding fluidic media and/or cell(s) by the heat-induced bubble generation may vary, depending on the duration and configuration of the microfluidic device and/or the target of the illumination. The force vector applied is a function of the energy, duration, and location of laser illumination. Depending on the area to which the illumination is focused, and on the duration of illumination, the power of the coherent light may be less or more than any of the power levels described above. For example, laser pulses with power greater than 750 mW may damage the material of the wall of the chamber if the laser illumination was directed at it. This direct illumination could lead to rapid and non-controllable formation of a gas bubbles. This is avoided by ensuring that the laser spot does not come in contact with the walls of a chamber of the microfluidic device. Bubbles generated by evaporation of the buffer in the pen formed by the local heating of the inner surface of the base of the chamber/microfluidic device upon laser illumination may be more predictable for micro-object repositioning as well as avoiding damage to the integrity of the walls of the chamber/microfluidic device, preventing contamination between segregated populations of cells (e.g., separate clonal populations). The local heating by the laser illumination of the base of a microfluidic device which further includes a substrate having DEP electrodes still permits function of the DEP electrodes, post illumination and repositioning.

The laser illumination may be performed for a period of time, where net time of bubble generation is the sum of the time of laser illumination along its path upon an inner surface of the microfluidic device. The period of laser illumination can range from about 20 msec to about 1500 msec; about 20 msec to about 1000 msec; about 20 msec to about 800 msec; about 20 msec to about 600 msec; about 20 msec to about 400 msec; about 20 msec to about 200 msec; about 20 msec to about 100 msec; about 20 msec to about 50 msec; about 40 msec to about 1500 msec; about 40 msec to about 1000 msec; about 40 msec to about 800 msec; about 40 msec to about 600 msec; about 40 msec to about 400 msec; about 40 msec to about 300 msec; about 40 msec to about 200 msec; about 50 msec to about 1500 msec; about 50 msec to about 1000 msec; about 50 msec to about 800 msec; about 50 msec to about 600 msec; about 50 msec to about 400 msec; about 50 msec to about 200 msec; about 70 msec to about 1500 msec; about 70 msec to about 1000 msec; about 70 msec to about 800 msec; about 70 msec to about 600 msec; about 70 msec to about 400 msec; about 70 msec to about 300 msec; about 70 msec to about 200 msec; about 100 msec to about 1500 msec; about 100 msec to about 1000 msec; about 100 msec to about 800 msec; about 100 msec to about 600 msec; about 100 msec to about 400 msec; about 100 msec to about 300 msec; about 100 msec to about 200 msec; or any range therebetween.

Changing the position of the laser illumination upon an inner surface of the chamber may include traversing along about 10% to about 90%; about 10% to about 80%; about 10% to about 70%; about 10% to about 60%; about 10% to about 50%; about 10% to about 40%; about 10% to about 30%; about 15% to about 90%; about 15% to about 80%; about 15% to about 70%; about 14% to about 60%; about 15% to about 50%; about 15% to about 40%; about 15% to about 30%; about 20% to about 90%; about 20% to about 80%; about 20% to about 70%; about 20% to about 60%; about 20% to about 50%; about 20% to about 40%; about 20% to about 30%; about 30% to about 90%; about 30% to about 80%; about 30% to about 70%; about 30% to about 60%; about 30% to about 50%; about 40% to about 90%; about 40% to about 80%; about 40% to about 70%; about 40% to about 60%; or about 40% to about 50% of a length of the inner surface of the chamber of the microfluidic device.

In variations when the position of the laser illumination area is changed, the change from the starting position of the laser illumination to the ending position of the laser illumination may be effected by moving the stage to which the microfluidic device is secured, while the laser itself is not moved. Alternatively, the starting position and the ending position of the laser itself may be changed, and the microfluidic device itself may not be moved. The change in position of the laser illumination may occur at a fixed rate, a variable rate, or a combination of fixed and variable rate. Typically, the change in the position of the laser illumination may occur at a fixed rate, creating a path of laser illumination between the starting position and the ending position. In some non-limiting variations, the path of laser illumination between the starting position and the ending position may be a straight line, in other variations the path need not be straight, but can be curved or sinusoidal. The curve or change in direction of the path can define an angle other than 180 or 360 degrees, or any combination thereof.

In some embodiments, changing the position of the laser illumination may include traversing about 10 microns to about 400 microns; about 10 microns to about 300 microns; about 10 microns to about 200 microns; about 10 microns to about 100 microns; about 10 microns to about 70 microns; about 20 microns to about 400 microns; about 20 microns to about 300 microns; about 20 microns to about 200 microns; about 20 microns to about 100 microns; about 20 microns to about 70 microns; about 20 microns to about 50 microns; about 30 microns to about 400 microns; about 30 microns to about 300 microns; about 30 microns to about 200 microns; about 30 microns to about 100 microns; about 30 microns to about 80 microns; about 30 microns to about 50 microns; about 40 microns to about 400 microns; about 40 microns to about 300 microns; about 40 microns to about 200 microns; about 40 microns to about 100 microns; about 40 microns to about 80 microns; about 40 microns to about 60 microns; about 50 microns to about 400 microns; about 50 microns to about 300 microns; about 50 microns to about 200 microns; about 50 microns to about 100 microns; or about 50 microns to about 80 microns along an inner surface of the microfluidic device. In some embodiments, changing the position of the laser illumination of any of these ranges traverses along an inner surface of a chamber of the microfluidic device.

Changing the position of the laser illumination may be performed at a speed from about 1 micron/sec to about 400 microns/sec; about 1 micron/sec to about 350 microns/sec; about 1 micron/sec to about 300 microns/sec; about 1 micron/sec to about 100 microns/sec; about 1 micron/sec to about 70 microns/sec; about 1 micron/sec to about 30 microns/sec; about 30 microns/sec to about 350 microns/sec; about 30 microns/sec to about 300 microns/sec; about 30 microns/sec to about 200 microns/sec; about 30 microns/sec to about 100 microns/sec; about 30 microns/sec to about 60 microns/sec; about 30 microns/sec to about 50 microns/sec; about 50 microns/sec to about 400 microns/sec; about 50 microns/sec to about 300 microns/sec; about 50 microns/sec to about 200 microns/sec; about 50 microns/sec to about 100 microns/sec; about 80 microns/sec to about 400 microns/sec; about 80 microns/sec to about 300 microns/sec; about 80 microns/sec to about 200 microns/sec; about 80 microns/sec to about 100 microns/sec; about 100 microns/sec to about 400 microns/sec; about 100 microns/sec to about 300 microns/sec; or about 100 microns/sec to about 200 microns/sec. In some embodiments, the position of the laser illumination may be changed at a speed of about 30 microns/sec; about 40 microns/sec; about 50 microns/sec; about 60 microns/sec; about 70 microns/sec; about 80 microns/sec; about 90 microns/sec; about 100 microns/sec; about 120 microns/sec; about 140 microns/sec; about 160 microns/sec; about 180 microns/sec; about 200 microns/sec; about 230 microns/sec; about 270 microns/sec; about 300 microns/sec; about 320 microns/sec; or about 350 microns/sec. In some variations, when the micro-object is an attachment-dependent biological cell, the speed at which the position of the laser illumination is moved is from about 1 micron/sec to about 350 microns/sec or about 300 microns/sec. In some variations, when the micro-object is a non-adherent cell, the speed at which the position of the laser illumination is moved is from about 1 micron/sec to about 70 microns/sec or about 30 microns/sec to about 60 microns/sec. In some variations, when the micro-object is a non-adherent cell, the speed at which the position of the laser illumination is moved is less than about 70 microns/sec. In some variations, changing the position of laser illumination may be performed using a fixed, e.g., constant speed of moving the position of laser illumination along a trajectory within a region or a chamber of the microfluidic device, creating a path of illumination between the starting position and ending position.

Figure 25A:
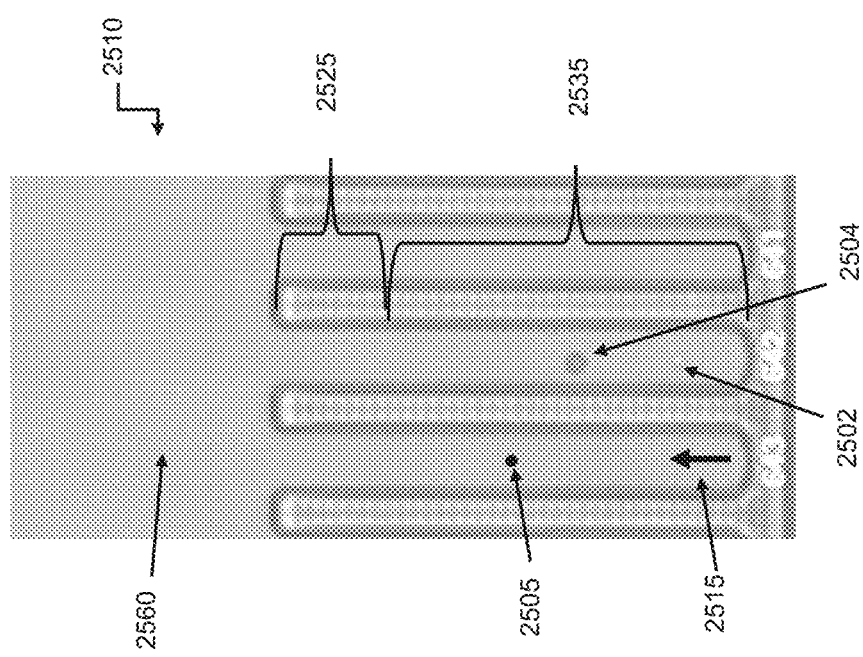
FIGS. 25A and 25B are photographic representations of bead extraction from a sequestration pen according to some embodiments of the disclosure.
Figure 25B:
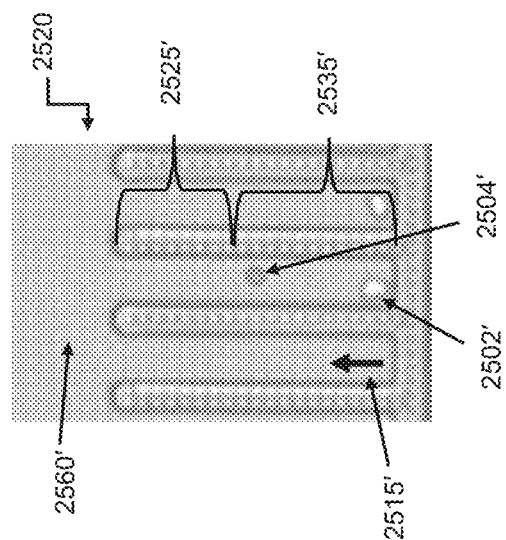

The starting position of the laser illumination upon the inner surface of the chamber of the microfluidic device may be at least about 5 microns; at least about 7 microns, at least about 10 microns, at least about 12 microns, or at least about 15 microns away from a boundary between an inner surface of a wall of the chamber and the inner surface of the base or the cover of the chamber. The ending position of the laser illumination upon the inner surface of the chamber of the microfluidic device may be at least about 5 microns; at least about 7 microns, at least about 10 microns, at least about 12 microns, or at least about 15 microns away from a boundary between an inner surface of a wall of the chamber and the inner surface of the base or the cover of the chamber. In various embodiments, the laser illumination may be directed along an inner surface of the chamber of the microfluidic device, where the laser illumination is not directed closer than about 5 microns; about 7 microns, about 10 microns, about 12 microns, or about 15 microns away from a boundary between an inner surface of a wall of the chamber and the inner surface of the base or the cover of the chamber. In some embodiments, changing the position of the laser illumination may include illuminating a path along the inner surface of the chamber in a direction parallel to the inner surface of a wall of the chamber. In some embodiments, changing the position of the laser illumination may include illuminating a path parallel to the vertical centerline of a chamber, e.g., a sequestration pen, as shown in FIGS. 12A, 12B, 12D. In some embodiments, changing the position of the laser illumination may include illuminating a path from a point distal from the opening of the chamber to the flow region, proceeding along a vertical center line of the chamber, towards the geometric center point of the chamber, as shown in FIGS. 25A and 25B. In yet other variations, changing the position of the laser illumination may include illuminating a path proceeding diagonally across at least a portion of the width of the chamber (e.g., sequestration pen) while also proceeding vertically along the length of chamber, as shown in FIGS. 12C, 20C-20D, and 23E-23F. The ending position of the laser illumination path is closer to the opening of the chamber than the position of the starting point. The ending point of the path of the laser illumination may be a point on the surface that is closer to the opening of the chamber to the flow region/microfluidic channel than the starting point of the laser illumination.

Directing the laser illumination along the inner surface of the chamber of the microfluidic device may include illuminating multiple paths from the same starting point upon the inner surface of the chamber, each path stopping at a different ending point upon the inner surface of the chamber. In other embodiments, multiple paths may be illuminated within the chamber, and each instance of directing laser illumination upon a starting position of the inner surface of the chamber, the laser illumination may be directed upon a unique starting position. There may be 1, 2, 3, 4, 5, 6, or more unique positions (i.e., positions different from the first position of the immediately preceding instance of directing laser illumination). For example, as discussed in the Examples below and shown in FIG. 12A, laser illumination is directed from two unique points near the rear wall of sequestration pen 724 (e.g., the rear wall of a sequestration pen is the wall opposite to the opening of the sequestration pen to a flow region/microfluidic channel). In yet other embodiments, multiple instances of laser illumination may be performed within the chamber, each starting from the same starting position, as in FIG. 12B. In yet other embodiments, a mixture of unique staring points and repetitive use of a same starting point may be used, as noted for FIG. 12A where a first and a second laser illumination are commenced from the same starting point, while a third laser illumination commences from a different (i.e. second unique position).

In yet other embodiments, changing the position of the laser illumination upon an inner surface of the chamber includes illuminating a first section of the inner surface with laser illumination having a first power level, and illuminating a second section of the inner surface with laser illumination having a second power level about 1% to about 10% less than the power of the laser illumination used on the first section. In some embodiments, the first power level of the laser illumination may be any of the ranges described above. In some other embodiments, the first power level may be from about 1000 mW to about 1300 mW. In alternate embodiments, the first power level may be from about 400 mW to about 600 mW. The second power level may be about 1%; about 2%; about 3%; about 4%; about 5%; about 6%; about 7%; about 8%; about 9%; or about 10% less than the first power level. The second section of the inner surface of the chamber may be closer to an opening of the chamber than the first section of the inner surface of the chamber.

Export Medium and Temperature Control thereof. In some embodiments, the culture medium that had been present when biological cells were introduced to the microfluidic device, and optionally cultured within, may not be the optimal medium to be used when repositioning or exporting is performed. Accordingly, an export medium may be introduced to the microfluidic device by flowing the export medium into the flow region/microfluidic channel of the microfluidic device before laser illumination is directed along the inner surface of the microfluidic device. The export medium is permitted to diffuse into a chamber of the microfluidic device to replace the culturing medium, before laser illumination is directed on to the inner surface of the microfluidic device.

In some embodiments, the export medium may have all essential components for maintaining viability of the biological cells but may not include any serum components. Absence of serum components in export medium when exporting biological cells or beads that may include biological materials for further analysis may provide improved analytical results. In one non-limiting example, biological cells or beads containing nucleic acids exported in a serum-free medium may provide improved genomic analysis results. However, in other embodiments, the export medium may still contain serum components.

In some variations, when the export medium is introduced, it may have a temperature that is about 5° C. to about 10° C. cooler than that of the microfluidic device itself. The microfluidic device is typically maintained at a temperature that supports the viability of biological cells and/or optimizes the processing of a biological cell to permit capture of a biological product of interest from the biological cell to a capture bead. The controlled temperature of the microfluidic device may be in a range of about 20° C. to about 38° C., and may be selected to be any individual temperature in that range. The export medium may be introduced from a source external to the controlled temperature environment of the microfluidic device in order to ensure that the export medium is introduced at the cooler temperature, i.e., that the microfluidic device is at a higher temperature than the export medium being introduced.

Further, the dissolved gas content of the export medium may be temperature-equilibrated and buffered with 5% $CO_2$. This equilibration and buffering can be configured to ensure predictable gas bubble production, and therefore, more efficient micro-object repositioning. The size of the generated bubble may depend on the factors described above, including the power of the laser pulse, pulse duration, and distance the laser illumination travels along the inner surface of the microfluidic device while the laser illumination is active. The volume of the generated bubble may shrink by 30-60% when the laser is deactivated, reaching an equilibrium size approximately 2 seconds after deactivation of laser illumination. After the bubble is generated and reaches a stable size after deactivation of laser illumination, bubble size can become dependent on both pressure inside the microfluidic device and device temperature. For temperature-equilibrated and buffered media with dissolved gas content, the generated laser bubble size may be maintained at the same size or may enlarge at a controllable rate for efficient micro-object repositioning when the microfluidic device is maintained at a temperature above (e.g., in the range of about 6-8° C. above) that of the export medium. Laser illumination of an inner surface of a microfluidic device equilibrated at temperatures lower than that of the export medium may lead to spontaneous re-dissolution of vapor in the induced bubble, leading to bubble shrinkage, and less effective repositioning of micro-objects. With microfluidic device equilibration at temperatures higher that of the export medium (e.g., about 6-8° C. above or less than 12° C.), more dissolved gasses enter the gas phase, and enlarge the size of the laser-generated bubble. When equilibration of a device is performed at a temperature too far above (e.g., 12° C. or more above) the temperature of the export medium, the generated bubble may double in size in the first 60 seconds after nucleation, which may provide less efficient control of the repositioning/export.

DEP and other forces. In some variations, the laser-assisted bubble dislodgement methods may be employed before or after DEP force mediated extraction of the micro-object(s) does not succeed. This may be provided in an automated fashion, as described more fully below. Further, DEP mediated repositioning may be utilized to reposition cells prior to laser-assisted methods to minimize the effect of circulating flow (e.g., eddies, vortexes, etc.) which potentially could place biological micro-objects directly under laser illumination as discussed below in Experiment 2 in regard to FIGS. 17-23. DEP force mediated repositioning performed before or after a laser-assisted bubble dislodgment may be a dynamic dielectrophoretic force to the micro-object, wherein the dynamic dielectrophoretic force is moved at least in part toward the opening of the chamber. The dynamic DEP force may also include changes to the amount of DEP force applied to the micro-object, e.g., through changes in voltages and/or frequency. After repositioning the micro-object(s), further translocation of the micro-object(s) may be accomplished by using any other suitable method of moving cells, including but not limited to fluidic displacement, DEP, gravity, and the like. In some embodiments, the base of the microfluidic device may further include dielectrophoresis electrodes, which may be used to relocate the micro-object(s) after repositioning. The DEP electrodes may be optically actuated.

Disengagement Reagent. To aid laser-assisted repositioning, micro-objects within the chamber of the microfluidic device may be contacted with a disengagement reagent prior to directing laser illumination upon the inner surface of the chamber to reposition the micro-object. The disengagement reagent may be flowed into a flow region of the microfluidic device and allowed to diffuse into one or more chambers opening to the flow region. Depending on the shape or size of chamber and microfluidic device, the disengagement reagent may be maintained in contact with the micro-object(s) for a predetermined period of time. Additionally, when sequential repositioning/exporting is performed on one or more micro-object(s) within a plurality of chambers of a microfluidic device, introduction, diffusion and contact of the disengagement reagent may be repeated during the course of the sequential repositioning/export.

The disengagement reagent may be a reagent that disrupts the attachments or aggregation of the micro-object(s) to the surface, which may include disrupting attachments/aggregative associations to the surface modifying ligands. The reagent may disrupt the attachments/aggregation of the micro-object(s) to any adhesive binding motifs of the surface modifying ligands or other aggregative interactions with the surface modifying ligands, which may or may not include adhesive binding motifs. The disengagement reagent may be a peptidase. The peptidase may disrupt attachments to an RGD peptide motif, or may disrupt other adhesive attachment motifs or more general aggregative behaviors as is generally known in the art. In some embodiments, the disengagement reagent may be a trypsin or trypsin-like enzyme. One commercially available peptidase suitable for use includes TrypLE™ Select (ThermoFisher Scientific, Catalog No A1217701), which is a recombinant enzyme, but the method is not so limited. Other peptidases may be used, depending on the particular micro-objects to be disengaged and depending on the further manipulation desired for the repositioned/exported micro-objects. When TrypLE™ Select is used for disengaging attachment dependent cells, a 10× TrypLE™ Select solution is introduced without dilution, and is flowed through the microfluidic device to displace the culture medium during the disengagement process. The disengagement process for adherent cells may be performed for a period of time of greater than or equal to about 5 min, about 10 min, about 15 min, about 20 min, about 25 min, about 30 min, about 40 min, about 45 min, about 50 min, about 55 min or 60 min.

For disengagement of micro-objects such as beads or nonadherent cells, lower concentrations, e.g., 5× or 1× concentrations of a peptidase solution may be used, and further dilution may be utilized for some experiments depending on the particular cells or beads (e.g., decorated beads). In some variations, when disengaging nonadherent cells, 1× TrypLE™ Select solution is introduced without dilution, and is flowed through the microfluidic device to displace the culture medium during the disengagement process which may be a period of time of greater than or equal to about 5 min, about 10 min, about 15 min, about 20 min, about 25 min, about 30 min, about 40 min, about 45 min, about 50 min, about 55 min or 60 min.

Counting Micro-Objects. In some embodiments, the region or chamber may contain a group of micro-objects, and the number of micro-objects in the group may be counted. In some embodiments, the micro-objects that have been repositioned/exported may be counted, which may be some or all of the micro-objects. The counting may be performed after the micro-objects have been repositioned/exported. In some embodiments, the counting may be automated. Counting may be performed at specific points in the method for repositioning cells, for example before cells are repositioned, after each laser-assisted bubble repositioning effort and/or after every DEP force mediated cycle.

Repositioning/Exporting Attachment-Dependent Cells. In some embodiments of the method of repositioning a micro-object within the microfluidic device, the micro-object may be an attachment-dependent biological cell and/or a daughter cell thereof. The method may further include exporting the attachment dependent biological cell and/or a daughter cell thereof from a chamber of a microfluidic device. The attachment-dependent cell may have been introduced or cultured within a chamber of a microfluidic device as described herein. An inner surface of the chamber in which the attachment-dependent cell is disposed may include a surface coating as described herein. At least one inner surface of the chamber may include the surface coating, which in some embodiments, may be the base of the chamber. In some embodiments, all of the inner surfaces (i.e., the surfaces facing the space enclosed by the chamber) of the chamber may include the surface coating. The surface coating may be a covalently bonded surface coating. The surface coating may promote adhesion of the attachment dependent cell. The surface coating may include a mixture of surface modifying ligands. In some embodiments, at least one of the mixture of surface modifying ligands may include a peptide having an adhesive binding motif, which may be any suitable adhesive binding motif. In some embodiments, the adhesive binding motif of the peptide may be an RGD motif. The mixture of surface modifying ligands may include at least one surface modifying ligand that does not promote adhesion, and the ratio of the surface modifying ligands may be varied as described below.

To aid the laser-assisted repositioning, the attachment-dependent cell in the chamber may be contacted with a disengagement reagent prior to directing laser illumination upon the inner surface of the chamber proximal to the attachment-dependent cell. The disengagement reagent may be flowed into a flow region of the microfluidic device and allowed to diffuse into one or more chambers opening to the flow region. Depending on the shape or size of chamber and the microfluidic device, the disengagement reagent may be maintained in contact with the attachment-dependent cell for a predetermined period of time. Additionally, when sequential repositioning/exporting is performed on one or more attachment-dependent cells within a plurality of chambers of a microfluidic device, introduction, diffusion and contact of the disengagement reagent may be repeated during the course of the sequential repositioning/export.

The disengagement reagent may be a reagent that disrupts the attachments of the attachment-dependent cell to the surface, which may include disrupting attachments to the surface modifying ligands promoting adhesion and/or cell spreading. The reagent may disrupt the attachments of the cell to the adhesive binding motifs of the surface modifying ligands. The disengagement reagent may be a peptidase. The peptidase may disrupt attachments to a RGD peptide motif, or may disrupt other suitable adhesive attachment motifs as is generally known in the art. In some embodiments, the disengagement reagent may be a trypsin or trypsin-like enzyme. One commercially available peptidase suitable for use includes TrypLE™ Select (ThermoFisher Scientific, Catalog No A1217701), which is a recombinant enzyme, but the method is not so limited. Other peptidases may be used, depending on the particular attachment-dependent cells to be disengaged and depending on the further manipulation desired for the repositioned/exported attachment-dependent cells.

The method of exporting or repositioning an attachment-dependent cell or daughter cell thereof may include any aspect of the method of repositioning a micro-object described herein, including but not limited to the selection of a surface to be illuminated by a laser, characteristics of the laser illumination (e.g., size of illumination area), selection of and use of an export medium, control of bubble generation using the combination of length of path illuminated, power of illumination and temperature control of the export medium, net time for laser illumination, or any combination thereof. The attachment-dependent cell and/or daughter cell may further be counted as described herein.

Counting Micro-Objects. In some embodiments, the chamber may contain a group of micro-objects, and the number of micro-objects in the group may be counted. In some embodiments, the micro-objects that have been repositioned/exported may be counted, which may be some or all of the micro-objects. The counting may be performed after the micro-objects have been repositioned/exported. In some embodiments, the counting may be automated.

Repositioning micro-objects in a plurality of chambers. The microfluidic device may include a plurality of chambers, in which at least one micro-object may be disposed. In some embodiments, the micro-object(s) in at least a subset of the plurality of chambers may be repositioned. The microfluidic device may further include a flow region, where each chamber opens to the flow region. The micro-object(s) in at least a subset of the plurality of chambers may be exported from their respective chambers into the flow region. In some embodiments, exporting from each of the subset of the plurality of chambers may be performed sequentially. When performing sequential export from a plurality of chambers, additional introductions of export medium may be made, which may assist in maintaining a temperature differential between the export medium and the microfluidic device as described above. Additionally, in embodiments where the micro-object(s) disposed in each of the plurality of chambers are attachment-dependent cells, the method may further include repeatedly contacting the attachment-dependent cells with a disengagement reagent, as described herein, during the sequential exports.

Disengagement: Disengaging the attachment-dependent cell from the coated inner surface may include introducing a cell disengagement reagent into the chamber, thereby disrupting the adhesion of the at least one attachment-dependent cell with the adhesion promoting surface modifying ligands of the coated inner surface or with other biofouling attachments accumulated by culturing the attachment-dependent cell upon the coated inner surface of the chamber. Treatment may be performed as described above in the methods of repositioning micro-objects. Any of the cell disengagement reagents described herein may be utilized, including 10× TrypLE™ Select (ThermoFisher Scientific, Catalog No A1217701), which may be introduced as the 10× concentration and displace the culturing medium. Contact may be maintained with the cell disengagement reagent in contact with the attachment-dependent cell for a predetermined period of time based at least in part on a shape of the chamber or a size of the chamber. Treatment of the attachment-dependent cells with the disengagement reagent may be repeated throughout any process of dislodging and exporting the cells as described herein.

Export of attachment-dependent cell and/or daughter cell thereof. As described above, the attachment-dependent cell and/or daughter cell may be repositioned, or alternatively, exported from a chamber in which the cell has been cultured, using any of the techniques described herein for repositioning a micro-object. The attachment-dependent cell and/or daughter cell may be exported from the chamber into the flow region. In some embodiments, a disengaged attachment-dependent cell or daughter cell thereof, may be exported from the chamber using dielectrophoretic forces. In some embodiments, the attachment-dependent cell and/or daughter cell thereof may be exported from the chamber into a staging area in the flow region. Moving the attachment-dependent cell and/or daughter cell thereof from the chamber into the staging area in the flow region may be performed using dielectrophoretic forces.

Export from a population of cells. In various embodiments, the first period of time that the attachment-dependent cell is cultured for is a period of time sufficient for the attachment-dependent cell to divide into one or more daughter cells. When one or more daughter cells are present, exporting the attachment-dependent cell further includes exporting at least a subset of the one or more daughter cells. In some embodiments, the first period of time may be a period of time sufficient for the attachment-dependent cell to form a clonal population of daughter cells. Exporting the attachment-dependent cell may then include exporting at least a subset of the clonal population of daughter cells. When a subset of one or more daughter cells or a subset of the clonal population of daughter cells are exported, e.g., a split export, the remaining population of daughter cells may be cultured for a second period of time, after exporting the subset of cells has been completed.

Adaptive laser-assisted bubble and optically-actuated dielectrophoretic export of non-adherent cells and/or beads. As mentioned, DEP forces may not always be sufficient to extract micro-objects like non-adherent cells or beads (including beads having biomolecules covalently or non-covalently attached to them) from the sequestration pens.

Figure 17:
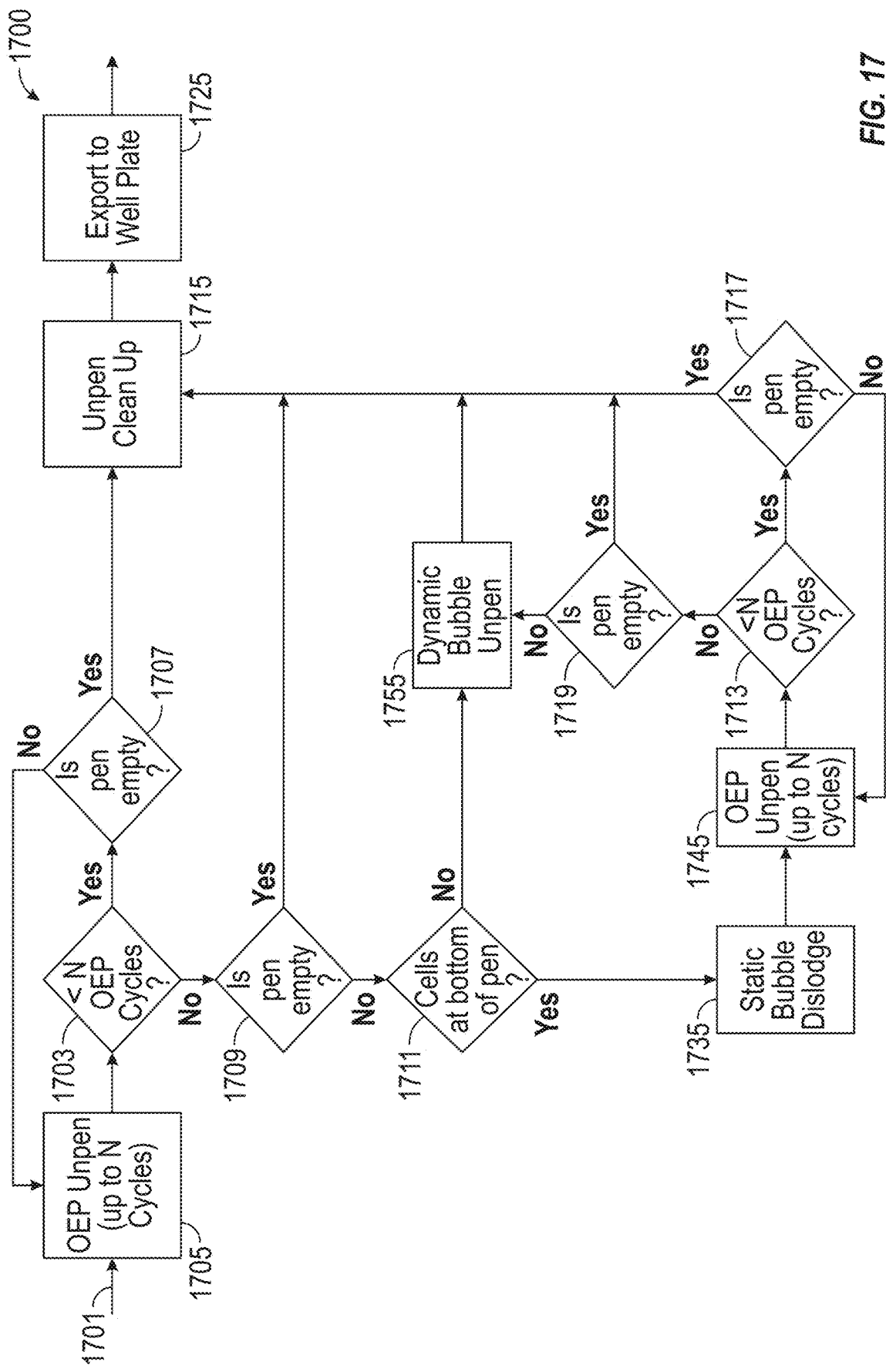
FIG. 17 is a schematic representation of a method for repositioning cells according to some embodiments of the disclosure.

An adaptive laser-assisted and DEP method may increase the fraction of micro-objects such as non-adherent cells or beads recovered from the sequestration pens as well as to improve the efficiency of extraction (i.e., unpenning) processes. FIG. 17 shows a schematic representation of the adaptive unpenning method 1700, which may be a software-enabled algorithmic process. The use of laser-assistance may be determined based on the response of micro-objects, such as non-adherent cells or beads, to DEP forces. Not every action is shown in this schematic, such as counting the cells, employing a disengagement process, or every instance of applying DEP, and dynamic DEP in particular, but as described below, the method 1700 may include activities such as cell counting at desired points throughout the method, and cell counting may be automatically performed or may be performed at the user's discretion. Other activities such as determining which sequestration pens of the microfluidic device hold a plurality of cells may also be included, or correlating a sequestration pen with an outcome of an assay such as, but not limited to those described in U.S. Pat. No. 9,889,445 B2, issued Feb. 13, 2018, entitled "Micro-Fluidic Devices for Assaying Biological Activity"; U.S. Pat. No. 10,010,822 B2, issued Jul. 3, 2018; International Application No. PCT/US2017/027795, filed Apr. 14, 2017, entitled "Methods, Systems, and Kits for In-Pen Assays"; and International Application No. PCT/US2018/055918, filed Oct. 15, 2018, entitled "Methods, Systems, and Kits for In-Pen Assays." Additionally, other variations of unpenning or laser bubble production activities may also be included within method 1700 as desired by the user.

Dynamic DEP. DEP force mediated repositioning performed before or after a laser-assisted bubble dislodgment may include a dynamic dielectrophoretic force to the micro-object, wherein the dynamic dielectrophoretic force is moved at least in part toward the opening of the chamber. The dynamic DEP force may also include changes to the amount of DEP force applied to the micro-object, e.g., through changes in voltages and/or frequency.

Turning to FIGS. 17, 18, 19, 21 and 22 for better understanding of the methods individual processes of the method may include 1705 (initial DEP unpen for N cycles); 1715 (unpen clean up, which may include a single further DEP unpen cycle to definitively remove any remaining cells still present within the connection region. This is important for maintaining monoclonality throughout the unpenning processes across an entire microfluidic device); 1725 (export cell to well plate); 1735 (static bubble dislodge); 1745 (post-static bubble DEP unpen for N cycles); and 1755 (dynamic bubble unpen). Decisions are made within method 1700, at least at 1703 (Less than N cycles of DEP?); 1707 (Is the pen empty?); 1709 (Is the pen empty?); 1711 (Are there cells at the bottom of the pen); 1713 (Is the number of OEP cycles less than N, following OEP unpen individual process 1745); 1717 (Is the pen empty after fewer than N cycles of OEP following process 1745); and 1719 (is the pen empty after N cycles of OEP following process 1745). The method described in FIGS. 17, 18, 19, 21 and 22 may incorporate any specific parameter for features of the method, including but not limited to, laser illumination characteristics and path, DEP, sequestration pens, microfluidic devices and the like, as described herein, both in paragraphs above and in Experiment 2.

Figure 18:
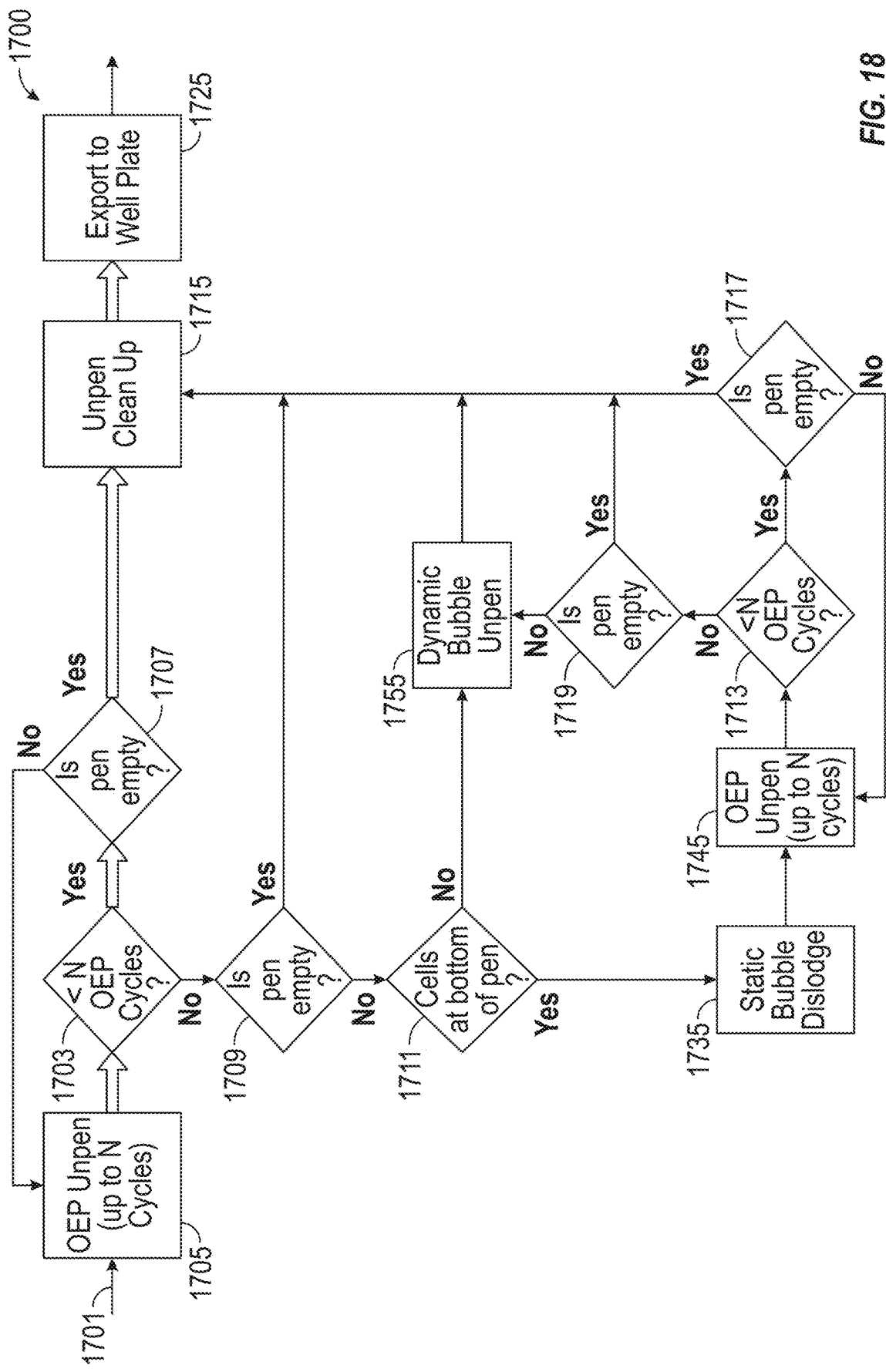
FIG. 18 is a schematic representation of a method for repositioning cells according to some embodiments of the disclosure.

DEP only, FIG. 18: In one variation of method 1700, as shown in FIG. 18, the process utilizing DEP forces (e.g., DEP only, 5 V and 1 MHz) may be sufficient to extract all or an acceptable number/fraction of micro-objects, which may be a biological cell or a bead, from the sequestration pen. The cells/micro-objects in the sequestration pen and in the channel area near the target sequestration pen may be counted immediately after each DEP cycle to determine whether the sequestration pen is empty of cells/micro-objects or if an acceptable number/fraction of cells/micro-objects have been extracted from the sequestration pen. This is shown in FIG. 18, starting with a selected sequestration pen at start of method 1701, and proceeds through N cycles of OEP (OEP process activity 1705), proceeding through decision 1703 (fewer than N cycles of OEP); and proceeding through decision 1707. If either condition (1703=YES; 1707=YES) is met at any point during or up to completion of the DEP only process, the method proceeds to individual process 1715 (Unpen Clean Up) and the cells are exported to a well in a plate, via individual process 1725. Notably, the process can be tuned for user-specific needs through defining an acceptable number of DEP cycles and a stop threshold, which may be defined as an absolute number of cells or a fraction of cells extracted from the sequestration pen.

The number of DEP cycles may be any number N, where N may be an integer such as 1, 2, 3, 4, 5, 10, 15, 20 or more. In some other variations N may be less than about 25, about 20, about 15, about 10 or about 5, or any integer therebetween. In some other variations, N may be from about 1 to about 25, about 1 to about 15, about 1 to about 10, about 3 to about 15, about 3 to about 10, or any range selected to be between the values explicitly described herein. An acceptable number of cells may be about one or more, about two or more, about three or more, about five or more, about 8 or more, about 9 or more, about 10 or more, about 15 or more, about 20 or more or about 25 or more. The fraction of cells extracted from the sequestration pen may be selected to be about 10%, about 20% about 30%, about 50%, about 75%, about 90%, or about 100% of the cells present in the sequestration pen.

The illumination area may be greater than or equal to an area comprising a diameter of 5 um, or may have an area comprising a diameter from about 5 microns to about 50 microns. In some variations, the illumination area may have an area having a diameter of about 10 microns, about 25 microns, about 30 microns, about 35 microns, about 40 microns, about 45 microns, or about 50 microns.

Figure 19:
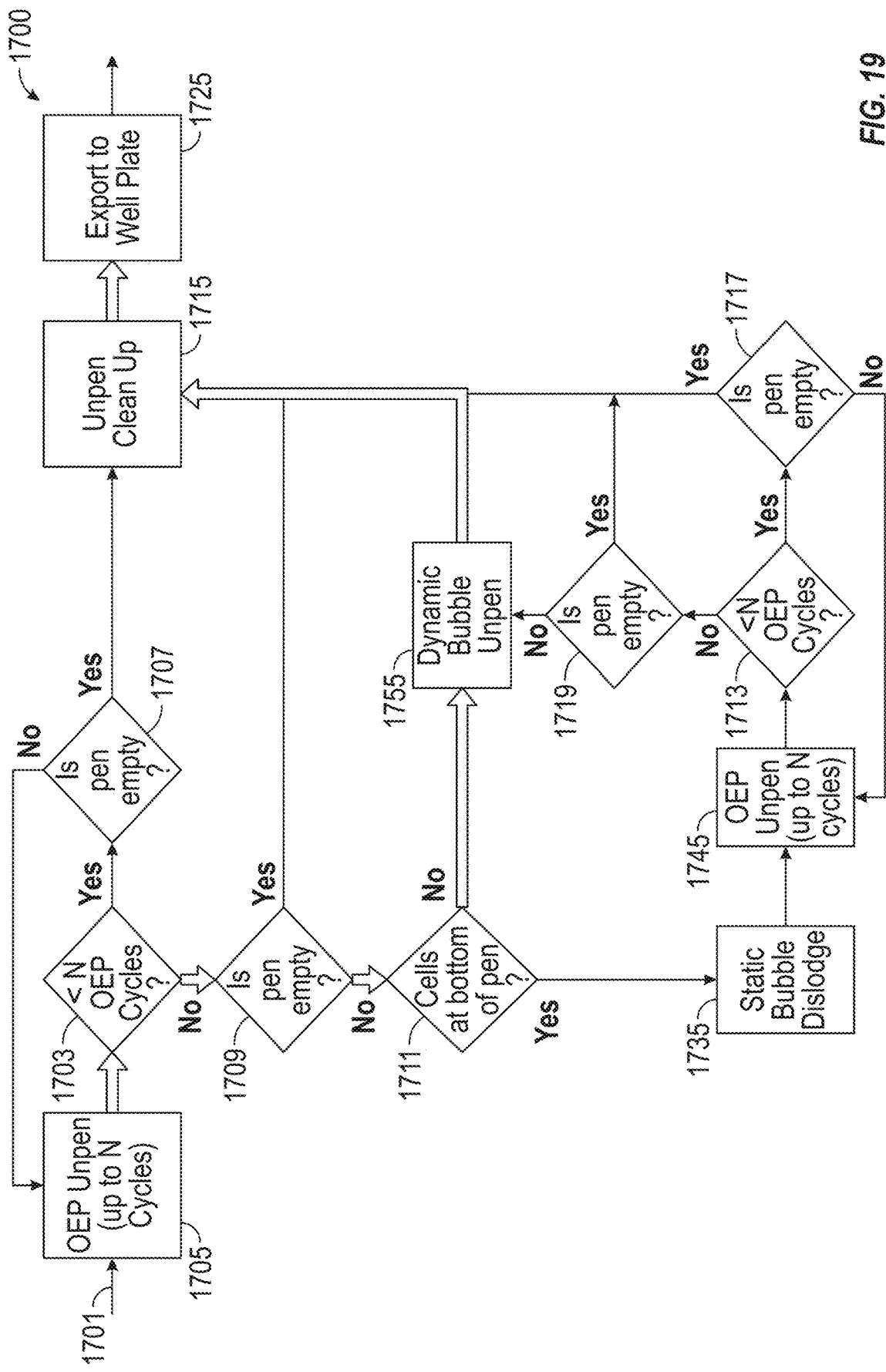
FIG. 19 is a schematic representation of a method for repositioning cells according to some embodiments of the disclosure.

Laser-assistance with dynamic pulse, FIG. 19: When DEP is not sufficient to recover an acceptable number or fraction of cells from the sequestration pen, a laser-assisted bubble cell extraction process may be activated. If at the end of the DEP only process, less than the user-defined number of micro-objects (e.g., cells such as non-adherent cells or beads) have been exported, and remaining cells are not found near the bottom of the sequestration pen upon counting and/or observation, a dynamic laser pulse, corresponding to the movement of the laser focal point, may be activated. FIG. 19 shows this exemplary method of method 1700, from starting point 1701, at a selected sequestration pen; proceeding through N cycles of OEP only unpen 1705 and reaching decision point 1703 (1703=NO, the cycle number is not less than N). If upon counting cells/micro-object at 1709, there are still cells/micro-objects in the pen, and 1709 (Is pen empty=NO), this exemplary method of method 1700 proceeds to decision 1711 (Are there cells/micro-objects at the bottom of the pen=NO). If this condition is met, method 1700 proceeds to the dynamic bubble unpen process using the dynamic laser pulse at 1755. The z-offset of the stage is changed to bring the surface of the base of the isolation region of the pen into focus, prior to activating a dynamic laser pulse.

The dynamic laser pulse, corresponding to the movement of the laser focal point, may be activated. The dynamic laser pulse may have a starting position of the inner surface of the chamber is at least 5 microns or at least 10 microns away from a boundary between an inner surface of a wall of the chamber and the inner surface of the base or the cover of the chamber. The trajectory of the dynamic laser pulse may proceed diagonally from a point within the sequestration pen most distal from the opening of the pen to the channel and near a wall of the sequestration pen defining an outer edge of the opening to the channel, and may move towards the region of the sequestration pen more proximal to the connection region of the pen. This movement may include moving the laser focal point towards a hook region of the sequestration pen, if a hook region is present in the sequestration pen (See FIGS. 20B and 20C and text associated as discussed further in Experiment 2). The trajectory may begin at a point that is to the left and below the geometric center of the sequestration pen. The trajectory does not contact any of the walls of the sequestration pen. The trajectory may begin at a point that is about 15 microns, about 20 microns, about 25 microns, about 30 microns, about 35 microns, about 40 microns, about 45 microns, about 50 microns to the left of the geometric center of the sequestration pen, limited by the size of the sequestration pen. The trajectory may begin at a point about 150 microns, about 145 microns, about 140 microns, about 135 microns, about 130 microns, about 125 microns, about 120 microns, about 115 microns, about 110 microns or about 100 microns to below the geometric center of the sequestration pen, depending on the physical dimensions of the sequestration pen. The trajectory may end at a point that is about 2 microns, about 3 microns, about 4 microns, about 5 microns, about 10 microns, about 20 microns, about 25 microns, about 30 microns, about 35 microns, about 40 microns, about 45 microns, about 50 microns to the right of the geometric center of the sequestration pen, limited by the size of the sequestration pen. The trajectory may end at a point that is about 50 microns, about 55 microns, about 60 microns, about 65 microns, about 70 microns, about 75 microns, about 90 microns, about 100 microns above the geometric center of the sequestration pen, depending on the size of the sequestration pen. The trajectory of the laser illumination may traverse about 30%, about 35%, about 40%, about 45%, about 50%, about 55%, about 60%, about 65%, or about 70% of the length of the sequestration pen from the starting position to its final point.

After the laser pulse, the process stopped, the z-offset may be changed to the imaging plane to count the cells in the sequestration pen and channel area as needed, and the cells were exported to a well in a plate. In this method, generally, the initial location and trajectory of the laser pulse, stage translation speed, laser power, and number of pulses are all tunable parameters.

The power of the laser illumination may be chosen to be between about 300 mW to about 600 mW. In some variations, the power may be selected to be around 300 mW, about 325 mW, about 350 mW, about 360 mW, about 370 mW, about 375 mW, about 400 mW, about 450 mW, about 475 mW, about 500 mW, about 550 mW, or about 600 mW. The number of pulses may be about 1 to about 20, about 1 to about 10, about 1 to about 8, about 1 to about 5, or any number of pulses therebetween. The area of illumination is moved by moving the stage holding the microfluidic device, and the speed of translation may be from about 1 micron/sec to about 50 microns/sec, about 1 micron/sec to about 70 microns/sec, about 1 micron/sec to about 30 microns/sec or any single speed of translation therebetween. The speed of translation may be selected to be about 30-60 microns/sec to avoid placing cells, displaced by recirculating flow, under direct laser illumination. This limited inadvertent cell killing.

Figure 21:
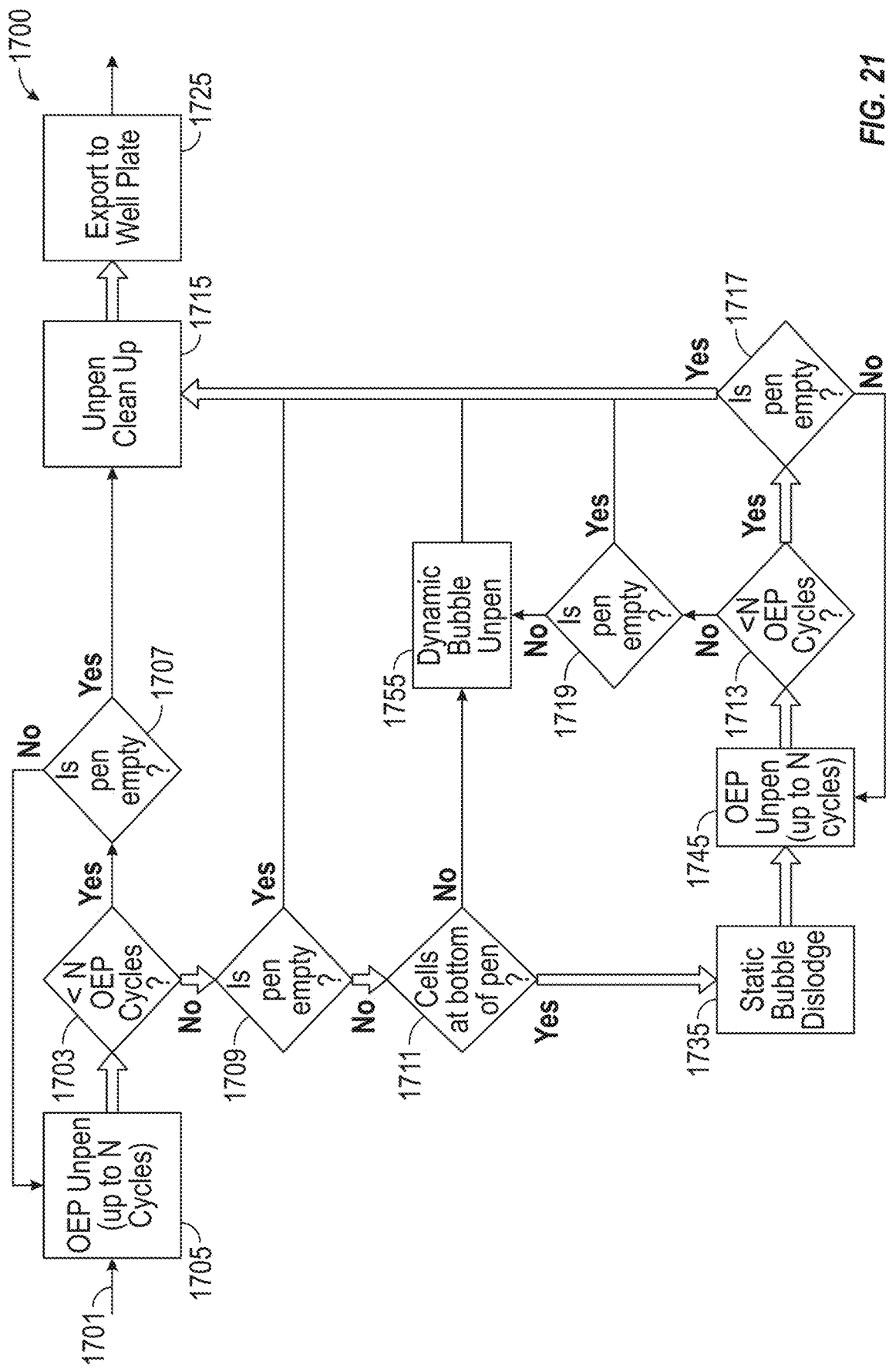
FIG. 21 is a schematic representation of a method for repositioning cells according to some embodiments of the disclosure.
Figure 22:
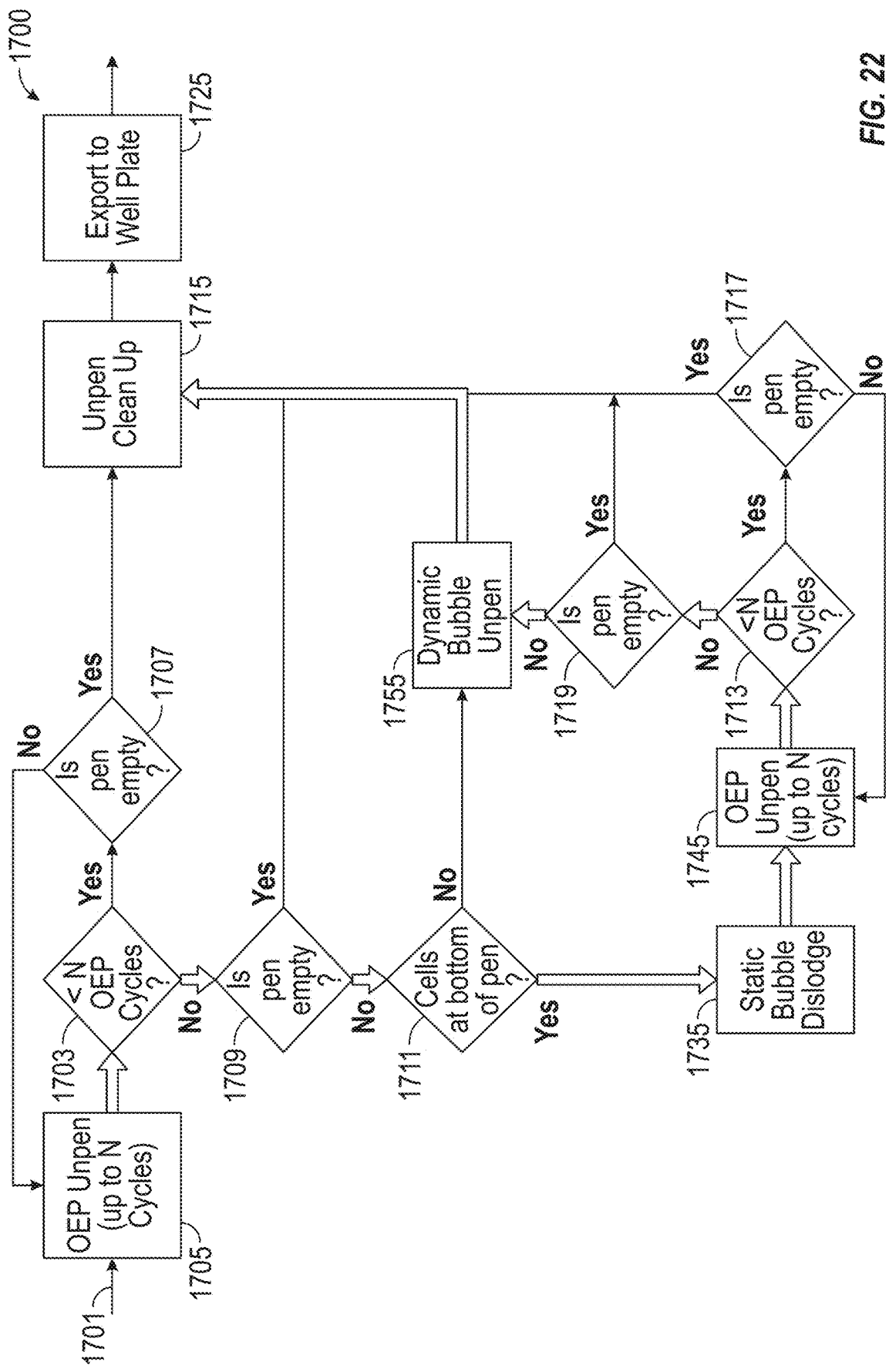
FIG. 22 is a schematic representation of a method for repositioning cells according to some embodiments of the disclosure.

Static laser plus DEP, FIGS. 21 and 22: If at the end of the DEP process, more than the user-defined number of cells/micro-objects are found, and the cells/micro-objects may be close enough to the bottom of the sequestration pen to be placed under a dynamic laser pulse, and alternative individual processes of method 1700 may be used. These alternative methods are depicted in FIGS. 21 and 22.

Variation 1: In the variation of method 1700 shown in FIG. 21, the initial OEP process 1705 proceeds to decision 1703, without recovering the desired number of cells or micro-objects within N cycles (1703=NO); cells are still present (1709=NO) and the answer to the query at 1711 is YES (YES, there are cells at the bottom of the sequestration pen), the method 1700 proceeds to individual process 1735, to perform a static laser pulse to reposition cells away from the bottom (most distal) region of the sequestration pen. To achieve this static laser pulse, the z-offset of the stage may be changed to bring the surface of the base of the isolation region of the pen into focus and a static laser pulse may be activated. The static laser pulse may be located more proximal to the opening of the sequestration pen to the channel. The static laser pulse may be located about 10 microns, about 15 microns, about 20 microns, about 25 microns, about 30 microns, about 35 microns, about 40 microns, about 45 microns, about 50 microns, or about 55 microns to the right of the geometric center of the sequestration pen, depending on the size of the sequestration pen, and may be about 15 microns, about 20 microns, about 25 microns, about 30 microns, about 35 microns, about 40 microns, about 45 microns, about 50 microns, about 55 microns, about 60 microns, or about 65 microns above the geometric center of the sequestration pen, depending upon the size of the sequestration pen. The static laser pulse may be located to a position near a hook region of the pen in instances where the pen has a hook region. The location of the static laser pulse may be varied to an alternate fixed location or a variable location relative to the location of the cells within the sequestration pen. The static laser pulse may assist in detaching cells/micro-objects aggregated within the bottom region of the sequestration pen.

After the laser pulse was completed, the z-offset of the stage may be changed to the DEP plane, and a new round of DEP performed at individual process 1745 (OEP unpen) for up to N cycles, similarly as in process 1705. Similar cell counting at decision 1713 may be included to determine whether 1713 is YES. At decision 1713, when the condition YES is reached, the method moves to individual process 1715 (Unpen Clean Up) and then to individual process 1725 (Export to well plate).

Variation 2: As detailed above, the cells in the sequestration pen and in the channel area near the target sequestration pen were counted immediately after each DEP cycle to determine if the sequestration pen was empty or if an acceptable number or fraction of cells had been extracted from the sequestration pen. If adequate numbers of cells are not unpenned using this variation of method 1700, a further variation of method 1700 may be used, as shown in FIG. 22. The method shown in FIG. 22 utilizes similar initial activities as shown for the variation of FIG. 21. However, when insufficient cells/micro-objects are unpenned, when answering the query at 1713 (the cycle number is not less than N, (NO)) the method may instead proceed to individual process 1755, activation of a dynamic laser pulse, after deciding that cells are still present at 1719. The dynamic laser pulse may be activated with the trajectory, stage translation speed, laser power, and number of laser pulses as described above. The z-offset of the stage may be changed to bring the surface of the base of the isolation region of the pen into focus prior to activating the dynamic laser pulse. The z-offset may be changed to the imaging plane to count the cells in the sequestration pen and channel area as needed, e.g., before proceeding to individual process 1715 (Unpen Clean up) and the cells are exported (1725) to a well in a plate. Notably, the number of cells in near the bottom of the sequestration pen and the size of the counting region prior to the static laser pulse may be adjusted to accelerate the overall unpenning process. The size of the counting region near the bottom of the pen prior to dynamic laser pulse activation may be defined by the user.

In some variations, this method is performed automatically. In some variations, a machine-readable tangible medium may be provided, where the machine-readable tangible medium may be configured to store instructions for causing the one or more processors to execute operations for the method 1700, in any combination of activities, as described herein.

Figure 23A:
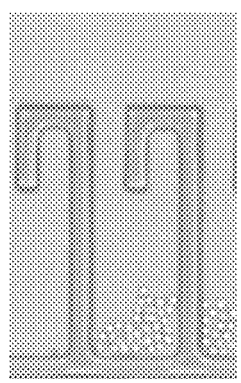
FIGS. 23A to 23G are photographic representations of a method for repositioning cells according to some embodiments of the disclosure.
Figure 23B:
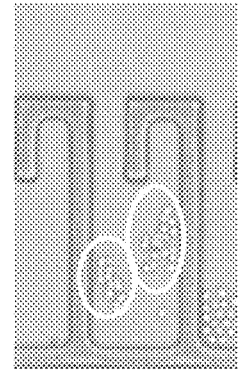
Figure 23C:
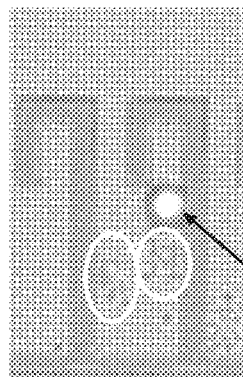
Figure 23D:
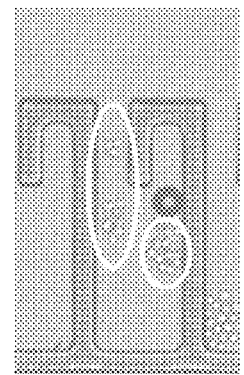
Figure 23E:
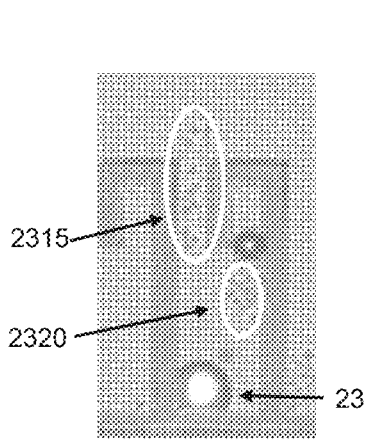
Figure 23F:
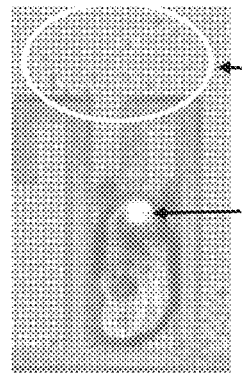

In some variations, a method of repositioning a micro-object is provided wherein the micro-object is disposed in a chamber of a microfluidic device, the chamber having an opening to a flow region of the microfluidic device, as shown in FIGS. 23A-G and FIG. 22. The method may include directing a pulse of laser illumination upon a first position on an inner surface of the chamber as shown in FIG. 23C. The method further includes directing laser illumination upon a second position on the inner surface of the chamber to generate an illumination area, the second position being different than the first position; and moving the laser illumination relative to the microfluidic device, thereby changing the position of the illumination area to a third position on the inner surface of the chamber, where the change in the position of the illumination area induces (or contributes to) the repositioning of the micro-object, as shown in FIG. 23E and FIG. 23F. The third position of laser illumination may be proximal to the opening of the chamber.

The illumination area of the laser illumination may be greater than or equal to a circular area including a diameter of 5 um. In some embodiments, the illumination area may be equivalent to a circular area including a diameter from 5 um to 50 um.

Figure 23G:
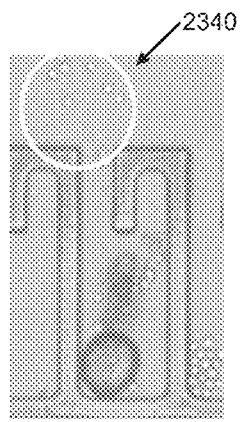

The moving of the laser illumination may controllably generate a bubble having a trajectory within the chamber, where the bubble and its trajectory induces (or contributes to) the repositioning of the micro-object. The repositioning of the micro-object may move the micro-object towards the opening of the chamber, as shown in FIGS. 23D-23E. In some embodiments, the repositioning of the micro-object may result in the micro-object being exported from the chamber into the flow region, as shown in FIGS. 23F and 23G.

The method may further include applying a dynamic dielectrophoretic force to the micro-object, where the dynamic dielectrophoretic force may be moved at least in part toward the opening of the chamber, as shown in FIG., 23B. In some embodiments, the dynamic dielectrophoretic force may be applied to the micro-object prior to directing the pulse of laser illumination upon the first position, as in FIG. 23B and action box 1705 of FIG. 22. In other embodiments, the dynamic dielectrophoretic force may be applied to the micro-object after directing the pulse of laser illumination upon the first position and before directing the laser illumination upon the second position and moving the laser illumination, as shown at action box 1745 of FIG. 22. The dynamic dielectrophoretic force may contribute to the repositioning of the micro-object.

In some embodiments, the chamber of the microfluidic device may include a single opening to the flow region. In some embodiments, the flow region may be configured to contain a first fluidic medium and the chamber includes a sequestration pen including: an isolation region for containing a second fluidic medium, the isolation region having a single opening; and a connection region fluidically connecting the isolation region to the flow region, where the isolation region of the microfluidic sequestration pen is an unswept region of the micro-fluidic device, as shown in FIGS. 20A-20E, and 23A-23G. As shown in these figures, prior to being repositioned, the micro-object may be disposed within the isolation region of the sequestration pen.

In some embodiments of the method, the first position of laser illumination on the inner surface of the chamber may be in or proximal to the connection region, as shown in FIG. 23C. The second position of laser illumination may be in the isolation region of the sequestration pen, as shown in FIG. 23E. In some embodiments, the third position of laser illumination may be in or proximal to the connection region of the sequestration pen, as shown in FIG. 23F. In some embodiments, the sequestration pen may further include a hook region. When a hook region of a sequestration pen is present, the first position on the inner surface of the chamber may be in or proximal to the hook region of the sequestration pen, as shown in FIG. 23C. In some other embodiments, the third position of laser illumination may be proximal to the hook region. In some embodiments, the third position of laser illumination may be closer to the connection region than the second position of laser illumination, as shown in FIGS. 23E and 23F.

In some variations, the change in the position of the laser illumination may occur at a fixed rate, creating a path of laser illumination between the starting position and the ending position. The change in the position of the illumination area may occur with constant illumination.

In some variations, the micro-object may be a biological cell and the repositioning of the micro-object may result in the micro-object being exported from the chamber into the flow region. The method may further include: exporting the biological cell from the flow region and out of the microfluidic device to a culturing vessel, where the biological cell may have a probability of viability of at least 80% upon further culturing, as described above and in Experiment 2. In some embodiments, the biological cell is a plurality of biological cells and exporting may include exporting at least 5, 9, 10, 15, or 20 biological cells out of the microfluidic device to the culturing vessel. In some embodiments, the biological cell may be a non-adherent biological cell.

Changing the position of the laser illumination may be performed at less than 70 microns/sec when the micro-object is a biological cell that is a non-adherent cell, as described above and in Experiment 2. In some variations, changing the position of the laser illumination may be performed at 50 microns/sec when the micro-object is a biological cell that is a non-adherent cell.

Method of culturing an attachment-dependent cell. Attachment-dependent (e.g., adherent) biological cells may be grown within a microfluidic environment. An attachment-dependent cell may be introduced into a chamber of a microfluidic device, where the microfluidic device has a base, a microfluidic circuit structure disposed on the base, and a cover which collectively define a microfluidic circuit. The microfluidic circuit may include the chamber and a flow region for containing a flow of a first fluidic medium, where the inner surfaces of the flow region comprise a first surface coating. The chamber of the microfluidic device has a single opening to the flow region, and an inner surface of the chamber (e.g., one or more surfaces, or all surfaces of the chamber) may include a second surface coating. The attachment-dependent cell may be cultured for a first period of time, which may be 8 h, 12 h, 1 day, 2 days, 3 days or more. During the first period of time, the attachment-dependent cell may divide to form at least one daughter cell. The attachment-dependent cell may be disengaged from the coated inner surface of the chamber, and may be exported from the chamber.

The second surface coating of the inner surface of the chamber may promote adhesion of the attachment-dependent cell. The second surface coating may additionally promote cell-spreading of the attachment-dependent biological cell.

In some embodiments, the microfluidic circuit structure and the cover may be an integral structure of the microfluidic device. In yet other embodiments, the microfluidic circuit structure and the cover are distinct structures of the microfluidic device. The microfluidic device for culturing an attachment-dependent cell may further include a single inlet through which the first medium can be input into the flow region; and a single outlet through which the first medium can be removed from the flow region.

The chamber for culturing an attachment-dependent cell may be a sequestration pen having any combination of features of a sequestration pen as described herein. The sequestration pen may include an isolation region for containing a second fluidic medium, the isolation region having a single opening; and a connection region fluidically connecting the isolation region to the flow region, where the isolation region of the microfluidic sequestration pen is an unswept region of the microfluidic device. In some variations, the connection region of the sequestration pen may have a proximal opening into the microfluidic channel having a width $W_{con}$ ranging from about 20 microns to about 100 microns and a distal opening into the isolation region of the sequestration pen. The connection region may have a length $L_{con}$ of the connection region from the proximal opening to the distal opening as least 1.0 times a width $W_{con}$ of the proximal opening of the connection region. The flow region of a microfluidic device having a sequestration pen may further include a microfluidic channel and the sequestration pen opens to the microfluidic channel. The proximal opening of the connection region of the sequestration pen may open laterally to the flow region/microfluidic channel. That is, the inner surface of the base of the sequestration pen may be disposed at the same level as an inner surface of a base of the flow region/microfluidic channel.

The first surface coating of the flow region/microfluidic channel of the microfluidic device utilized for culturing the attachment-dependent biological cell may include covalently bound surface modifying ligands. The first surface coating may include hydrophilic moieties, which may include polyethylene oxide moieties, carboxylic acid moieties or a combination of polyethylene oxide moieties and carboxylic acid moieties. In some embodiments, the first surface coating may include a polyethylene glycol (PEG) polymer, such as PEG-5k, but the method is not so limited. Other surface coatings may be used, and the first surface coating may include a mixture of covalently bound surface modifying ligands. The first surface coating of the flow region, however, does not promote attachment or spreading of attachment-dependent cells. The first surface coating is typically introduced before any cells are introduced into the microfluidic device and additionally, before the second surface coating is introduced into the chamber. Further details of introducing the first surface coating to the flow region/microfluidic channel of the microfluidic device are described below and in International Application No. PCT/US2017/034832, entitled "Covalently Modified Surfaces, Kits, and Methods of Preparation and Use, filed on May 26, 2017, the entire contents of which are herein incorporated by reference in its entirety. Other examples of suitable hydrophilic surface modifying ligands for use in the first surface coating are also described in in the above titled International Application No. PCT/US2017/034832.

The method of culturing an attachment-dependent biological cell may further include contacting an inner surface of the chamber with a chamber surface coating reagent, thereby forming a second surface coating. The second surface coating may be introduced after the first surface coating is already present within the flow region/microfluidic channel of the microfluidic device. Introduction after the flow region/microfluidic channel includes the first surface coating ensures that the second surface coating will be installed only within the chamber of the microfluidic device and not within the flow region/microfluidic channel. It is preferential that the second surface coating, which promotes adhesion and/or cell spreading is not present in the flow region/microfluidic channel to prevent attachment-dependent cells, upon introduction to the flow region/microfluidic channel of the device, from attaching, growing and possibly obstructing the flow region/microfluidic channel of the microfluidic device.

The second surface coating may be introduced in a two-step process. An initial surface modification may be introduced into the chamber, providing a covalently coupled streptavidin functionalized surface within the chamber. The surface functionalization reagent, which may contain, but is not limited to, a streptavidin coupling reagent such as DBCO-streptavidin (see Examples below and FIGS. 7 and 8A to 8E) may be introduced to the microfluidic device by flowing the surface functionalization reagent via an inlet port into the flow region/microfluidic channel of the microfluidic under positive pressure, thereby introducing the surface modification reagent into the chamber. The surface functionalization reagent covalently couples to appropriate reactive moieties present on the inner surfaces of the chamber, and provides the covalently coupled streptavidin functionalized surface. This functionalized surface is prepared before any attachment-dependent cell is introduced into the microfluidic device. The surface functionalization is not limited to the use of a DBCO streptavidin coupling reagent but may instead include a reactive moiety (e.g., a DBCO or acyclic alkyne moiety configured to react with the prepared surface within the chamber) covalently attached to a surface functionalization moiety such as an aldehyde or other coupling moiety capable of reacting with a reactive moiety of a surface coating reagent.

The second step of introducing the second surface coating into the chamber includes introducing the chamber surface coating reagent into the flow region/microfluidic channel via the inlet port. The chamber surface coating reagent includes a biotin reactive moiety attached to a surface modifying ligand, where the biotin of the chamber surface coating reagent binds with the streptavidin functionalized surface, thereby forming a second surface coating presenting the surface modifying ligand. The chamber surface coating reagent may further include a mixture of biotinylated surface modifying ligands, which upon coupling with the streptavidin functionalized surface within the chamber provides a second surface coating including a mixture of surface modifying ligands.

At least one ligand of the mixture of surface modifying ligands includes a ligand that promotes adhesion and, may also promote cell spreading. The ligand promoting adhesion may include a peptide having an adhesive binding motif. Many different peptide adhesive binding motifs are known and may be utilized in the second surface coating, include but are not limited to RGD, LDV, IKVAV (SEQ ID NO. 1), or YIGSR (SEQ ID NO. 2). In some embodiments, the ligand promoting adhesion is an RGD peptide. In other embodiments, a polymeric or proteinaceous ligand promoting adhesion may be used such as poly-l-lysine, Fibronectin or even streptavidin itself. Since the functionalized surface of the chamber will couple with a biotin moiety, a wide variety of biotinylated adhesion promoting molecules may be used. In some embodiments, the chamber surface coating reagent may contain surface modifying ligands that are, for example, all RGD peptides or all streptavidin (100% of the surface modifying ligands).

The chamber surface coating reagent containing a mixture of surface modifying ligands may further include at least one ligand of the mixture of surface modifying ligands which does not promote adhesion. Such admixture can limit the extent of adhesion that is promoted by the second surface coating, such that repositioning and export of attachment-dependent cells, after culturing may be successful. The surface modifying ligands that do not promote adhesion may be selected from a wide variety of hydrophilic or non-hydrophobic surface modifying moieties such as but not limited to PEG polymers which may or may not be further substituted. In some embodiments, the same surface modifying ligands as in the first surface coating may be used in the mixture of surface modifying ligands of the second surface coating.

The extent of promotion of adhesion may be customized as needed by varying the ratio of the adhesion promoting surface modifying ligands to the non-adhesion promoting surface modifying ligands in the chamber surface coating reagent. The ratio may be determined experimentally for a specific type of attachment-dependent cell or may be generalized for all types of attachment-dependent cells. In some embodiments, at least 0.5% of ligands in the mixture of surface modifying ligands may include a peptide having an adhesive binding motif. In some embodiments, at least 1.0% of ligands in the mixture of surface modifying ligands may include a peptide having an adhesive binding motif.

In various embodiments, the chamber surface coating reagent may include about 0.01%, about 0.05%, about 0.1%, about 0.2%, about 0.3%, about 0.4%, about 0.5%, about 0.6%, about 0.7%, about 0.8%, about 0.9%, about 1.0%, about 2.0%, about 3.0%, about 4.0%, about 5.0%, about 6.0%, about 7.0%, about 8.0%, about 9.0%, about 10%, about 15%, about 20%, about 25%, or more of the surface modifying ligand promoting adhesion compared to the amount of the non-adhesion promoting surface modifying ligand in the mixture of surface modifying ligands. In other embodiments, the percent of surface modifying ligands promoting adhesion in the mixture of the surface modifying ligands of the chamber surface coating reagent may range from 0.1% to 10%, 0.2% to 8%, 0.3% to 6%, 0.4% to 4%, 0.5% to 2%, 0.6% to 1.8%, 0.7% to 1.6%, 0.8% to 1.4%, or 0.9% to 1.2%, or any range defined by any of the preceding end points.

The attachment-dependent cell may be introduced into the flow region/microfluidic channel of the microfluidic device by any suitable force including fluidic flow, gravity, and the like. The attachment-dependent cell may be introduced into the chamber or sequestration pen before or after the chamber surface coating reagent is introduced into the chamber or sequestration pen but introduction before or simultaneously with the chamber surface coating reagent promotes clonal export. In some embodiments, introducing the attachment-dependent cell and contacting the inner surface of the chamber/sequestration pen with a chamber surface coating reagent is performed by introducing the attachment-dependent cell into the flow region/microfluidic channel in a solution including the chamber surface coating reagent. The molecules of the chamber surface coating reagent may diffuse from the flow region/microfluidic channel into the chamber/sequestration pen in order to react with functionalized surfaces of the chamber/sequestration pen to provide the second surface coating. The attachment-dependent cell may be introduced into the chamber using any suitable force and may be introduced using dielectrophoretic forces.

The attachment-dependent cell may be repositioned and optionally, exported using the methods as described above and in Experiment 1, in any combination.

Kits. Kits are provided for culturing attachment-dependent cells including a chamber surface functionalization reagent. In some embodiments, kits can further comprise a chamber surface coating reagent. The chamber surface functionalization reagent is a molecule which may have a reactive moiety for reacting with a prepared surface of a chamber of a microfluidic device and a surface functionalization moiety, and has a chemical structure where the reactive moiety is covalently attached to the surface functionalization moiety. The chamber surface functionalization reagent may include a first molecule comprising a first reactive moiety for reacting with a prepared surface of a chamber of a microfluidic device and a first surface functionalization moiety, wherein the first reactive moiety is covalently attached to the first surface functionalization moiety.

In some embodiments, the first reactive moiety may be an alkynyl moiety. In some embodiments, the first alkynyl moiety may be a cyclooctynyl moiety. In some other embodiments, the cyclooctynyl moiety may be further substituted, such as dibenzo substitution as one non-limiting example. In some embodiments, the first surface functionalization moiety may be a biotin moiety or a streptavidin moiety. In other embodiments, the first surface functionalization moiety may be a moiety configured to covalently couple to a reactive moiety of a surface coating reagent.

In some other embodiments, the first surface functionalization moiety of the first molecule of the chamber surface functionalization reagent may promote micro-object adhesion. In some embodiments, the first surface functionalization moiety of the first molecule of the chamber surface functionalization reagent may be a peptide including an adhesive motif. The first surface modifying ligand of the first molecule of the chamber surface functionalization reagent may be a peptide including a RGD sequence, a LDV sequence, an IKVAV sequence (SEQ ID NO: 1), or a YIGSR sequence (SEQ ID NO: 2).

In other embodiments, the chamber surface functionalization reagent may include a mixture of the first molecule and a second molecule, where the second molecule may include a reactive moiety for reacting with the prepared surface of the chamber of the microfluidic device and a second surface modifying ligand, where the reactive moiety of the second molecule is covalently attached to the second surface modifying ligand, and where the second surface modifying ligand may not promote micro-object adhesion. The surface functionalization moiety of the surface functionalization reagent molecule may be a biotin moiety or a streptavidin moiety. In some embodiments, the ratio of the first molecule of the chamber surface functionalization reagent to the second molecule of the chamber surface functionalization reagent may be from about 0.1:99.9 to about 10:90 on a m/m basis. In some embodiments, the second surface modifying ligand may include polyethylene oxide moieties, carboxylic acid moieties or a combination of polyethylene oxide moieties and carboxylic acid moieties. In other embodiments, the second surface modifying ligand may include a PEG polymer. The first molecule of the chamber surface functionalization reagent and the second molecule of the chamber surface functionalization reagent may be provided in separate containers.

The chamber surface coating reagent of the kit may include a first molecule including a reactive moiety for reacting with a functionalized surface of a chamber (e.g., a surface functionalization moiety of the functionalized surface of the chamber) and a first surface modifying ligand, and where the reactive moiety of the first molecule of the chamber surface coating reagent is covalently attached to the first surface modifying ligand. The first molecule of the chamber surface coating reagent may have a structure where the reactive moiety may be covalently attached to the first surface modifying ligand. The reactive moiety of the first molecule of the chamber surface coating reagent may be a streptavidin moiety or a biotin moiety. The first surface modifying ligand of the first molecule of the chamber surface coating reagent may promote micro-object adhesion. In various embodiments, the first surface modifying ligand may be a peptide having an adhesive motif. For example, the first surface modifying ligand may be a peptide having an amino acid sequence such as a RGD sequence, a LDV sequence, an IKVAV sequence (SEQ ID NO: 1), or a YIGSR sequence (SEQ ID NO: 2).

In various embodiments, the chamber surface coating reagent may include a mixture of the first molecule and a second molecule, where the second molecule may include a second reactive moiety for reacting with the functionalized surface of the chamber (e.g., a surface functionalization moiety of the functionalized surface of the chamber), and a second surface modifying ligand, where the second reactive moiety may be covalently attached to the second surface modifying ligand, and where the second surface modifying ligand may not promote micro-object adhesion. The reactive moiety of the second molecule of the chamber surface coating reagent may be a streptavidin moiety or a biotin moiety. The second molecule of the chamber surface coating reagent may have a structure where the reactive moiety is covalently attached to the second surface modifying ligand. The second surface modifying ligand may include polyethylene oxide moieties, carboxylic acid moieties or a combination of polyethylene oxide moieties and carboxylic acid moieties. In various embodiments, the second surface modifying ligand may include a PEG polymer. The mixture of the first and second molecules of the chamber surface coating reagent may be present in a ratio of the first molecule to the second molecule from about 0.1%: 99.1% to 10%: 90% on a m/m basis. In various embodiments, the percent of surface modifying ligands promoting adhesion in the mixture of the surface modifying ligands of the chamber surface coating reagent may range from 0.1% to 10%, 0.2% to 8%, 0.3% to 6%, 0.4% to 4%, 0.5% to 2%, 0.6% to 1.8%, 0.7% to 1.6%, 0.8% to 1.4%, or 0.9% to 1.2%, or any range defined by any of the preceding end points. The first molecule and the second molecule of the chamber surface coating reagent may be provided in separate containers.

In various embodiments, the chamber surface coating reagent may include a third or more molecules, where each of the third or more molecules does not promote adhesion. Each of the third or more molecule may have a chemical structure including a reactive moiety for reacting with the functionalized surface of the chamber and a surface modifying ligand. The reactive moiety of each of the third or more molecules may be biotin or streptavidin. The surface modifying ligand of each of the third or more molecules may include polyethylene oxide moieties, carboxylic acid moieties or a combination of polyethylene oxide moieties and carboxylic acid moieties. Each of the third or more molecules has a chemical structure where the reactive moiety and the surface modifying ligand may be covalently coupled. Each of the third or more molecules may have a different chemical structure from the chemical structure of the second molecule. The third or more molecules may be present in the chamber surface coating reagent in a ratio of the first molecule promoting adhesion to the combination of the second, third or more molecules of about 0.1%: 99.1% to 10%: 90% on a m/m basis. In various embodiments, the percent of first molecule promoting adhesion in the mixture of the second, third or more molecules that do not promote adhesion, of the chamber surface coating reagent, may range from 0.1% to 10%, 0.2% to 8%, 0.3% to 6%, 0.4% to 4%, 0.5% to 2%, 0.6% to 1.8%, 0.7% to 1.6%, 0.8% to 1.4%, or 0.9% to 1.2%, or any range defined by any of the preceding end points. The third or more molecule of the chamber surface coating reagent may be provided in separate containers.

The kit for culturing attachment-dependent cells may further include a disengagement reagent for assisting repositioning or export according to any of the methods described herein. The disengagement reagent may be a peptidase. In various embodiments, the peptidase may be a trypsin or a trypsin-like peptidase (e.g., a peptidase having protein cleaving activity similar to that of trypsin.

The kit for culturing attachment-dependent cells may further include the microfluidic device including the chamber having the prepared surface. The microfluidic device may have any combination of features as described herein.

The kit for culturing attachment-dependent cells may further include an export medium. In some embodiments, the export medium may be a serum-free medium.

Microfluidic devices and systems for operating and observing such devices.

Microfluidic device/system feature cross-applicability. It should be appreciated that various features of microfluidic devices, systems, and motive technologies described herein may be combinable or interchangeable. For example, features described herein with reference to the microfluidic device 100, 175, 200, 300, 320, 400, 450, 520 and system attributes as described in FIGS. 1A-5B may be combinable or interchangeable.

Microfluidic devices. FIG. 1A illustrates an example of a microfluidic device 100. A perspective view of the microfluidic device 100 is shown having a partial cut-away of its cover 110 to provide a partial view into the microfluidic device 100. The microfluidic device 100 generally comprises a microfluidic circuit 120 comprising a flow path 106 through which a fluidic medium 180 can flow, optionally carrying one or more micro-objects (not shown) into and/or through the microfluidic circuit 120.

As generally illustrated in FIG. 1A, the microfluidic circuit 120 is defined by an enclosure 102. Although the enclosure 102 can be physically structured in different configurations, in the example shown in FIG. 1A the enclosure 102 is depicted as comprising a support structure 104 (e.g., a base), a microfluidic circuit structure 108, and a cover 110. The support structure 104, microfluidic circuit structure 108, and cover 110 can be attached to each other. For example, the microfluidic circuit structure 108 can be disposed on an inner surface 109 of the support structure 104, and the cover 110 can be disposed over the microfluidic circuit structure 108. Together with the support structure 104 and cover 110, the microfluidic circuit structure 108 can define the elements of the microfluidic circuit 120, forming a three-layer structure.

The support structure 104 can be at the bottom and the cover 110 at the top of the microfluidic circuit 120 as illustrated in FIG. 1A. Alternatively, the support structure 104 and the cover 110 can be configured in other orientations. For example, the support structure 104 can be at the top and the cover 110 at the bottom of the microfluidic circuit 120. Regardless, there can be one or more ports 107 each comprising a passage into or out of the enclosure 102. Examples of a passage include a valve, a gate, a pass-through hole, or the like. As illustrated, port 107 is a pass-through hole created by a gap in the microfluidic circuit structure 108. However, the port 107 can be situated in other components of the enclosure 102, such as the cover 110. Only one port 107 is illustrated in FIG. 1A but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 function as an inlet or an outlet can depend upon the direction that fluid flows through flow path 106.

The support structure 104 can comprise one or more electrodes (not shown) and a substrate or a plurality of interconnected substrates. For example, the support structure 104 can comprise one or more semiconductor substrates, each of which is electrically connected to an electrode (e.g., all or a subset of the semiconductor substrates can be electrically connected to a single electrode). The support structure 104 can further comprise a printed circuit board assembly ("PCBA"). For example, the semiconductor substrate(s) can be mounted on a PCBA.

The microfluidic circuit structure 108 can define circuit elements of the microfluidic circuit 120. Such circuit elements can comprise spaces or regions that can be fluidly interconnected when microfluidic circuit 120 is filled with fluid, such as flow regions (which may include or be one or more flow channels), chambers (which class of circuit elements may also include sub-classes including sequestration pens), traps, and the like. Circuit elements can also include barriers, and the like. In the microfluidic circuit 120 illustrated in FIG. 1A, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material. However, the microfluidic circuit structure need not include a frame 114. For example, the microfluidic circuit structure can consist of (or consist essentially of) the microfluidic circuit material 116.

The microfluidic circuit material 116 can be patterned with cavities or the like to define the circuit elements and interconnections of the microfluidic circuit 120, such as chambers, pens and microfluidic channels. The microfluidic circuit material 116 can comprise a flexible material, such as a flexible polymer (e.g. rubber, plastic, elastomer, silicone, polydimethylsiloxane ("PDMS"), or the like), which can be gas permeable. Other examples of materials that can form the microfluidic circuit material 116 include molded glass, an etchable material such as silicone (e.g. photo-patternable silicone or "PPS"), photo-resist (e.g., SU8), or the like. In some embodiments, such materials—and thus the microfluidic circuit material 116—can be rigid and/or substantially impermeable to gas. Regardless, microfluidic circuit material 116 can be disposed on the support structure 104 and inside the frame 114.

The microfluidic circuit 120 can include a flow region in which one or more chambers can be disposed and/or fluidically connected thereto. A chamber can have one or more openings fluidically connecting the chamber with one or more flow regions. In some embodiments, a flow region comprises or corresponds to a microfluidic channel 122. Although a single microfluidic circuit 120 is illustrated in FIG. 1A, suitable microfluidic devices can include a plurality (e.g., 2 or 3) of such microfluidic circuits. In some embodiments, the microfluidic device 100 can be configured to be a nanofluidic device. As illustrated in FIG. 1A, the microfluidic circuit 120 may include a plurality of microfluidic sequestration pens 124, 126, 128, and 130, where each sequestration pens may have one or more openings. In some embodiments of sequestration pens, a sequestration pen may have only a single opening in fluidic communication with the flow path 106. In some other embodiments, a sequestration pen may have more than one opening in fluidic communication with the flow path 106, e.g., n number of openings, but with n−1 openings that are valved, such that all but one opening is closable. When all the valved openings are closed, the sequestration pen limits exchange of materials from the flow region into the sequestration pen to occur only by diffusion. In some embodiments, the sequestration pens comprise various features and structures (e.g., isolation regions) that have been optimized for retaining micro-objects within the sequestration pen (and therefore within a microfluidic device such as microfluidic device 100) even when a medium 180 is flowing through the flow path 106.

The cover 110 can be an integral part of the frame 114 and/or the microfluidic circuit material 116. Alternatively, the cover 110 can be a structurally distinct element, as illustrated in FIG. 1A. The cover 110 can comprise the same or different materials than the frame 114 and/or the microfluidic circuit material 116. In some embodiments, the cover 110 can be an integral part of the microfluidic circuit material 116. Similarly, the support structure 104 can be a separate structure from the frame 114 or microfluidic circuit material 116 as illustrated, or an integral part of the frame 114 or microfluidic circuit material 116. Likewise, the frame 114 and microfluidic circuit material 116 can be separate structures as shown in FIG. 1A or integral portions of the same structure. Regardless of the various possible integrations, the microfluidic device can retain a three-layer structure that includes a base layer and a cover layer that sandwich a middle layer in which the microfluidic circuit 120 is located.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of cover 110 (e.g., one or more portions positioned over sequestration pens 124, 126, 128, 130) can comprise a deformable material that interfaces with rigid materials of the cover 110. Microfluidic devices having covers that include both rigid and deformable materials have been described, for example, in U.S. Pat. No. 10,058,865 (Breinlinger et al.), the contents of which are incorporated herein by reference. In some embodiments, the cover 110 can further include one or more electrodes. The one or more electrodes can comprise a conductive oxide, such as indium-tin-oxide (ITO), which may be coated on glass or a similarly insulating material. Alternatively, the one or more electrodes can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. Pat. No. 9,227,200 (Chiou et al.), the contents of which are incorporated herein by reference. In some embodiments, the cover 110 and/or the support structure 104 can be transparent to light. The cover 110 may also include at least one material that is gas permeable (e.g., PDMS or PPS).

In the example shown in FIG. 1A, the microfluidic circuit 120 is illustrated as comprising a microfluidic channel 122 and sequestration pens 124, 126, 128, 130. Each pen comprises an opening to channel 122, but otherwise is enclosed such that the pens can substantially isolate micro-objects inside the pen from fluidic medium 180 and/or micro-objects in the flow path 106 of channel 122 or in other pens. The walls of the sequestration pen extend from the inner surface 109 of the base to the inside surface of the cover 110 to provide enclosure. The opening of the sequestration pen to the microfluidic channel 122 is oriented at an angle to the flow 106 of fluidic medium 180 such that flow 106 is not directed into the pens. The vector of bulk fluid flow in channel 122 may be tangential or parallel to the plane of the opening of the sequestration pen, and is not directed into the opening of the pen. In some instances, pens 124, 126, 128, 130 are configured to physically isolate one or more micro-objects within the microfluidic circuit 120. Sequestration pens in accordance with the present disclosure can comprise various shapes, surfaces and features that are optimized for use with DEP, OET, OEW, fluid flow, magnetic forces, centripetal, and/or gravitational forces, as will be discussed and shown in detail below.

The microfluidic circuit 120 may comprise any number of microfluidic sequestration pens. Although five sequestration pens are shown, microfluidic circuit 120 may have fewer or more sequestration pens. As shown, microfluidic sequestration pens 124, 126, 128, and 130 of microfluidic circuit 120 each comprise differing features and shapes which may provide one or more benefits useful for maintaining, isolating, assaying or culturing biological micro-objects. In some embodiments, the microfluidic circuit 120 comprises a plurality of identical microfluidic sequestration pens.

Figure 1B:
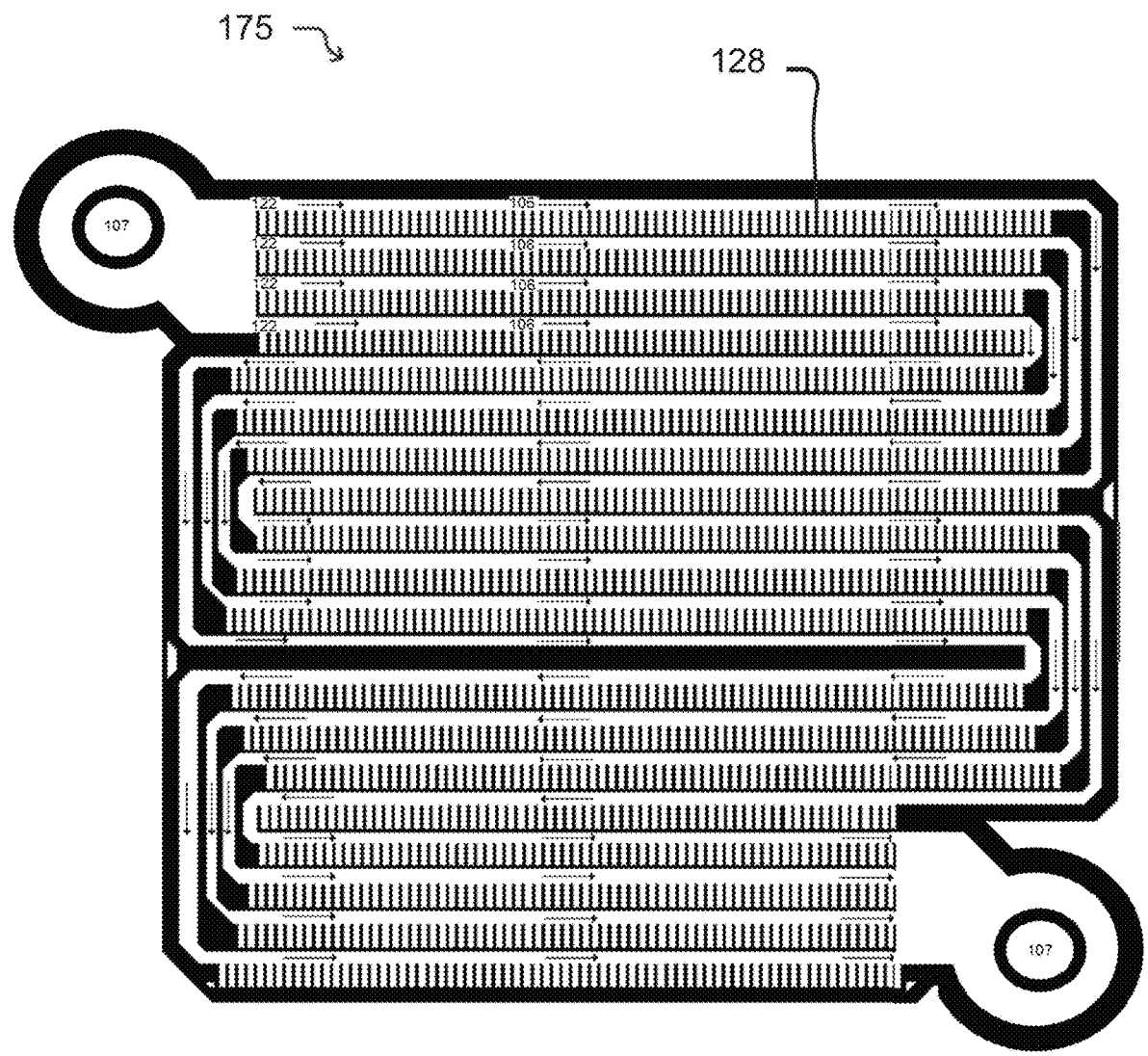
FIG. 1B illustrates a microfluidic device with sequestration pens according to an embodiment of the disclosure.

In the embodiment illustrated in FIG. 1A, a single flow path 106 containing a single channel 122 is shown. However, other embodiments may contain multiple channels 122 within a single flow path 106, as shown in FIG. 1B. The microfluidic circuit 120 further comprises an inlet valve or port 107 in fluid communication with the flow path 106, whereby fluidic medium 180 can access the flow path 106 (and channel 122). In some instances, the flow path 106 comprises a substantially straight path. In other instances, the flow path 106 is arranged in a non-linear or winding manner, such as a zigzag pattern, whereby the flow path 106 travels across the microfluidic device 100 two or more times, e.g., in alternating directions. The flow in the flow path 106 may proceed from inlet to outlet or may be reversed and proceed from outlet to inlet.

One example of a multi-channel device, microfluidic device 175, is shown in FIG. 1B, which may be like microfluidic device 100 in other respects. Microfluidic device 175 and its constituent circuit elements (e.g., channels 122 and sequestration pens 128) may have any of the dimensions discussed herein. The microfluidic circuit illustrated in FIG. 1B has two inlet/outlet ports 107 and a flow path 106 containing four distinct channels 122. The number of channels into which the microfluidic circuit is sub-divided may be chosen to reduce fluidic resistance. For example, the microfluidic circuit may include 1, 2, 3, 4, 5, 6, 7, 8, 9, 10, or more channels to provide a selected range of fluidic resistance. Microfluidic device 175 further comprises a plurality of sequestration pens opening off of each channel 122, where each of the sequestration pens is similar to sequestration pen 128 of FIG. 1A, and may have any of the dimensions or functions of any sequestration pen as described herein. However, the sequestration pens of microfluidic device 175 can have different shapes, such as any of the shapes of sequestration pens 124, 126, or 130 of FIG. 1A or as described anywhere else herein. Moreover, microfluidic device 175 can include sequestration pens having a mixture of different shapes. In some instances, a plurality of sequestration pens is configured (e.g., relative to a channel 122) such that the sequestration pens can be loaded with target micro-objects in parallel.

Returning to FIG. 1A, microfluidic circuit 120 further may include one or more optional micro-object traps 132. The optional traps 132 may be formed in a wall forming the boundary of a channel 122, and may be positioned opposite an opening of one or more of the microfluidic sequestration pens 124, 126, 128, 130. The optional traps 132 may be configured to receive or capture a single micro-object from the flow path 106, or may be configured to receive or capture a plurality of micro-objects from the flow path 106. In some instances, the optional traps 132 comprise a volume approximately equal to the volume of a single target micro-object.

Sequestration pens. The microfluidic devices described herein may include one or more sequestration pens, where each sequestration pen is suitable for holding one or more micro-objects (e.g., biological cells, or groups of cells that are associated together). The sequestration pens may be disposed within and open to a flow region, which in some embodiments is a microfluidic channel. Each of the sequestration pens can have one or more openings for fluidic communication to one or more microfluidic channels. In some embodiments, a sequestration pen may have only one opening to a microfluidic channel.

Figure 2A:
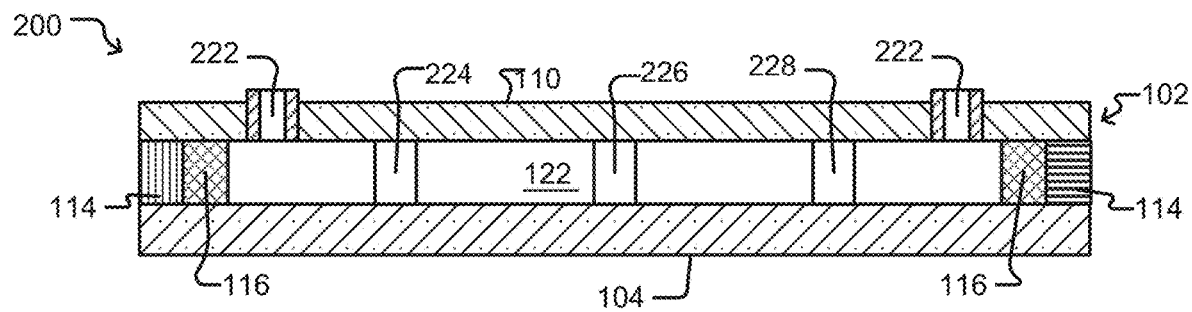
FIGS. 2A to 2B illustrate a microfluidic device having sequestration pens according to some embodiments of the disclosure.
Figure 2B:
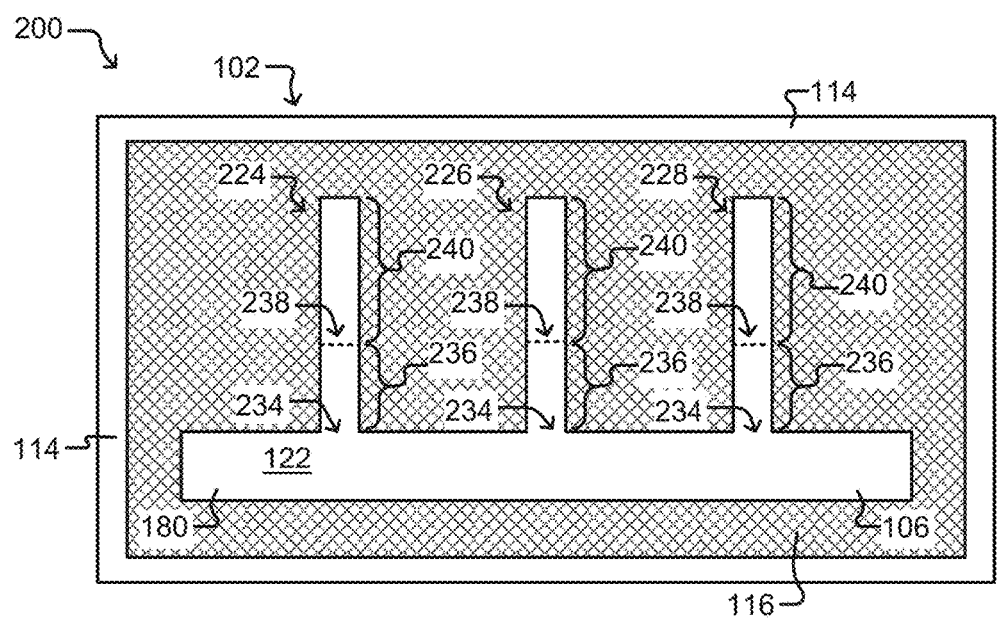
Figure 2C:
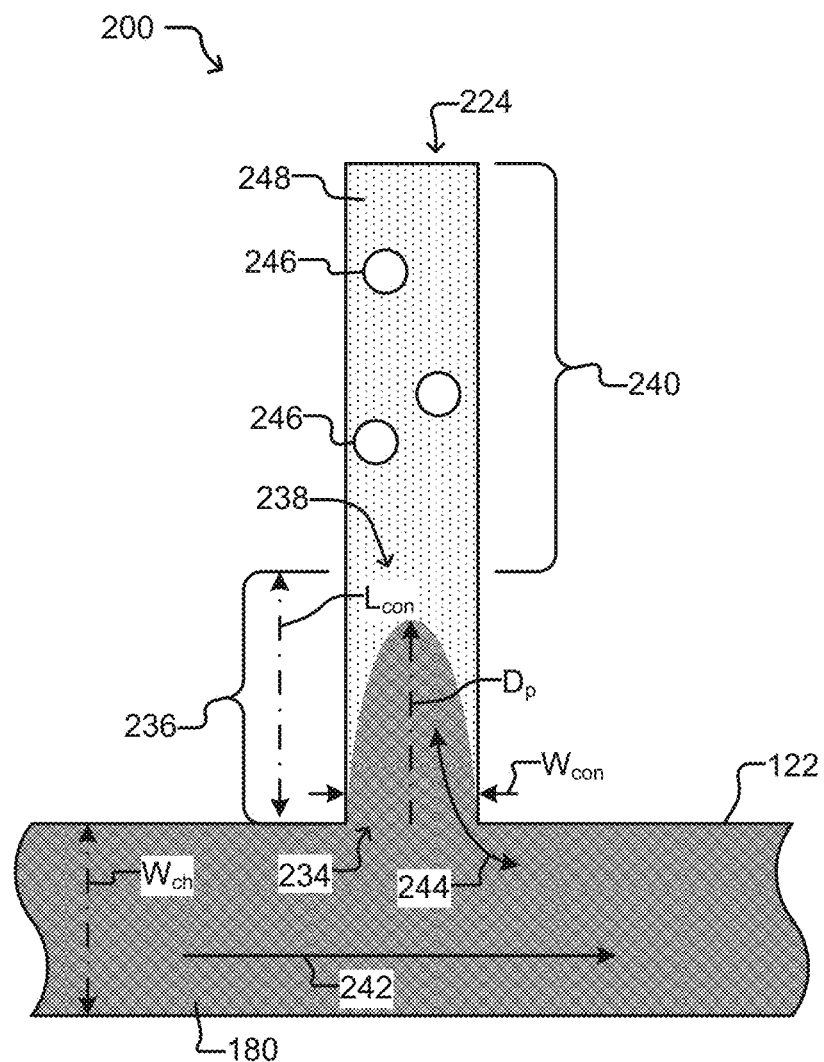
FIG. 2C illustrates a sequestration pen of a microfluidic device according to some embodiments of the disclosure.

FIGS. 2A-2C show sequestration pens 224, 226, and 228 of a microfluidic device 200, which may be like sequestration pen 128 of FIG. 1A. Each sequestration pen 224, 226, and 228 can comprise an isolation region 240 and a connection region 236 fluidically connecting the isolation region 240 to a flow region, which may, in some embodiments include a microfluidic channel, such as channel 122. The connection region 236 can comprise a proximal opening 234 to the flow region (e.g., microfluidic channel 122) and a distal opening 238 to the isolation region 240. The connection region 236 can be configured so that the maximum penetration depth of a flow of a fluidic medium (not shown) flowing in the microfluidic channel 122 past the sequestration pen 224, 226, and 228 does not extend into the isolation region 240, as discussed below for FIG. 2C. In some embodiments, streamlines from the flow in the microfluidic channel do not enter the isolation region. Thus, due to the connection region 236, a micro-object (not shown) or other material (not shown) disposed in the isolation region 240 of a sequestration pen 224, 226, and 228 can be isolated from, and not substantially affected by, a flow of fluidic medium 180 in the microfluidic channel 122.

The sequestration pens 224, 226, and 228 of FIGS. 2A-2C each have a single opening which opens directly to the microfluidic channel 122. The opening of the sequestration pen may open laterally from the microfluidic channel 122, as shown in FIG. 2A, which depicts a vertical cross-section of microfluidic device 200. FIG. 2B shows a horizontal cross-section of microfluidic device 200. An electrode activation substrate 206 can underlie both the microfluidic channel 122 and the sequestration pens 224, 226, and 228. The upper surface of the electrode activation substrate 206 within an enclosure of a sequestration pen, forming the floor of the sequestration pen, can be disposed at the same level or substantially the same level of the upper surface the of electrode activation substrate 206 within the microfluidic channel 122 (or flow region if a channel is not present), forming the floor of the flow channel (or flow region, respectively) of the microfluidic device. The electrode activation substrate 206 may be featureless or may have an irregular or patterned surface that varies from its highest elevation to its lowest depression by less than about 3 micrometers (microns), 2.5 microns, 2 microns, 1.5 microns, 1 micron, 0.9 microns, 0.5 microns, 0.4 microns, 0.2 microns, 0.1 microns or less. The variation of elevation in the upper surface of the substrate across both the microfluidic channel 122 (or flow region) and sequestration pens may be equal to or less than about 10%, 7%, 5%, 3%, 2%, 1%. 0.9%, 0.8%, 0.5%, 0.3% or 0.1% of the height of the walls of the sequestration pen. Alternatively, the variation of elevation in the upper surface of the substrate across both the microfluidic channel 122 (or flow region) and sequestration pens may be equal to or less than about 2%, 1%. 0.9%, 0.8%, 0.5%, 0.3%, 0.2%, or 0.1% of the height of the substrate. While described in detail for the microfluidic device 200, this may also apply to any of the microfluidic devices described herein.

The microfluidic channel 122 and connection region 236 can be examples of swept regions, and the isolation regions 240 of the sequestration pens 224, 226, and 228 can be examples of unswept regions. Sequestration pens like 224, 226, 228 have isolation regions wherein each isolation region has only one opening, which opens to the connection region of the sequestration pen. Fluidic media exchange in and out of the isolation region so configured can be limited to occurring substantially only by diffusion. As noted, the microfluidic channel 122 and sequestration pens 224, 226, and 228 can be configured to contain one or more fluidic media 180. In the example shown in FIGS. 2A-2B, ports 222 are connected to the microfluidic channel 122 and allow the fluidic medium 180 to be introduced into or removed from the microfluidic device 200. Prior to introduction of the fluidic medium 180, the microfluidic device may be primed with a gas such as carbon dioxide gas. Once the microfluidic device 200 contains the fluidic medium 180, the flow 242 (see FIG. 2C) of fluidic medium 180 in the microfluidic channel 122 can be selectively generated and stopped. For example, as shown, the ports 222 can be disposed at different locations (e.g., opposite ends) of the flow region (microfluidic channel 122), and a flow 242 of the fluidic medium can be created from one port 222 functioning as an inlet to another port 222 functioning as an outlet.

FIG. 2C illustrates a detailed view of an example of a sequestration pen 224, which may contain one or more micro-objects 246, according to some embodiments. The flow 242 of fluidic medium 180 in the microfluidic channel 122 past the proximal opening 234 of the connection region 236 of sequestration pen 224 can cause a secondary flow 244 of the fluidic medium 180 into and out of the sequestration pen 224. To sequester the micro-objects 246 in the isolation region 240 of the sequestration pen 224 from the secondary flow 244, the length $L_{con}$ of the connection region 236 of the sequestration pen 224 (i.e., from the proximal opening 234 to the distal opening 238) should be greater than the penetration depth $D_p$ of the secondary flow 244 into the connection region 236. The penetration depth $D_p$ depends upon a number of factors, including the shape of the microfluidic channel 122, which may be defined by a width $W_{con}$ of the connection region 236 at the proximal opening 234; a width $W_{con}$ of the microfluidic channel 122 at the proximal opening 234; a height $H_{ch}$ of the channel 122 at the proximal opening 234; and the width of the distal opening 238 of the connection region 236. Of these factors, the width $W_{con}$ of the connection region 236 at the proximal opening 234 and the height $H_{ch}$ of the channel 122 at the proximal opening 234 tend to be the most significant. In addition, the penetration depth $D_p$ can be influenced by the velocity of the fluidic medium 180 in the channel 122 and the viscosity of fluidic medium 180. However, these factors (i.e., velocity and viscosity) can vary widely without dramatic changes in penetration depth $D_p$. For example, for a microfluidic chip 200 having a width $W_{con}$ of the connection region 236 at the proximal opening 234 of about 50 microns, a height $H_{ch}$ of the channel 122 at the proximal opening 122 of about 40 microns, and a width $W_{ch}$ of the microfluidic channel 122 at the proximal opening 122 of about 100 microns to about 150 microns, the penetration depth $D_p$ of the secondary flow 244 ranges from less than 1.0 times $W_{con}$ (i.e., less than 50 microns) at a flow rate of 0.1 microliters/sec to about 2.0 times $W_{con}$ (i.e., about 100 microns) at a flow rate of 20 microliters/sec, which represents an increase in $D_p$ of only about 2.5-fold over a 200-fold increase in the velocity of the fluidic medium 180.

In some embodiments, the walls of the microfluidic channel 122 and sequestration pen 224, 226, or 228 can be oriented as follows with respect to the vector of the flow 242 of fluidic medium 180 in the microfluidic channel 122: the microfluidic channel width $W_{ch}$ (or cross-sectional area of the microfluidic channel 122) can be substantially perpendicular to the flow 242 of medium 180; the width $W_{con}$ (or cross-sectional area) of the connection region 236 at opening 234 can be substantially parallel to the flow 242 of medium 180 in the microfluidic channel 122; and/or the length $L_{con}$ of the connection region can be substantially perpendicular to the flow 242 of medium 180 in the microfluidic channel 122. The foregoing are examples only, and the relative position of the microfluidic channel 122 and sequestration pens 224, 226 and 228 can be in other orientations with respect to each other.

In some embodiments, for a given microfluidic device, the configurations of the microfluidic channel 122 and the opening 234 may be fixed, whereas the rate of flow 242 of fluidic medium 180 in the microfluidic channel 122 may be variable. Accordingly, for each sequestration pen 224, a maximal velocity $V_{max}$ for the flow 242 of fluidic medium 180 in channel 122 may be identified that ensures that the penetration depth $D_p$ of the secondary flow 244 does not exceed the length $L_{con}$ of the connection region 236. When $V_{max}$ is not exceeded, the resulting secondary flow 244 can be wholly contained within the connection region 236 and does not enter the isolation region 240. Thus, the flow 242 of fluidic medium 180 in the microfluidic channel 122 (swept region) is prevented from drawing micro-objects 246 out of the isolation region 240, which is an unswept region of the microfluidic circuit, resulting in the micro-objects 246 being retained within the isolation region 240. Accordingly, selection of microfluidic circuit element dimensions and further selection of the operating parameters (e.g., velocity of fluidic medium 180) can prevent contamination of the isolation region 240 of sequestration pen 224 by materials from the microfluidic channel 122 or another sequestration pen 226 or 228. It should be noted, however, that for many microfluidic chip configurations, there is no need to worry about $V_{max}$ per se, because the chip will break from the pressure associated with flowing fluidic medium 180 at high velocity through the chip before $V_{max}$ can be achieved.

Components (not shown) in the first fluidic medium 180 in the microfluidic channel 122 can mix with the second fluidic medium 248 in the isolation region 240 substantially only by diffusion of components of the first medium 180 from the microfluidic channel 122 through the connection region 236 and into the second fluidic medium 248 in the isolation region 240. Similarly, components (not shown) of the second medium 248 in the isolation region 240 can mix with the first medium 180 in the microfluidic channel 122 substantially only by diffusion of components of the second medium 248 from the isolation region 240 through the connection region 236 and into the first medium 180 in the microfluidic channel 122. In some embodiments, the extent of fluidic medium exchange between the isolation region of a sequestration pen and the flow region by diffusion is greater than about 90%, 91%, 92%, 93%, 94% 95%, 96%, 97%, 98%, or greater than about 99% of fluidic exchange.

In some embodiments, the first medium 180 can be the same medium or a different medium than the second medium 248. In some embodiments, the first medium 180 and the second medium 248 can start out being the same, then become different (e.g., through conditioning of the second medium 248 by one or more cells in the isolation region 240, or by changing the medium 180 flowing through the microfluidic channel 122).

As illustrated in FIG. 2C, the width $W_{con}$ of the connection region 236 can be uniform from the proximal opening 234 to the distal opening 238. The width $W_{con}$ of the connection region 236 at the distal opening 238 can be any of the values identified herein for the width $W_{con}$ the connection region 236 at the proximal opening 234. In some embodiments, the width of the isolation region 240 at the distal opening 238 can be substantially the same as the width $W_{con}$ of the connection region 236 at the proximal opening 234. Alternatively, the width $W_{con}$ of the connection region 236 at the distal opening 238 can be different (e.g., larger or smaller) than the width $W_{con}$ of the connection region 236 at the proximal opening 234. In some embodiments, the width $W_{con}$ of the connection region 236 may be narrowed or widened between the proximal opening 234 and distal opening 238. For example, the connection region 236 may be narrowed or widened between the proximal opening and the distal opening, using a variety of different geometries (e.g., chamfering the connection region, beveling the connection region). Further, any part or subpart of the connection region 236 may be narrowed or widened (e.g. a portion of the connection region adjacent to the proximal opening 234).

Figure 3:
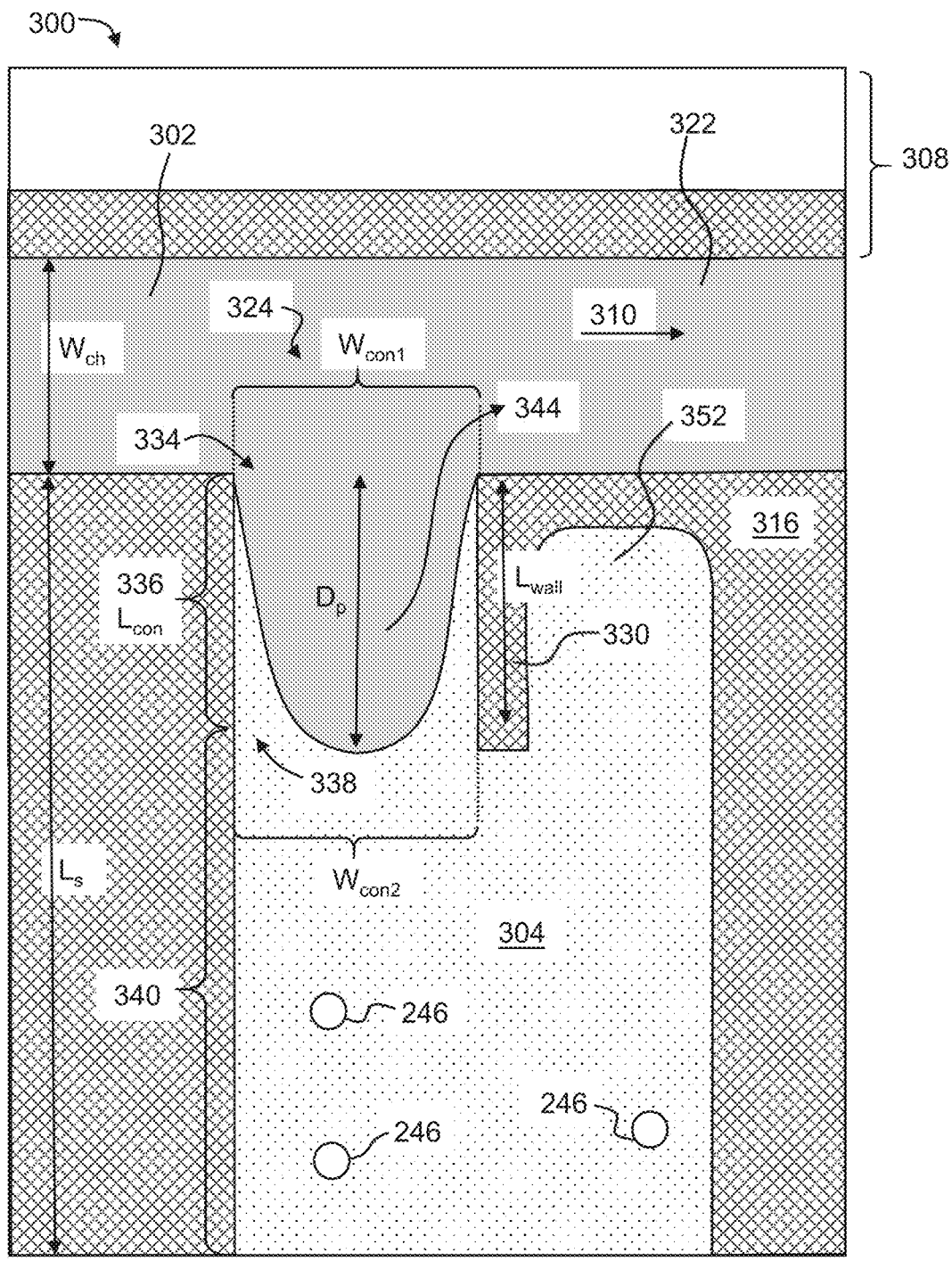
FIG. 3 illustrates a sequestration pen of a microfluidic device according to some embodiments of the disclosure.

FIG. 3 depicts another exemplary embodiment of a microfluidic device 300 containing microfluidic circuit structure 308, which includes a channel 322 and sequestration pen 324, which has features and properties like any of the sequestration pens described herein for microfluidic devices 100, 175, 200, 400, 520 and any other microfluidic devices described herein.

The exemplary microfluidic devices of FIG. 3 includes a microfluidic channel 322, having a width $W_{ch}$, as described herein, and containing a flow 310 of first fluidic medium 302 and one or more sequestration pens 324 (only one illustrated in FIG. 3). The sequestration pens 324 each have a length $L_s$, a connection region 336, and an isolation region 340, where the isolation region 340 contains a second fluidic medium 304. The connection region 336 has a proximal opening 334, having a width $W_{con1}$, which opens to the microfluidic channel 322, and a distal opening 338, having a width $W_{con2}$, which opens to the isolation region 340. The width $W_{con1}$ may or may not be the same as $W_{con2}$, as described herein. The walls of each sequestration pen 324 may be formed of microfluidic circuit material 316, which may further form the connection region walls 330. A connection region wall 330 can correspond to a structure that is laterally positioned with respect to the proximal opening 334 and at least partially extends into the enclosed portion of the sequestration pen 324. In some embodiments, the length $L_{con}$ of the connection region 336 is at least partially defined by length $L_{wall}$ of the connection region wall 330. The connection region wall 330 may have a length $L_{wall}$, selected to be more than the penetration depth $D_p$ of the secondary flow 344. Thus, the secondary flow 344 can be wholly contained within the connection region without extending into the isolation region 340.

The connection region wall 330 may define a hook region 352, which is a sub-region of the isolation region 340 of the sequestration pen 324. Since the connection region wall 330 extends into the inner cavity of the sequestration pen, the connection region wall 330 can act as a physical barrier to shield hook region 352 from secondary flow 344, with selection of the length of $L_{wall}$, contributing to the extent of the hook region. In some embodiments, the longer the length $L_{wall}$ of the connection region wall 330, the more sheltered the hook region 352.

In sequestration pens configured those of FIGS. 2A-2C and 3, the isolation region may have a shape and size of any type, and may be selected to regulate diffusion of nutrients, reagents, and/or media into the sequestration pen to reach to a far wall of the sequestration pen, e.g., opposite the proximal opening of the connection region to the flow region (or microfluidic channel). The size and shape of the isolation region may further be selected to regulate diffusion of waste products and/or secreted products of a biological micro-object out from the isolation region to the flow region via the proximal opening of the connection region of the sequestration pen. In general, the shape of the isolation region is not critical to the ability of the sequestration pen to isolate micro-objects from direct flow in the flow region.

In some other embodiments of sequestration pens, the isolation region may have more than one opening fluidically connecting the isolation region with the flow region of the microfluidic device. However, for an isolation region having a number of n openings fluidically connecting the isolation region to the flow region (or two or more flow regions), n-1 openings can be valved. When the n-1 valved openings are closed, the isolation region has only one effective opening, and exchange of materials into/out of the isolation region occurs only by diffusion.

Examples of microfluidic devices having pens in which biological micro-objects can be placed, cultured, and/or monitored have been described, for example, in U.S. Pat. No. 9,857,333 (Chapman, et al.), U.S. Pat. No. 10,010,882 (White, et al.), and U.S. Pat. No. 9,889,445 (Chapman, et al.), each of which is incorporated herein by reference in its entirety.

Sequestration pen dimensions. Various dimensions and/or features of the sequestration pens and the microfluidic channels to which the sequestration pens open, as described herein, may be selected to limit introduction of contaminants or unwanted micro-objects into the isolation region of a sequestration pen from the flow region/microfluidic channel; limit the exchange of components in the fluidic medium from the channel or from the isolation region to substantially only diffusive exchange; facilitate the transfer of micro-objects into and/or out of the sequestration pens; and/or facilitate growth or expansion of the biological cells. Microfluidic channels and sequestration pens, for any of the embodiments described herein, may have any suitable combination of dimensions, may be selected by one of skill from the teachings of this disclosure, as follows.

The proximal opening of the connection region of a sequestration pen may have a width (e.g., $W_{con}$ or $W_{con1}$) that is at least as large as the largest dimension of a micro-object (e.g., a biological cell, which may be a plant cell, such as a plant protoplast) for which the sequestration pen is intended. In some embodiments, the proximal opening has a width (e.g., $W_{con}$ or $W_{con1}$) of about 20 microns, about 40 microns, about 50 microns, about 60 microns, about 75 microns, about 100 microns, about 150 microns, about 200 microns, or about 300 microns. The foregoing are examples only, and the width (e.g., $W_{con}$ or $W_{con1}$) of a proximal opening can be selected to be a value between any of the values listed above (e.g., about 20-200 microns, about 20-150 microns, about 20-100 microns, about 20-75 microns, about 20-60 microns, about 50-300 microns, about 50-200 microns, about 50-150 microns, about 50-100 microns, about 50-75 microns, about 75-150 microns, about 75-100 microns, about 100-300 microns, about 100-200 microns, or about 200-300 microns).

In some embodiments, the connection region of the sequestration pen may have a length (e.g., $L_{con}$) from the proximal opening to the distal opening to the isolation region of the sequestration pen that is at least 0.5 times, at least 0.6 times, at least 0.7 times, at least 0.8 times, at least 0.9 times, at least 1.0 times, at least 1.1 times, at least 1.2 times, at least 1.3 times, at least 1.4 times, at least 1.5 times, at least 1.75 times, at least 2.0 times, at least 2.25. times, at least 2.5 times, at least 2.75 times, at least 3.0 times, at least 3.5 times, at least 4.0 times, at least 4.5 times, at least 5.0 times, at least 6.0 times, at least 7.0 times, at least 8.0 times, at least 9.0 times, or at least 10.0 times the width (e.g., $W_{con}$ or $W_{con1}$) of the proximal opening. Thus, for example, the proximal opening of the connection region of a sequestration pen may have a width (e.g., $W_{con}$ or $W_{con1}$) from about 20 microns to about 200 microns (e.g., about 50 microns to about 150 microns), and the connection region may have a length $L_{con}$ that is at least 1.0 times (e.g., at least 1.5 times, or at least 2.0 times) the width of the proximal opening. As another example, the proximal opening of the connection region of a sequestration pen may have a width (e.g., $W_{con}$ or $W_{con1}$) from about 20 microns to about 100 microns (e.g., about 20 microns to about 60 microns), and the connection region may have a length $L_{con}$ that is at least 1.0 times (e.g., at least 1.5 times, or at least 2.0 times) the width of the proximal opening.

The microfluidic channel of a microfluidic device to which a sequestration pen opens may have specified size (e.g., width or height). In some embodiments, the height (e.g., $H_{uh}$) of the microfluidic channel at a proximal opening to the connection region of a sequestration pen can be within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height (e.g., $H_{uh}$) of the microfluidic channel (e.g., 122) can be selected to be between any of the values listed above. Moreover, the height (e.g., $H_{uh}$) of the microfluidic channel 122 can be selected to be any of these heights in regions of the microfluidic channel other than at a proximal opening of a sequestration pen.

The width (e.g., $W_{ch}$) of the microfluidic channel at the proximal opening to the connection region of a sequestration pen can be within any of the following ranges: about 20-500 microns, 20-400 microns, 20-300 microns, 20-200 microns, 20-150 microns, 20-100 microns, 20-80 microns, 20-60 microns, 30-400 microns, 30-300 microns, 30-200 microns, 30-150 microns, 30-100 microns, 30-80 microns, 30-60 microns, 40-300 microns, 40-200 microns, 40-150 microns, 40-100 microns, 40-80 microns, 40-60 microns, 50-1000 microns, 50-500 microns, 50-400 microns, 50-300 microns, 50-250 microns, 50-200 microns, 50-150 microns, 50-100 microns, 50-80 microns, 60-300 microns, 60-200 microns, 60-150 microns, 60-100 microns, 60-80 microns, 70-500 microns, 70-400 microns, 70-300 microns, 70-250 microns, 70-200 microns, 70-150 microns, 70-100 microns, 80-100 microns, 90-400 microns, 90-300 microns, 90-250 microns, 90-200 microns, 90-150 microns, 100-300 microns, 100-250 microns, 100-200 microns, 100-150 microns, 100-120 microns, 200-800 microns, 200-700 microns, or 200-600 microns. The foregoing are examples only, and the width (e.g., $W_{ch}$) of the microfluidic channel can be a value selected to be between any of the values listed above. Moreover, the width (e.g., $W_{ch}$) of the microfluidic channel can be selected to be in any of these widths in regions of the microfluidic channel other than at a proximal opening of a sequestration pen. In some embodiments, the width $W_{ch}$ of the microfluidic channel at the proximal opening to the connection region of the sequestration pen (e.g., taken transverse to the direction of bulk flow of fluid through the channel) can be substantially perpendicular to a width (e.g., $W_{con}$ or $W_{con1}$) of the proximal opening.

A cross-sectional area of the microfluidic channel at a proximal opening to the connection region of a sequestration pen can be about 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns, 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the microfluidic channel at the proximal opening can be selected to be between any of the values listed above. In various embodiments, and the cross-sectional area of the microfluidic channel at regions of the microfluidic channel other than at the proximal opening can also be selected to be between any of the values listed above. In some embodiments, the cross-sectional area is selected to be a substantially uniform value for the entire length of the microfluidic channel.

In some embodiments, the microfluidic chip is configured such that the proximal opening (e.g., 234 or 334) of the connection region of a sequestration pen may have a width (e.g., $W_{con}$ or $W_{con1}$) from about 20 microns to about 200 microns (e.g., about 50 microns to about 150 microns), the connection region may have a length $L_{con}$ (e.g., 236 or 336) that is at least 1.0 times (e.g., at least 1.5 times, or at least 2.0 times) the width of the proximal opening, and the microfluidic channel may have a height (e.g., $H_{uh}$) at the proximal opening of about 30 microns to about 60 microns. As another example, the proximal opening (e.g., 234 or 334) of the connection region of a sequestration pen may have a width (e.g., $W_{con}$ or $W_{con1}$) from about 20 microns to about 100 microns (e.g., about 20 microns to about 60 microns), the connection region may have a length $L_{con}$ (e.g., 236 or 336) that is at least 1.0 times (e.g., at least 1.5 times, or at least 2.0 times) the width of the proximal opening, and the microfluidic channel may have a height (e.g., $H_{uh}$) at the proximal opening of about 30 microns to about 60 microns. The foregoing are examples only, and the width (e.g., $W_{con}$ or $W_{con1}$) of the proximal opening (e.g., 234 or 274), the length (e.g., $L_{con}$) of the connection region, and/or the width (e.g., $W_{ch}$) of the microfluidic channel (e.g., 122 or 322), can be a value selected to be between any of the values listed above.

In some embodiments, the proximal opening (e.g., 234 or 334) of the connection region of a sequestration pen has a width (e.g., $W_{con}$ or $W_{con1}$) that is 2.0 times or less (e.g., 2.0, 1.9, 1.8, 1.5, 1.3, 1.0, 0.8, 0.5, or 0.1 times) the height (e.g., $H_{ch}$) of the flow region/microfluidic channel at the proximal opening, or has a value that lies within a range defined by any two of the foregoing values.

In some embodiments, the width $W_{con1}$ of a proximal opening (e.g., 234 or 334) of a connection region of a sequestration pen may be the same as a width $W_{con2}$ of the distal opening (e.g., 238 or 338) to the isolation region thereof. In some embodiments, the width $W_{con1}$ the proximal opening may be different than a width $W_{con2}$ of the of distal opening, and $W_{con1}$ and/or $W_{con2}$ may be selected e selected from any of the values described for $W_{con}$ or $W_{con1}$. In some embodiments, the walls (including a connection region wall) that define the proximal opening and distal opening may be substantially parallel with respect to each other. In some embodiments, the walls that define the proximal opening and distal opening may be selected to not be parallel with respect to each other.

The length (e.g., $L_{con}$) of the connection region can be about 1-600 microns, 5-550 microns, 10-500 microns, 15-400 microns, 20-300 microns, 20-500 microns, 40-400 microns, 60-300 microns, 80-200 microns, about 100-150 microns, about 20-300 microns, about 20-250 microns, about 20-200 microns, about 20-150 microns, about 20-100 microns, about 30-250 microns, about 30-200 microns, about 30-150 microns, about 30-100 microns, about 30-80 microns, about 30-50 microns, about 45-250 microns, about 45-200 microns, about 45-100 microns, about 45-80 microns, about 45-60 microns, about 60-200 microns, about 60-150 microns, about 60-100 microns or about 60-80 microns. The foregoing are examples only, and length (e.g., $L_{con}$) of a connection region can be selected to be a value that is between any of the values listed above.

The connection region wall of a sequestration pen may have a length (e.g., $L_{wall}$) that is at least 0.5 times, at least 0.6 times, at least 0.7 times, at least 0.8 times, at least 0.9 times, at least 1.0 times, at least 1.1 times, at least 1.2 times, at least 1.3 times, at least 1.4 times, at least 1.5 times, at least 1.75 times, at least 2.0 times, at least 2.25 times, at least 2.5 times, at least 2.75 times, at least 3.0 times, or at least 3.5 times the width (e.g., $W_{con}$ or $W_{con1}$) of the proximal opening of the connection region of the sequestration pen. In some embodiments, the connection region wall may have a length $L_{wall}$ of about 20-200 microns, about 20-150 microns, about 20-100 microns, about 20-80 w microns, or about 20-50 microns. The foregoing are examples only, and a connection region wall may have a length $L_{wall}$ selected to be between any of the values listed above.

A sequestration pen may have a length $L_s$ of about 40-600 microns, about 40-500 microns, about 40-400 microns, about 40-300 microns, about 40-200 microns, about 40-100 microns or about 40-80 microns. The foregoing are examples only, and a sequestration pen may have a length $L_s$ selected to be between any of the values listed above.

According to some embodiments, a sequestration pen may have a specified height (e.g., HO. In some embodiments, a sequestration pen has a height $H_s$ of about 20 microns to about 200 microns (e.g., about 20 microns to about 150 microns, about 20 microns to about 100 microns, about 20 microns to about 60 microns, about 30 microns to about 150 microns, about 30 microns to about 100 microns, about 30 microns to about 60 microns, about 40 microns to about 150 microns, about 40 microns to about 100 microns, or about 40 microns to about 60 microns). The foregoing are examples only, and a sequestration pen can have a height $H_s$ selected to be between any of the values listed above.

The height $H_{con}$ of a connection region at a proximal opening of a sequestration pen can be a height within any of the following heights: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{con}$ of the connection region can be selected to be between any of the values listed above. Typically, the height $H_{con}$ of the connection region is selected to be the same as the height $H_{ch}$ of the microfluidic channel at the proximal opening of the connection region. Additionally, the height $H_s$ of the sequestration pen is typically selected to be the same as the height $H_{con}$ of a connection region and/or the height $H_{ch}$ of the microfluidic channel. In some embodiments, $H_s$, $H_{con}$, and $H_{ch}$ may be selected to be the same value of any of the values listed above for a selected microfluidic device.

The isolation region can be configured to contain only one, two, three, four, five, or a similar relatively small number of micro-objects. In other embodiments, the isolation region may contain more than 10, more than 50 or more than 100 micro-objects. Accordingly, the volume of an isolation region can be, for example, at least $1\times10^4$, $1\times10^5$, $5\times10^5$, $8\times10^5$, $1\times10^6$, $2\times10^6$, $4\times10^6$, $6\times10^6$, $1\times10^7$, $3\times10^7$, $5\times10^7$ $1\times10^8$, $5\times10^8$, or $8\times10^8$ cubic microns, or more. The foregoing are examples only, and the isolation region can be configured to contain numbers of micro-objects and volumes selected to be between any of the values listed above (e.g., a volume between $1\times10^5$ cubic microns and $5\times10^5$ cubic microns, between $5\times10^5$ cubic microns and $1\times10^6$ cubic microns, between $1\times10^6$ cubic microns and $2\times10^6$ cubic microns, or between $2\times10^6$ cubic microns and $1\times10^7$ cubic microns).

According to some embodiments, a sequestration pen of a microfluidic device may have a specified volume. The specified volume of the sequestration pen (or the isolation region of the sequestration pen) may be selected such that a single cell or a small number of cells (e.g., 2-10 or 2-5) can rapidly condition the medium and thereby attain favorable (or optimal) growth conditions. In some embodiments, the sequestration pen has a volume of about $5\times10^5$, $6\times10^5$, $8\times10^5$, $1\times10^6$, $2\times10^6$, $4\times10^6$, $8\times10^6$, $1\times10^7$, $3\times10^7$, $5\times10^7$, or about $8\times10^7$ cubic microns, or more. In some embodiments, the sequestration pen has a volume of about 1 nanoliter to about 50 nanoliters, 2 nanoliters to about 25 nanoliters, 2 nanoliters to about 20 nanoliters, about 2 nanoliters to about 15 nanoliters, or about 2 nanoliters to about 10 nanoliters. The foregoing are examples only, and a sequestration pen can have a volume selected to be any value that is between any of the values listed above.

According to some embodiments, the flow of fluidic medium within the microfluidic channel (e.g., 122 or 322) may have a specified maximum velocity (e.g., $V_{max}$). In some embodiments, the maximum velocity (e.g., $V_{max}$) may be set at around 0.2, 0.5, 0.7, 1.0, 1.3, 1.5, 2.0, 2.5, 3.0, 3.5, 4.0, 4.5, 5.0, 5.5, 6.0, 6.7, 7.0, 7.5, 8.0, 8.5, 9.0, 10, 11, 12, 13, 14, 15, 16, 17, 18, 19, or 20 microliters/sec. The foregoing are examples only, and the flow of fluidic medium within the microfluidic channel can have a maximum velocity (e.g., $V_{max}$) selected to be a value between any of the values listed above.

In various embodiment, the microfluidic device has sequestration pens configured as in any of the embodiments discussed herein where the microfluidic device has about 5 to about 10 sequestration pens, about 10 to about 50 sequestration pens, about 25 to about 200 sequestration pens, about 100 to about 500 sequestration pens, about 200 to about 1000 sequestration pens, about 500 to about 1500 sequestration pens, about 1000 to about 2500 sequestration pens, about 2000 to about 5000 sequestration pens, about 3500 to about 7000 sequestration pens, about 5000 to about 10,000 sequestration pens, about 7,500 to about 15,000 sequestration pens, about 12,500 to about 20,000 sequestration pens, about 15,000 to about 25,000 sequestration pens, about 20,000 to about 30,000 sequestration pens, about 25,000 to about 35,000 sequestration pens, about 30,000 to about 40,000 sequestration pens, about 35,000 to about 45,000 sequestration pens, or about 40,000 to about 50,000 sequestration pens. The sequestration pens need not all be the same size and may include a variety of configurations (e.g., different widths, different features within the sequestration pen).

Coating solutions and coating agents. In some embodiments, at least one inner surface of the microfluidic device includes a coating material that provides a layer of organic and/or hydrophilic molecules suitable for maintenance, expansion and/or movement of biological micro-object(s)

(i.e., the biological micro-object exhibits increased viability, greater expansion and/or greater portability within the microfluidic device). The conditioned surface may reduce surface fouling, participate in providing a layer of hydration, and/or otherwise shield the biological micro-objects from contact with the non-organic materials of the microfluidic device interior.

In some embodiments, substantially all the inner surfaces of the microfluidic device include the coating material. The coated inner surface(s) may include the surface of a flow region (e.g., channel), chamber, or sequestration pen, or a combination thereof. In some embodiments, each of a plurality of sequestration pens has at least one inner surface coated with coating materials. In other embodiments, each of a plurality of flow regions or channels has at least one inner surface coated with coating materials. In some embodiments, at least one inner surface of each of a plurality of sequestration pens and each of a plurality of channels is coated with coating materials. The coating may be applied before or after introduction of biological micro-object(s), or may be introduced concurrently with the biological micro-object(s). In some embodiments, the biological micro-object(s) may be imported into the microfluidic device in a fluidic medium that includes one or more coating agents. In other embodiments, the inner surface(s) of the microfluidic device (e.g., a microfluidic device having an electrode activation substrate such as, but not limited to, a device including dielectrophoresis (DEP) electrodes) may be treated or "primed" with a coating solution comprising a coating agent prior to introduction of the biological micro-object(s) into the microfluidic device. Any convenient coating agent/coating solution can be used, including but not limited to: serum or serum factors, bovine serum albumin (BSA), polymers, detergents, enzymes, and any combination thereof.

Synthetic polymer-based coating materials. The at least one inner surface may include a coating material that comprises a polymer. The polymer may be non-covalently bound (e.g., it may be non-specifically adhered) to the at least one surface. The polymer may have a variety of structural motifs, such as found in block polymers (and copolymers), star polymers (star copolymers), and graft or comb polymers (graft copolymers), all of which may be suitable for the methods disclosed herein. A wide variety of alkylene ether containing polymers may be suitable for use in the microfluidic devices described herein, including but not limited to Pluronic® polymers such as Pluronic® L44, L64, P85, and F127 (including F127NF). Other examples of suitable coating materials are described in US2016/0312165, the contents of which are herein incorporated by reference in their entirety.

Covalently linked coating materials. In some embodiments, the at least one inner surface includes covalently linked molecules that provide a layer of organic and/or hydrophilic molecules suitable for maintenance/expansion of biological micro-object(s) within the microfluidic device, providing a conditioned surface for such cells. The covalently linked molecules include a linking group, wherein the linking group is covalently linked to one or more surfaces of the microfluidic device, as described below. The linking group is also covalently linked to a surface modifying moiety configured to provide a layer of organic and/or hydrophilic molecules suitable for maintenance/expansion/movement of biological micro-object(s).

In some embodiments, the covalently linked moiety configured to provide a layer of organic and/or hydrophilic molecules suitable for maintenance/expansion of biological micro-object(s) may include alkyl or fluoroalkyl (which includes perfluoroalkyl) moieties; mono- or polysaccharides (which may include but is not limited to dextran); alcohols (including but not limited to propargyl alcohol); polyalcohols, including but not limited to polyvinyl alcohol; alkylene ethers, including but not limited to polyethylene glycol; polyelectrolytes (including but not limited to polyacrylic acid or polyvinyl phosphonic acid); amino groups (including derivatives thereof, such as, but not limited to alkylated amines, hydroxyalkylated amino group, guanidinium, and heterocylic groups containing an unaromatized nitrogen ring atom, such as, but not limited to morpholinyl or piperazinyl); carboxylic acids including but not limited to propiolic acid (which may provide a carboxylate anionic surface); phosphonic acids, including but not limited to ethynyl phosphonic acid (which may provide a phosphonate anionic surface); sulfonate anions; carboxybetaines; sulfobetaines; sulfamic acids; or amino acids.

In various embodiments, the covalently linked moiety configured to provide a layer of organic and/or hydrophilic molecules suitable for maintenance/expansion of biological micro-object(s) in the microfluidic device may include non-polymeric moieties such as an alkyl moiety, amino acid moiety, alcohol moiety, amino moiety, carboxylic acid moiety, phosphonic acid moiety, sulfonic acid moiety, sulfamic acid moiety, or saccharide moiety. Alternatively, the covalently linked moiety may include polymeric moieties, which may include any of these moieties.

In some embodiments, a microfluidic device may have a hydrophobic layer upon the inner surface of the base which includes a covalently linked alkyl moiety. The covalently linked alkyl moiety may comprise carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the linking group.

In other embodiments, the covalently linked moiety may include at least one amino acid, which may include more than one type of amino acid. Thus, the covalently linked moiety may include a peptide or a protein. In some embodiments, the covalently linked moiety may include an amino acid which may provide a zwitterionic surface to support cell growth, viability, portability, or any combination thereof.

In other embodiments, the covalently linked moiety may further include a streptavidin or biotin moiety. In some embodiments, a modified biological moiety such as, for example, a biotinylated protein or peptide may be introduced to the inner surface of a microfluidic device bearing covalently linked streptavidin, and couple via the covalently linked streptavidin to the surface, thereby providing a modified surface presenting the protein or peptide.

In other embodiments, the covalently linked moiety may include at least one alkylene oxide moiety and may include any alkylene oxide polymer as described above. One useful class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da. In some embodiments, the PEG polymer may further be substituted with a hydrophilic or charged moiety, such as but not limited to an alcohol functionality or a carboxylic acid moiety.

The covalently linked moiety may include one or more saccharides. The covalently linked saccharides may be mono-, di-, or polysaccharides. The covalently linked saccharides may be modified to introduce a reactive pairing moiety which permits coupling or elaboration for attachment to the surface. One exemplary covalently linked moiety may include a dextran polysaccharide, which may be coupled indirectly to a surface via an unbranched linker.

The coating material providing a conditioned surface may comprise only one kind of covalently linked moiety or may include more than one different kind of covalently linked moiety. For example, a polyethylene glycol conditioned surface may have covalently linked alkylene oxide moieties having a specified number of alkylene oxide units which are all the same, e.g., having the same linking group and covalent attachment to the surface, the same overall length, and the same number of alkylene oxide units. Alternatively, the coating material may have more than one kind of covalently linked moiety attached to the surface. For example, the coating material may include the molecules having covalently linked alkylene oxide moieties having a first specified number of alkylene oxide units and may further include a further set of molecules having bulky moieties such as a protein or peptide connected to a covalently attached alkylene oxide linking moiety having a greater number of alkylene oxide units. The different types of molecules may be varied in any suitable ratio to obtain the surface characteristics desired. For example, the conditioned surface having a mixture of first molecules having a chemical structure having a first specified number of alkylene oxide units and second molecules including peptide or protein moieties, which may be coupled via a biotin/streptavidin binding pair to the covalently attached alkylene linking moiety, may have a ratio of first molecules:second molecules of about 99:1; about 90:10; about 75:25; about 50:50; about 30:70; about 20:80; about 10:90; or any ratio selected to be between these values. In this instance, the first set of molecules having different, less sterically demanding termini and fewer backbone atoms can help to functionalize the entire substrate surface and thereby prevent undesired adhesion or contact with the silicon/silicon oxide, hafnium oxide or alumina making up the substrate itself. The selection of the ratio of mixture of first molecules to second molecules may also modulate the surface modification introduced by the second molecules bearing peptide or protein moieties.

Conditioned surface properties. Various factors can alter the physical thickness of the conditioned surface, such as the manner in which the conditioned surface is formed on the substrate (e.g. vapor deposition, liquid phase deposition, spin coating, flooding, and electrostatic coating). In some embodiments, the conditioned surface may have a thickness of about 1 nm to about 10 nm. In some embodiments, the covalently linked moieties of the conditioned surface may form a monolayer when covalently linked to the surface of the microfluidic device (which may include an electrode activation substrate having dielectrophoresis (DEP) or electrowetting (EW) electrodes) and may have a thickness of less than 10 nm (e.g., less than 5 nm, or about 1.5 to 3.0 nm). These values are in contrast to that of a surface prepared by spin coating, for example, which may typically have a thickness of about 30 nm. In some embodiments, the conditioned surface does not require a perfectly formed monolayer to be suitably functional for operation within a DEP-configured microfluidic device. In other embodiments, the conditioned surface formed by the covalently linked moieties may have a thickness of about 10 nm to about 50 nm.

Unitary or Multi-part conditioned surface. The covalently linked coating material may be formed by reaction of a molecule which already contains the moiety configured to provide a layer of organic and/or hydrophilic molecules suitable for maintenance/expansion of biological micro-object(s) in the microfluidic device, and may have a structure of Formula I, as shown below. Alternatively, the covalently linked coating material may be formed in a two-part sequence, having a structure of Formula II, by coupling the moiety configured to provide a layer of organic and/or hydrophilic molecules suitable for maintenance and/or expansion of biological micro-object(s) to a surface modifying ligand that itself has been covalently linked to the surface. In some embodiments, the surface may be formed in a two-part or three-part sequence, including a streptavidin/biotin binding pair, to introduce a protein, peptide, or mixed modified surface.

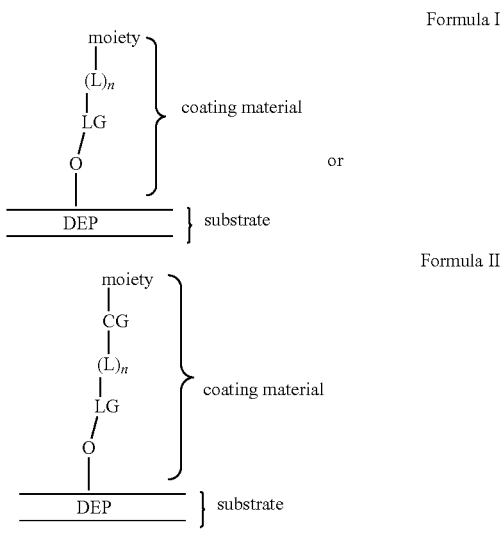

The coating material may be linked covalently to oxides of the surface of a DEP-configured or EW-configured substrate. The coating material may be attached to the oxides via a linking group ("LG"), which may be a siloxy or phosphonate ester group formed from the reaction of a siloxane or phosphonic acid group with the oxides. The moiety configured to provide a layer of organic and/or hydrophilic molecules suitable for maintenance/expansion of biological micro-object(s) in the microfluidic device can be any of the moieties described herein. The linking group LG may be directly or indirectly connected to the moiety configured to provide a layer of organic and/or hydrophilic molecules suitable for maintenance/expansion of biological micro-object(s) in the microfluidic device. When the linking group LG is directly connected to the moiety, optional linker ("L") is not present and n is 0. When the linking group LG is indirectly connected to the moiety, linker L is present and n is 1. The linker L may have a linear portion where a backbone of the linear portion may include 1 to 200 non-hydrogen atoms selected from any combination of silicon, carbon, nitrogen, oxygen, sulfur and/or phosphorus atoms, subject to chemical bonding limitations as is known in the art. It may be interrupted with any combination of one or more moieties, which may be chosen from ether, amino, carbonyl, amido, and/or phosphonate groups, arylene, heteroarylene, or heterocyclic groups. In some embodiments, the coupling group CG represents the resultant group from reaction of a reactive moiety $R_x$ and a reactive pairing moiety $R_{px}$ (i.e., a moiety configured to react with the reactive moiety $R_x$). CG may be a carboxamidyl group, a triazolylene group, substituted triazolylene group, a carboxamidyl, thioamidyl, an oxime, a mercaptyl, a disulfide, an ether, or alkenyl group, or any other suitable group that may be formed upon reaction of a reactive moiety with its respective reactive pairing moiety. In some embodiments, CG may further represent a streptavidin/biotin binding pair.

Further details of suitable coating treatments and modifications, as well as methods of preparation, may be found at U.S. Patent Application Publication No. US2016/0312165 (Lowe, Jr., et al.), U.S. Patent Application Publication No US2017/0173580 (Lowe, Jr., et al), International Patent Application Publication WO2017/205830 (Lowe, Jr., et al.), and International Patent Application Publication WO2019/01880 (Beemiller et al.), each of which disclosures is herein incorporated by reference in its entirety.

Microfluidic device motive technologies. The microfluidic devices described herein can be used with any type of motive technology. As described herein, the control and monitoring equipment of the system can comprise a motive module for selecting and moving objects, such as micro-objects or droplets, in the microfluidic circuit of a microfluidic device. The motive technology(ies) may include, for example, dielectrophoresis (DEP), electrowetting (EW), and/or other motive technologies. The microfluidic device can have a variety of motive configurations, depending upon the type of object being moved and other considerations. Returning to FIG. 1A, for example, the support structure 104 and/or cover 110 of the microfluidic device 100 can comprise DEP electrode activation substrates for selectively inducing motive forces on micro-objects in the fluidic medium 180 in the microfluidic circuit 120 and thereby select, capture, and/or move individual micro-objects or groups of micro-objects.

In some embodiments, motive forces are applied across the fluidic medium 180 (e.g., in the flow path and/or in the sequestration pens) via one or more electrodes (not shown) to manipulate, transport, separate and sort micro-objects located therein. For example, in some embodiments, motive forces are applied to one or more portions of microfluidic circuit 120 in order to transfer a single micro-object from the flow path 106 into a desired microfluidic sequestration pen. In some embodiments, motive forces are used to prevent a micro-object within a sequestration pen from being displaced therefrom. Further, in some embodiments, motive forces are used to selectively remove a micro-object from a sequestration pen that was previously collected in accordance with the embodiments of the current disclosure.

In some embodiments, the microfluidic device is configured as an optically-actuated electrokinetic device, such as in optoelectronic tweezer (OET) and/or optoelectrowetting (OEW) configured device. Examples of suitable OET configured devices (e.g., containing optically actuated dielectrophoresis electrode activation substrates) can include those illustrated in U.S. Pat. No. RE 44,711 (Wu, et al.) (originally issued as U.S. Pat. No. 7,612,355), U.S. Pat. No. 7,956,339 (Ohta et al.), U.S. Pat. No. 9,908,115 (Hobbs et al.), and U.S. Pat. No. 9,403,172 (Short et al) each of which is incorporated herein by reference in its entirety. Examples of suitable OEW configured devices can include those illustrated in U.S. Pat. No. 6,958,132 (Chiou et al.), and U.S. Pat. No. 9,533,306 (Chiou et al.), each of which is incorporated herein by reference in its entirety. Examples of suitable optically-actuated electrokinetic devices that include combined OET/OEW configured devices can include those illustrated in U.S. Patent Application Publication No. 2015/0306598 (Khandros et al.), U.S. Patent Application Publication No 2015/0306599 (Khandros et al.), and U.S. Patent Application Publication No. 2017/0173580 (Lowe, et al.), each of which is incorporated herein by reference in its entirety.

It should be understood that, for purposes of simplicity, the various examples of FIGS. 1-5B may illustrate portions of microfluidic devices while not depicting other portions. Further, FIGS. 1-5B may be part of, and implemented as, one or more microfluidic systems. In one non-limiting example, FIGS. 4A and 4B show a side cross-sectional view and a top cross-sectional view, respectively, of a portion of an enclosure 102 of the microfluidic device 400 having a region/chamber 402, which may be part of a fluidic circuit element having a more detailed structure, such as a growth chamber, a sequestration pen (which may be like any sequestration pen described herein), a flow region, or a flow channel. For instance, microfluidic device 400 may be similar to microfluidic devices 100, 175, 200, 300, 520 or any other microfluidic device as described herein. Furthermore, the microfluidic device 400 may include other fluidic circuit elements and may be part of a system including control and monitoring equipment 152, described above, having one or more of the media module 160, motive module 162, imaging module 164, optional tilting module 166, and other modules 168. Microfluidic devices 175, 200, 300, 520 and any other microfluidic devices described herein may similarly have any of the features described in detail for FIGS. 1A-1B and 4A-4B.

Figure 4A:
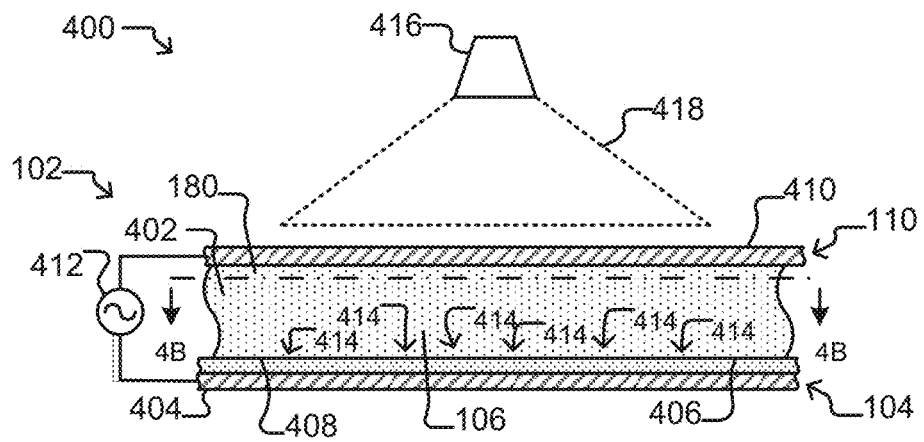
FIGS. 4A to 4B illustrate electrokinetic features of a microfluidic device according to some embodiments of the disclosure.

As shown in the example of FIG. 4A, the microfluidic device 400 includes a support structure 104 having a bottom electrode 404 and an electrode activation substrate 406 overlying the bottom electrode 404, and a cover 110 having a top electrode 410, with the top electrode 410 spaced apart from the bottom electrode 404. The top electrode 410 and the electrode activation substrate 406 define opposing surfaces of the region/chamber 402. A fluidic medium 180 contained in the region/chamber 402 thus provides a resistive connection between the top electrode 410 and the electrode activation substrate 406. A power source 412 configured to be connected to the bottom electrode 404 and the top electrode 410 and create a biasing voltage between the electrodes, as required for the generation of DEP forces in the region/chamber 402, is also shown. The power source 412 can be, for example, an alternating current (AC) power source.

Figure 4B:
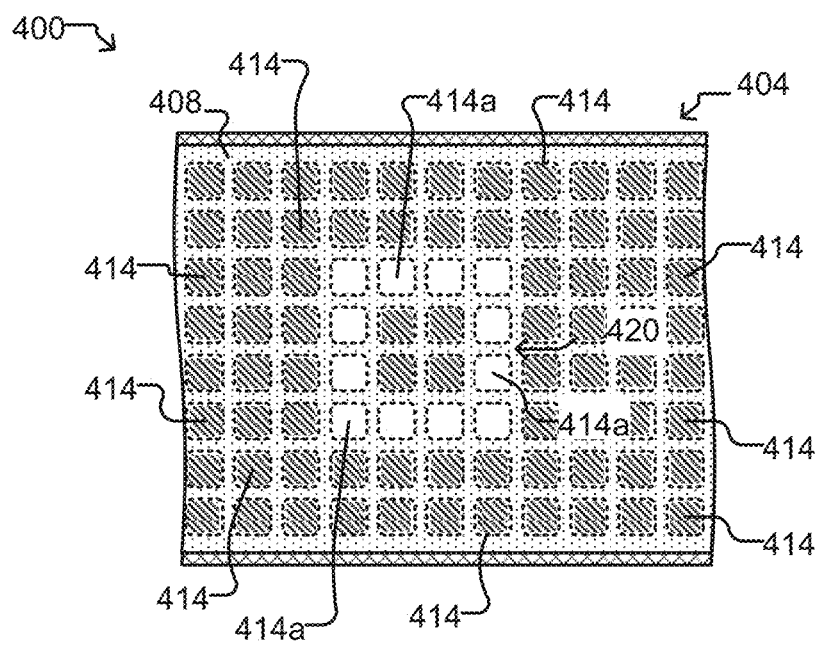

In certain embodiments, the microfluidic device 200 illustrated in FIGS. 4A and 4B can have an optically-actuated DEP electrode activation substrate. Accordingly, changing patterns of light 418 from the light source 416, which may be controlled by the motive module 162, can selectively activate and deactivate changing patterns of DEP electrodes at regions 414 of the inner surface 408 of the electrode activation substrate 406. (Hereinafter the regions 414 of a microfluidic device having a DEP electrode activation substrate are referred to as "DEP electrode regions.") As illustrated in FIG. 4B, a light pattern 418 directed onto the inner surface 408 of the electrode activation substrate 406 can illuminate select DEP electrode regions 414a (shown in white) in a pattern, such as a square. The non-illuminated DEP electrode regions 414 (cross-hatched) are hereinafter referred to as "dark" DEP electrode regions 414. The relative electrical impedance through the DEP electrode activation substrate 406 (i.e., from the bottom electrode 404 up to the inner surface 408 of the electrode activation substrate 406 which interfaces with the fluidic medium 180 in the flow region 106) is greater than the relative electrical impedance through the fluidic medium 180 in the region/chamber 402 (i.e., from the inner surface 408 of the electrode activation substrate 406 to the top electrode 410 of the cover 110) at each dark DEP electrode region 414. An illuminated DEP electrode region 414a, however, exhibits a reduced relative impedance through the electrode activation substrate 406 that is less than the relative impedance through the fluidic medium 180 in the region/chamber 402 at each illuminated DEP electrode region 414a.

With the power source 412 activated, the foregoing DEP configuration creates an electric field gradient in the fluidic medium 180 between illuminated DEP electrode regions 414a and adjacent dark DEP electrode regions 414, which in turn creates local DEP forces that attract or repel nearby micro-objects (not shown) in the fluidic medium 180. DEP electrodes that attract or repel micro-objects in the fluidic medium 180 can thus be selectively activated and deactivated at many different such DEP electrode regions 414 at the inner surface 408 of the region/chamber 402 by changing light patterns 418 projected from a light source 416 into the microfluidic device 400. Whether the DEP forces attract or repel nearby micro-objects can depend on such parameters as the frequency of the power source 412 and the dielectric properties of the fluidic medium 180 and/or micro-objects (not shown). Depending on the frequency of the power applied to the DEP configuration and selection of fluidic media (e.g., a highly conductive media such as PBS or other media appropriate for maintaining biological cells), negative DEP forces may be produced. Negative DEP forces may repel the micro-objects away from the location of the induced non-uniform electrical field. In some embodiments, a microfluidic device incorporating DEP technology may generate negative DEP forces.

The square pattern 420 of illuminated DEP electrode regions 414a illustrated in FIG. 4B is an example only. Any pattern of the DEP electrode regions 414 can be illuminated (and thereby activated) by the pattern of light 418 projected into the microfluidic device 400, and the pattern of illuminated/activated DEP electrode regions 414 can be repeatedly changed by changing or moving the light pattern 418.

In some embodiments, the electrode activation substrate 406 can comprise or consist of a photoconductive material. In such embodiments, the inner surface 408 of the electrode activation substrate 406 can be featureless. For example, the electrode activation substrate 406 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 gm. In such embodiments, the DEP electrode regions 414 can be created anywhere and in any pattern on the inner surface 408 of the electrode activation substrate 406, in accordance with the light pattern 418. The number and pattern of the DEP electrode regions 214 thus need not be fixed, but can correspond to the light pattern 418. Examples of microfluidic devices having a DEP configuration comprising a photoconductive layer such as discussed above have been described, for example, in U.S. Pat. No. RE 44,711 (Wu et al.) (originally issued as U.S. Pat. No. 7,612,355), each of which is incorporated herein by reference in its entirety.

In other embodiments, the electrode activation substrate 406 can comprise a substrate comprising a plurality of doped layers, electrically insulating layers (or regions), and electrically conductive layers that form semiconductor integrated circuits, such as is known in semiconductor fields. For example, the electrode activation substrate 406 can comprise a plurality of phototransistors, including, for example, lateral bipolar phototransistors, with each phototransistor corresponding to a DEP electrode region 414. Alternatively, the electrode activation substrate 406 can comprise electrodes (e.g., conductive metal electrodes) controlled by phototransistor switches, with each such electrode corresponding to a DEP electrode region 414. The electrode activation substrate 406 can include a pattern of such phototransistors or phototransistor-controlled electrodes. The pattern, for example, can be an array of substantially square phototransistors or phototransistor-controlled electrodes arranged in rows and columns. Alternatively, the pattern can be an array of substantially hexagonal phototransistors or phototransistor-controlled electrodes that form a hexagonal lattice. Regardless of the pattern, electric circuit elements can form electrical connections between the DEP electrode regions 414 at the inner surface 408 of the electrode activation substrate 406 and the bottom electrode 404, and those electrical connections (i.e., phototransistors or electrodes) can be selectively activated and deactivated by the light pattern 418, as described above.

Examples of microfluidic devices having electrode activation substrates that comprise phototransistors have been described, for example, in U.S. Pat. No. 7,956,339 (Ohta et al.) and U.S. Pat. No. 9,908,115 (Hobbs et al.), the entire contents of each of which are incorporated herein by reference. Examples of microfluidic devices having electrode activation substrates that comprise electrodes controlled by phototransistor switches have been described, for example, in U.S. Pat. No. 9,403,172 (Short et al.), which is incorporated herein by reference in its entirety.

In some embodiments of a DEP configured microfluidic device, the top electrode 410 is part of a first wall (or cover 110) of the enclosure 402, and the electrode activation substrate 406 and bottom electrode 404 are part of a second wall (or support structure 104) of the enclosure 102. The region/chamber 402 can be between the first wall and the second wall. In other embodiments, the electrode 410 is part of the second wall (or support structure 104) and one or both of the electrode activation substrate 406 and/or the electrode 410 are part of the first wall (or cover 110). Moreover, the light source 416 can alternatively be used to illuminate the enclosure 102 from below.

With the microfluidic device 400 of FIGS. 4A-4B having a DEP electrode activation substrate, the motive module 162 of control and monitoring equipment 152, as described for FIG. 1A herein, can select a micro-object (not shown) in the fluidic medium 180 in the region/chamber 402 by projecting a light pattern 418 into the microfluidic device 400 to activate a first set of one or more DEP electrodes at DEP electrode regions 414a of the inner surface 408 of the electrode activation substrate 406 in a pattern (e.g., square pattern 420) that surrounds and captures the micro-object. The motive module 162 can then move the in situ-generated captured micro-object by moving the light pattern 418 relative to the microfluidic device 400 to activate a second set of one or more DEP electrodes at DEP electrode regions

414. Alternatively, the microfluidic device 400 can be moved relative to the light pattern 418.

In other embodiments, the microfluidic device 400 may be a DEP configured device that does not rely upon light activation of DEP electrodes at the inner surface 408 of the electrode activation substrate 406. For example, the electrode activation substrate 406 can comprise selectively addressable and energizable electrodes positioned opposite to a surface including at least one electrode (e.g., cover 110). Switches (e.g., transistor switches in a semiconductor substrate) may be selectively opened and closed to activate or inactivate DEP electrodes at DEP electrode regions 414, thereby creating a net DEP force on a micro-object (not shown) in region/chamber 402 in the vicinity of the activated DEP electrodes. Depending on such characteristics as the frequency of the power source 412 and the dielectric properties of the medium (not shown) and/or micro-objects in the region/chamber 402, the DEP force can attract or repel a nearby micro-object. By selectively activating and deactivating a set of DEP electrodes (e.g., at a set of DEP electrodes regions 414 that forms a square pattern 420), one or more micro-objects in region/chamber 402 can be selected and moved within the region/chamber 402. The motive module 162 in FIG. 1A can control such switches and thus activate and deactivate individual ones of the DEP electrodes to select, and move particular micro-objects (not shown) around the region/chamber 402. Microfluidic devices having a DEP electrode activation substrates that includes selectively addressable and energizable electrodes are known in the art and have been described, for example, in U.S. Pat. No. 6,294,063 (Becker, et al.) and U.S. Pat. No. 6,942,776 (Medoro), each of which is incorporated herein by reference in its entirety.

Regardless of whether the microfluidic device 400 has a dielectrophoretic electrode activation substrate, an electrowetting electrode activation substrate or a combination of both a dielectrophoretic and an electrowetting activation substrate, a power source 412 can be used to provide a potential (e.g., an AC voltage potential) that powers the electrical circuits of the microfluidic device 400. The power source 412 can be the same as, or a component of, the power source 192 referenced in FIG. 1A. Power source 412 can be configured to provide an AC voltage and/or current to the top electrode 410 and the bottom electrode 404. For an AC voltage, the power source 412 can provide a frequency range and an average or peak power (e.g., voltage or current) range sufficient to generate net DEP forces (or electrowetting forces) strong enough to select and move individual micro-objects (not shown) in the region/chamber 402, as discussed above, and/or to change the wetting properties of the inner surface 408 of the support structure 104 in the region/chamber 202, as also discussed above. Such frequency ranges and average or peak power ranges are known in the art. See, e.g., U.S. Pat. No. 6,958,132 (Chiou et al.), U.S. Pat. No. RE44,711 (Wu et al.) (originally issued as U.S. Pat. No. 7,612,355), and U.S. Patent Application Publication Nos. 2014/0124370 (Short et al.), 2015/0306598 (Khandros et al.), 2015/0306599 (Khandros et al.), and 2017/0173580 (Lowe, Jr. et al.), each of which disclosures are herein incorporated by reference in its entirety.

Other forces may be utilized within the microfluidic devices, alone or in combination, to move selected micro-objects. Bulk fluidic flow within the microfluidic channel may move micro-objects within the flow region. Localized fluidic flow, which may be operated within the microfluidic channel, within a sequestration pen, or within another kind of chamber (e.g., a reservoir) can be also be used to move selected micro-objects. Localized fluidic flow can be used to move selected micro-objects out of the flow region into a non-flow region such as a sequestration pen or the reverse, from a non-flow region into a flow region. The localized flow can be actuated by deforming a deformable wall of the microfluidic device, as described in U.S. Pat. No. 10,058,865 (Breinlinger et al.), which is incorporated herein by reference in its entirety.

Gravity may be used to move micro-objects within the microfluidic channel, into a sequestration pen, and/or out of a sequestration pen or other chamber, as described in U.S. Pat. No. 9,744,533 (Breinlinger et al.), which is incorporated herein by reference in its entirety. Use of gravity (e.g., by tilting the microfluidic device and/or the support to which the microfluidic device is attached) may be useful for bulk movement of cells into or out of the sequestration pens from/to the flow region. Magnetic forces may be employed to move micro-objects including paramagnetic materials, which can include magnetic micro-objects attached to or associated with a biological micro-object. Alternatively, or in additional, centripetal forces may be used to move micro-objects within the microfluidic channel, as well as into or out of sequestration pens or other chambers in the microfluidic device.

In another alternative mode of moving micro-objects, laser-generated dislodging forces may be used to export micro-objects or assist in exporting micro-objects from a sequestration pen or any other chamber in the microfluidic device, as described in International Patent Publication No. WO2017/117408 (Kurz et al.), which is incorporated herein by reference in its entirety.

In some embodiments, DEP forces are combined with other forces, such as fluidic flow (e.g., bulk fluidic flow in a channel or localized fluidic flow actuated by deformation of a deformable surface of the microfluidic device, laser generated dislodging forces, and/or gravitational force), so as to manipulate, transport, separate and sort micro-objects and/or droplets within the microfluidic circuit 120. In some embodiments, the DEP forces can be applied prior to the other forces. In other embodiments, the DEP forces can be applied after the other forces. In still other instances, the DEP forces can be applied at the same time as the other forces or in an alternating manner with the other forces.

System. Returning to FIG. 1A, a system 150 for operating and controlling microfluidic devices is shown, such as for controlling the microfluidic device 100. The electrical power source 192 can provide electric power to the microfluidic device 100, providing biasing voltages or currents as needed. The electrical power source 192 can, for example, comprise one or more alternating current (AC) and/or direct current (DC) voltage or current sources.

System 150 can further include a media source 178. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1A. Alternatively, the media source 178 can be located in whole or in part inside the enclosure 102 of the microfluidic device 100. For example, the media source 178 can comprise reservoirs that are part of the microfluidic device 100.

FIG. 1A also illustrates simplified block diagram depictions of examples of control and monitoring equipment 152 that constitute part of system 150 and can be utilized in conjunction with a microfluidic device 100. As shown, examples of such control and monitoring equipment 152 can include a master controller 154 comprising a media module 160 for controlling the media source 178, a motive module 162 for controlling movement and/or selection of micro-objects (not shown) and/or medium (e.g., droplets of medium) in the microfluidic circuit 120, an imaging module 164 for controlling an imaging device (e.g., a camera, microscope, light source or any combination thereof) for capturing images (e.g., digital images), and an optional tilting module 166 for controlling the tilting of the microfluidic device 100. The control equipment 152 can also include other modules 168 for controlling, monitoring, or performing other functions with respect to the microfluidic device 100. As shown, the monitoring equipment 152 can further include a display device 170 and an input/output device 172.

The master controller 154 can comprise a control module 156 and a digital memory 158. The control module 156 can comprise, for example, a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. The media module 160, motive module 162, imaging module 164, optional tilting module 166, and/or other modules 168 can be similarly configured. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, optional tilting module 166, and/or other modules 168 configured as discussed above. Similarly, the master controller 154, media module 160, motive module 162, imaging module 164, optional tilting module 166, and/or other modules 168 may be communicatively coupled to transmit and receive data used in any function, process, act, action or step discussed herein.

The media module 160 controls the media source 178. For example, the media module 160 can control the media source 178 to input a selected fluidic medium 180 into the enclosure 102 (e.g., through an inlet port 107). The media module 160 can also control removal of media from the enclosure 102 (e.g., through an outlet port (not shown)). One or more media can thus be selectively input into and removed from the microfluidic circuit 120. The media module 160 can also control the flow of fluidic medium 180 in the flow path 106 inside the microfluidic circuit 120. The media module 160 may also provide conditioning gaseous conditions to the media source 178, for example, providing an environment containing 5% $CO_2$ (or higher). The media module 160 may also control the temperature of an enclosure of the media source, for example, to provide feeder cells in the media source with proper temperature control.

Motive module. The motive module 162 can be configured to control selection and movement of micro-objects (not shown) in the microfluidic circuit 120. The enclosure 102 of the microfluidic device 100 can comprise one or more electrokinetic mechanisms including a dielectrophoresis (DEP) electrode activation substrate, optoelectronic tweezers (OET) electrode activation substrate, electrowetting (EW) electrode activation substrate, and/or an opto-electrowetting (OEW) electrode activation substrate, where the motive module 162 can control the activation of electrodes and/or transistors (e.g., phototransistors) to select and move micro-objects and/or droplets in the flow path 106 and/or within sequestration pens 124, 126, 128, and 130. The electrokinetic mechanism(s) may be any suitable single or combined mechanism as described within the paragraphs describing motive technologies for use within the microfluidic device. A DEP configured device may include one or more electrodes that apply a non-uniform electric field in the microfluidic circuit 120 sufficient to exert a dielectrophoretic force on micro-objects in the microfluidic circuit 120. An OET configured device may include photo-activatable electrodes to provide selective control of movement of micro-objects in the microfluidic circuit 120 via light-induced dielectrophoresis.

The imaging module 164 can control the imaging device. For example, the imaging module 164 can receive and process image data from the imaging device. Image data from the imaging device can comprise any type of information captured by the imaging device (e.g., the presence or absence of micro-objects, droplets of medium, accumulation of label, such as fluorescent label, etc.). Using the information captured by the imaging device, the imaging module 164 can further calculate the position of objects (e.g., micro-objects, droplets of medium) and/or the rate of motion of such objects within the microfluidic device 100.

The imaging device (part of imaging module 164, discussed below) can comprise a device, such as a digital camera, for capturing images inside microfluidic circuit 120. In some instances, the imaging device further comprises a detector having a fast frame rate and/or high sensitivity (e.g. for low light applications). The imaging device can also include a mechanism for directing stimulating radiation and/or light beams into the microfluidic circuit 120 and collecting radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g. a high-pressure mercury lamp) or a Xenon arc lamp. The imaging device may further include a microscope (or an optical train), which may or may not include an eyepiece.

Support Structure. System 150 may further comprise a support structure 190 configured to support and/or hold the enclosure 102 comprising the microfluidic circuit 120. In some embodiments, the optional tilting module 166 can be configured to activate the support structure 190 to rotate the microfluidic device 100 about one or more axes of rotation. The optional tilting module 166 can be configured to support and/or hold the microfluidic device 100 in a level orientation (i.e. at 0° relative to x- and y-axes), a vertical orientation (i.e. at 90° relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, support structure 190 can optionally be used to tilt the microfluidic device 100 (e.g., as controlled by optional tilting module 166) to 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90° relative to the x-axis or any degree therebetween. When the microfluidic device is tilted at angles greater than about 15, tilting may be performed to create bulk movement of micro-objects into/out of sequestration pens from/into the flow region (e.g., microfluidic channel). In some embodiments, the support structure 190 can hold the microfluidic device 100 at a fixed angle of 0.1°, 0.2°, 0.3°, 0.4°, 0.5°, 0.6°, 0.7°, 0.8°, 0.9°, 1°, 2°, 3°, 4°, 5°, or 10° relative to the x-axis (horizontal), so long as DEP is an effective force to move micro-objects out of the sequestration pens into the microfluidic channel. Since the surface of the electrode activation substrate is substantially flat, DEP forces may be used even when the far end of the sequestration pen, opposite its opening to the microfluidic channel, is disposed at a position lower in a vertical direction than the microfluidic channel.

In some embodiments where the microfluidic device is tilted or held at a fixed angle relative to horizontal, the microfluidic device 100 may be disposed in an orientation such that the inner surface of the base of the flow path 106 is positioned at an angle above or below the inner surface of the base of the one or more sequestration pens opening laterally to the flow path. The term "above" as used herein denotes that the flow path 106 is positioned higher than the one or more sequestration pens on a vertical axis defined by the force of gravity (i.e. an object in a sequestration pen above a flow path 106 would have a higher gravitational potential energy than an object in the flow path), and inversely, for positioning of the flow path 106 below one or more sequestration pens. In some embodiments, the support structure 190 may be held at a fixed angle of less than about 5°, about 4°, about 3° or less than about 2° relative to the x-axis (horizontal), thereby placing the sequestration pens at a lower potential energy relative to the flow path. In some other embodiments, when long term culturing (e.g., for more than about 2, 3, 4, 5, 6, 7 or more days) is performed within the microfluidic device, the device may be supported on a culturing support and may be tilted at a greater angle of about 10°, 15°, 20°, 25°, 30°, or any angle therebetween to retain biological micro-objects within the sequestration pens during the long term culturing period. At the end of the culturing period, the microfluidic device containing the cultured biological micro-objects may be returned to the support 190 within system 150, where the angle of tilting is decreased to values as described above, affording the use of DEP to move the biological micro-objects out of the sequestration pens. Further examples of the use of gravitational forces induced by tilting are described in U.S. Pat. No. 9,744,533 (Breinlinger et al.), the contents of which are herein incorporated by reference in its entirety.

Figure 5A:
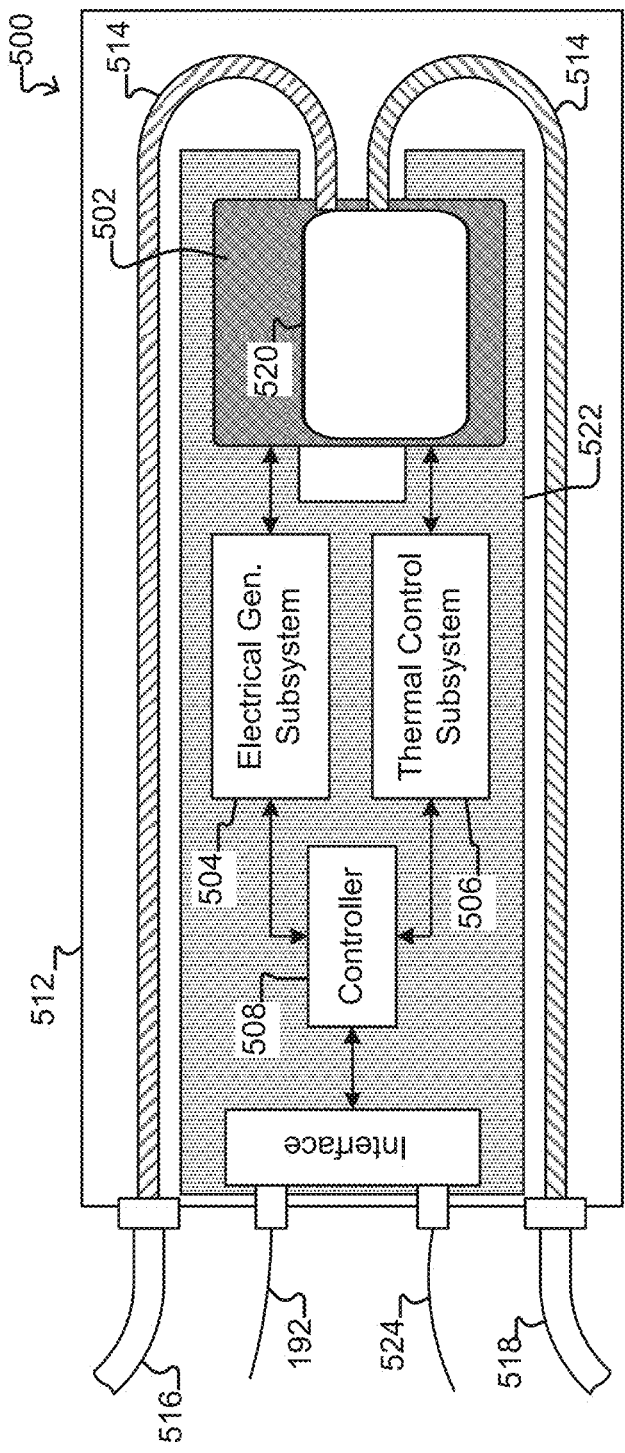
FIG. 5A illustrates a system for use with a microfluidic device and associated control equipment according to some embodiments of the disclosure.

Nest. Turning now to FIG. 5A, the system 150 can include a structure (also referred to as a "nest") 500 configured to hold a microfluidic device 520, which may be like microfluidic device 100, 200, or any other microfluidic device described herein. The nest 500 can include a socket 502 capable of interfacing with the microfluidic device 520 (e.g., an optically-actuated electrokinetic device 100, 200, etc.) and providing electrical connections from power source 192 to microfluidic device 520. The nest 500 can further include an integrated electrical signal generation subsystem 504. The electrical signal generation subsystem 504 can be configured to supply a biasing voltage to socket 502 such that the biasing voltage is applied across a pair of electrodes in the microfluidic device 520 when it is being held by socket 502. Thus, the electrical signal generation subsystem 504 can be part of power source 192. The ability to apply a biasing voltage to microfluidic device 520 does not mean that a biasing voltage will be applied at all times when the microfluidic device 520 is held by the socket 502. Rather, in most cases, the biasing voltage will be applied intermittently, e.g., only as needed to facilitate the generation of electrokinetic forces, such as dielectrophoresis or electrowetting, in the microfluidic device 520.

As illustrated in FIG. 5A, the nest 500 can include a printed circuit board assembly (PCBA) 522. The electrical signal generation subsystem 504 can be mounted on and electrically integrated into the PCBA 522. The exemplary support includes socket 502 mounted on PCBA 522, as well.

In some embodiments, the nest 500 can comprise an electrical signal generation subsystem 504 configured to measure the amplified voltage at the microfluidic device 520 and then adjust its own output voltage as needed such that the measured voltage at the microfluidic device 520 is the desired value. In some embodiments, the waveform amplification circuit can have a +6.5V to −6.5V power supply generated by a pair of DC-DC converters mounted on the PCBA 322, resulting in a signal of up to 13 Vpp at the microfluidic device 520.

In certain embodiments, the nest 500 further comprises a controller 508, such as a microprocessor used to sense and/or control the electrical signal generation subsystem 504. Examples of suitable microprocessors include the Arduino™ microprocessors, such as the Arduino Nano™. The controller 508 may be used to perform functions and analysis or may communicate with an external master controller 154 (shown in FIG. 1A) to perform functions and analysis. In the embodiment illustrated in FIG. 3A the controller 308 communicates with the master controller 154 (of FIG. 1A) through an interface (e.g., a plug or connector).

As illustrated in FIG. 5A, the support structure 500 (e.g., nest) can further include a thermal control subsystem 506. The thermal control subsystem 506 can be configured to regulate the temperature of microfluidic device 520 held by the support structure 500. For example, the thermal control subsystem 506 can include a Peltier thermoelectric device (not shown) and a cooling unit (not shown). In the embodiment illustrated in FIG. 5A, the support structure 500 comprises an inlet 516 and an outlet 518 to receive cooled fluid from an external reservoir (not shown) of the cooling unit, introduce the cooled fluid into the fluidic path 514 and through the cooling block, and then return the cooled fluid to the external reservoir. In some embodiments, the Peltier thermoelectric device, the cooling unit, and/or the fluidic path 514 can be mounted on a casing 512 of the support structure 500. In some embodiments, the thermal control subsystem 506 is configured to regulate the temperature of the Peltier thermoelectric device so as to achieve a target temperature for the microfluidic device 520. Temperature regulation of the Peltier thermoelectric device can be achieved, for example, by a thermoelectric power supply, such as a Pololu™ thermoelectric power supply (Pololu Robotics and Electronics Corp.). The thermal control subsystem 506 can include a feedback circuit, such as a temperature value provided by an analog circuit. Alternatively, the feedback circuit can be provided by a digital circuit.

The nest 500 can include a serial port 524 which allows the microprocessor of the controller 508 to communicate with an external master controller 154 via the interface. In addition, the microprocessor of the controller 508 can communicate (e.g., via a Plink tool (not shown)) with the electrical signal generation subsystem 504 and thermal control subsystem 506. Thus, via the combination of the controller 508, the interface, and the serial port 524, the electrical signal generation subsystem 504 and the thermal control subsystem 506 can communicate with the external master controller 154. In this manner, the master controller 154 can, among other things, assist the electrical signal generation subsystem 504 by performing scaling calculations for output voltage adjustments. A Graphical User Interface (GUI) (not shown) provided via a display device 170 coupled to the external master controller 154, can be configured to plot temperature and waveform data obtained from the thermal control subsystem 506 and the electrical signal generation subsystem 504, respectively. Alternatively, or in addition, the GUI can allow for updates to the controller 508, the thermal control subsystem 506, and the electrical signal generation subsystem 504.

Figure 5B:
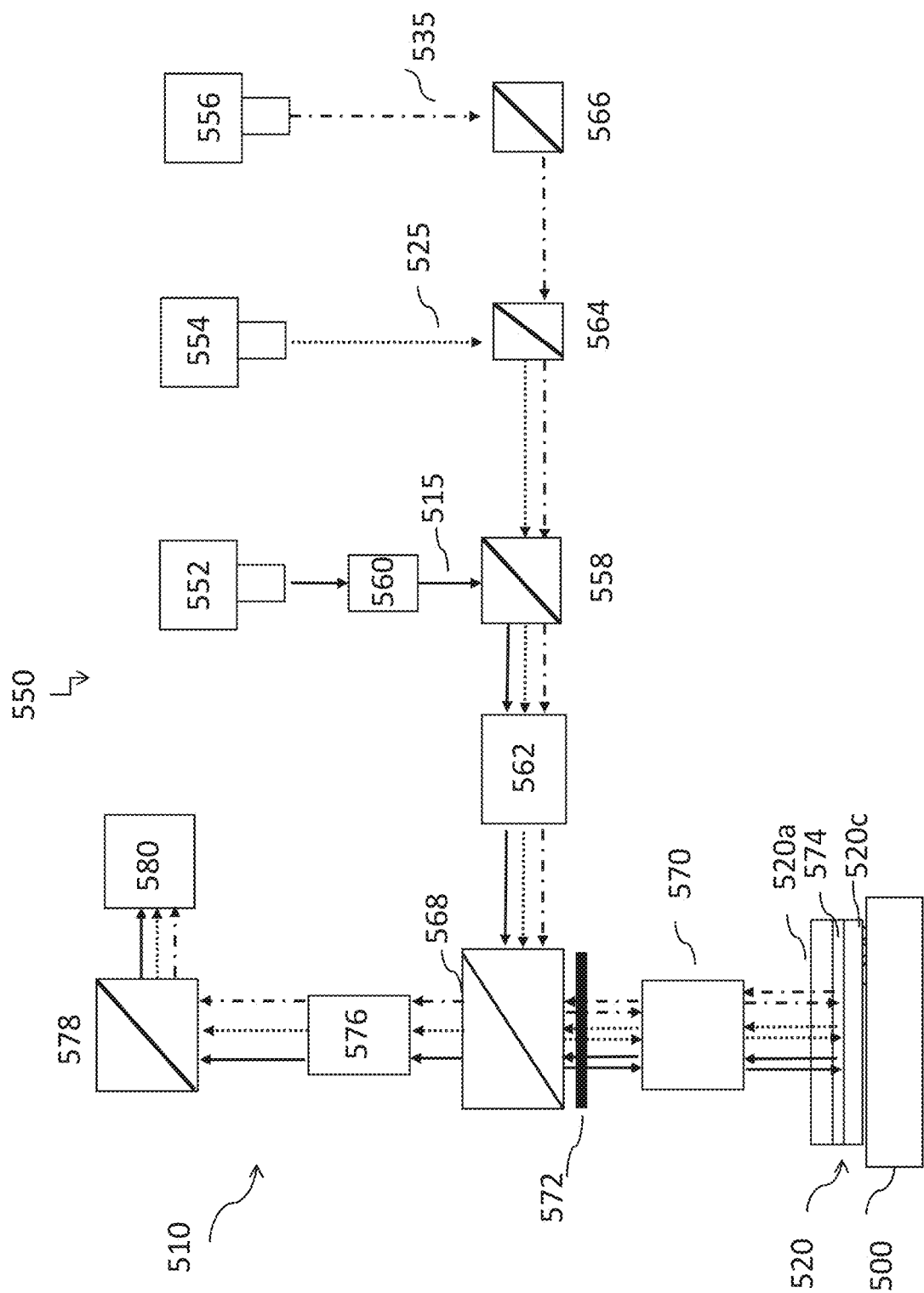
FIG. 5B illustrates an imaging device according to some embodiments of the disclosure.

Optical sub-system. FIG. 5B is a schematic of an optical sub-system 550 having an optical apparatus 510 for imaging and manipulating micro-objects in a microfluidic device 520, which can be any microfluidic device described herein. The optical apparatus 510 can be configured to perform imaging, analysis and manipulation of one or more micro-objects within the enclosure of the microfluidic device 520.

The optical apparatus 510 may have a first light source 552, a second light source 554, and a third light source 556. The first light source 552 can transmit light to a structured light modulator 560, which can include a digital mirror device (DMD) or a microshutter array system (MSA), either of which can be configured to receive light from the first light source 552 and selectively transmit a subset of the received light into the optical apparatus 510. Alternatively, the structured light modulator 560 can include a device that produces its own light (and thus dispenses with the need for a light source 552), such as an organic light emitting diode display (OLED), a liquid crystal on silicon (LCOS) device, a ferroelectric liquid crystal on silicon device (FLCOS), or a transmissive liquid crystal display (LCD). The structured light modulator 560 can be, for example, a projector. Thus, the structured light modulator 560 can be capable of emitting both structured and unstructured light. In certain embodiments, an imaging module and/or motive module of the system can control the structured light modulator 560.

In embodiments when the structured light modulator 560 includes a mirror, the modulator can have a plurality of mirrors. Each mirror of the plurality of mirrors can have a size of about 5 microns×5 microns to about 10 microns×10 microns, or any values therebetween. The structured light modulator 560 can include an array of mirrors (or pixels) that is 2000×1000, 2580×1600, 3000×2000, or any values therebetween. In some embodiments, only a portion of an illumination area of the structured light modulator 560 is used. The structured light modulator 560 can transmit the selected subset of light to a first dichroic beam splitter 558, which can reflect this light to a first tube lens 562.

The first tube lens 562 can have a large clear aperture, for example, a diameter larger than about 40 mm to about 50 mm, or more, providing a large field of view. Thus, the first tube lens 5621 can have an aperture that is large enough to capture all (or substantially all) of the light beams emanating from the structured light modulator 560.

The structured light 515 having a wavelength of about 400 nm to about 710 nm, may alternatively or in addition, provide fluorescent excitation illumination to the microfluidic device.

The second light source 554 may provide unstructured brightfield illumination. The brightfield illumination light 525 may have any suitable wavelength, and in some embodiments, may have a wavelength of about 400 nm to about 760 nm. The second light source 554 can transmit light to a second dichroic beam splitter 564 (which also may receive light 535 from the third light source 556), and the second light, brightfield illumination 525, may be transmitted therefrom to the first dichroic beam splitter 558. The second light, brightfield illumination 525, may then be transmitted from the first beam splitter 558 to the first tube lens 562.

The third light source 556 can transmit light through a matched pair relay lens (not shown) to a mirror 566. The third light illumination 535 may therefrom be reflected to the second dichroic beam splitter 5338 and be transmitted therefrom to the first beam splitter 5338, and onward to the first tube lens 5381. The third illumination light 535 may be a laser and may have any suitable wavelength. In some embodiments, the laser illumination 535 may have a wavelength of about 350 nm to about 900 nm. The laser illumination 535 may be configured to heat portions of one or more sequestration pens within the microfluidic device. The laser illumination 535 may be configured to heat fluidic medium, a micro-object, a wall or a portion of a wall of a sequestration pen, a metal target disposed within a microfluidic channel or sequestration pen of the microfluidic channel, or a photoreversible physical barrier within the microfluidic device, and described in more detail in U. S. Application Publication Nos. 2017/0165667 (Beaumont et al.) and 2018/0298318 (Kurz et al.), each of which disclosure is herein incorporated by reference in its entirety. In other embodiments, the laser illumination 535 may be configured to initiate photocleavage of surface modifying moieties of a modified surface of the microfluidic device or photocleavage of moieties providing adherent functionalities for micro-objects within a sequestration pen within the microfluidic device. Further details of photocleavage using a laser may be found in International Application Publication No. WO2017/205830 (Lowe, Jr. et al.), which disclosure is herein incorporated by reference in its entirety.

The light from the first, second, and third light sources (552, 554, 5560) passes through the first tube lens 562 and is transmitted to a third dichroic beam splitter 568 and filter changer 572. The third dichroic beam splitter 568 can reflect a portion of the light and transmit the light through one or more filters in the filter changer 572 and to the objective 570, which may be an objective changer with a plurality of different objectives that can be switched on demand. Some of the light (515, 525, and/or 535) may pass through the third dichroic beam splitter 568 and be terminated or absorbed by a beam block (not shown). The light reflected from the third dichroic beam splitter 568 passes through the objective 570 to illuminate the sample plane 574, which can be a portion of a microfluidic device 520 such as the sequestration pens described herein.

The nest 500, as described in FIG. 5A, can be integrated with the optical apparatus 510 and be a part of the apparatus 510. The nest 500 can provide electrical connection to the enclosure and be further configured to provide fluidic connections to the enclosure. Users may load the microfluidic apparatus 520 into the nest 500. In some other embodiments, the nest 500 can be a separate component independent of the optical apparatus 510.

Light can be reflected off and/or emitted from the sample plane 574 to pass back through the objective 570, through the filter changer 572, and through the third dichroic beam splitter 568 to a second tube lens 576. The light can pass through the second tube lens 576 (or imaging tube lens 576) and be reflected from a mirror 578 to an imaging sensor 580. Stray light baffles (not shown) can be placed between the first tube lens 562 and the third dichroic beam splitter 568, between the third dichroic beam splitter 568 and the second tube lens 576, and between the second tube lens 576 and the imaging sensor 580.

Objective. The optical apparatus can comprise the objective lens 570 that is specifically designed and configured for viewing and manipulating of micro-objects in the microfluidic device 520. For example, conventional microscope objective lenses are designed to view micro-objects on a slide or through 5 mm of aqueous fluid, while micro-objects in the microfluidic device 520 are inside the plurality of sequestration pens within the viewing plane 574 which have a depth of 20, 30, 40, 50, 60 70, 80 microns or any values therebetween. In some embodiments, a transparent cover 520*a*, for example, glass or ITO cover with a thickness of about 750 microns, can be placed on top of the plurality of sequestration pens, which are disposed above a microfluidic substrate 520*c*. Thus, the images of the micro-objects obtained by using the conventional microscope objective lenses may have large aberrations such as spherical and chromatic aberrations, which can degrade the quality of the images. The objective lens 570 of the optical apparatus 510 can be configured to correct the spherical and chromatic aberrations in the optical apparatus 1350. The objective lens 570 can have one or more magnification levels available such as, 4×, 10×, 20×.

Modes of illumination. In some embodiments, the structured light modulator 560 can be configured to modulate light beams received from the first light source 552 and transmits a plurality of illumination light beams 515, which are structured light beams, into the enclosure of the microfluidic device, e.g., the region containing the sequestration pens. The structured light beams can comprise the plurality of illumination light beams. The plurality of illumination light beams can be selectively activated to generate a plurality of illuminations patterns. In some embodiments, the structured light modulator 560 can be configured to generate an illumination pattern, similarly as described for FIGS. 4A-4B, which can be moved and adjusted. The optical apparatus 560 can further comprise a control unit (not shown) which is configured to adjust the illumination pattern to selectively activate the one or more of the plurality of DEP electrodes of a substrate 520*c* and generate DEP forces to move the one or more micro-objects inside the plurality of sequestration pens within the microfluidic device 520. For example, the plurality of illuminations patterns can be adjusted over time in a controlled manner to manipulate the micro-objects in the microfluidic device 520. Each of the plurality of illumination patterns can be shifted to shift the location of the DEP force generated and to move the structured light for one position to another in order to move the micro-objects within the enclosure of the microfluidic apparatus 520.

In some embodiments, the optical apparatus 510 may be configured such that each of the plurality of sequestration pens in the sample plane 574 within the field of view is simultaneously in focus at the image sensor 580 and at the structured light modulator 560. In some embodiments, the structured light modulator 560 can be disposed at a conjugate plane of the image sensor 580. In various embodiments, the optical apparatus 510 can have a confocal configuration or confocal property. The optical apparatus 510 can be further configured such that only each interior area of the flow region and/or each of the plurality of sequestration pens in the sample plane 574 within the field of view is imaged onto the image sensor 580 in order to reduce overall noise to thereby increase the contrast and resolution of the image.

In some embodiments, the first tube lens 562 can be configured to generate collimated light beams and transmit the collimated light beams to the objective lens 570. The objective 570 can receive the collimated light beams from the first tube lens 562 and focus the collimated light beams into each interior area of the flow region and each of the plurality of sequestration pens in the sample plane 574 within the field of view of the image sensor 580 or the optical apparatus 510. In some embodiments, the first tube lens 562 can be configured to generate a plurality of collimated light beams and transmit the plurality of collimated light beams to the objective lens 570. The objective 570 can receive the plurality of collimated light beams from the first tube lens 562 and converge the plurality of collimated light beams into each of the plurality of sequestration pens in the sample plane 574 within the field of view of the image sensor 580 or the optical apparatus 510.

In some embodiments, the optical apparatus 510 can be configured to illuminate the at least a portion of sequestration pens with a plurality of illumination spots. The objective 570 can receive the plurality of collimated light beams from the first tube lens 562 and project the plurality of illumination spots, which may form an illumination pattern, into each of the plurality of sequestration pens in the sample plane 574 within the field of view. For example, each of the plurality of illumination spots can have a size of about 5 microns×5 microns; 10 microns×10 microns; 10 microns× 30 microns, 30 microns×60 microns, 40 microns×40 microns, 40 microns×60 microns, 60 microns×120 microns, 80 microns×100 microns, 100 microns×140 microns and any values there between. The illumination spots may individually have a shape that is circular, square, or rectangular. Alternatively, the illumination spots may be grouped within a plurality of illumination spots (e.g., an illumination pattern) to form a larger polygonal shape such as a rectangle, square, or wedge shape. The illumination pattern may enclose (e.g., surround) an unilluminated space that may be square, rectangular or polygonal. For example, each of the plurality of illumination spots can have an area of about 150 to about 3000, about 4000 to about 10000, or 5000 to about 15000 square microns. An illumination pattern may have an area of about 1000 to about 8000, about 4000 to about 10000, 7000 to about 20000, 8000 to about 22000, 10000 to about 25000 square microns and any values there between.

The optical system 510 may be used to determine how to reposition micro-objects and into and out of the sequestration pens of the microfluidic device, as well as to count the number of micro-objects present within the microfluidic circuit of the device. Further details of repositioning and counting micro-objects are found in U. S. Application Publication No. 2016/0160259 (Du); U.S. Pat. No. 9,996,920 (Du et al.); and International Application Publication No. WO2018/102748 (Kim et al.). The optical system 510 may also be employed in assay methods to determine concentrations of reagents/assay products, and further details are found in U.S. Pat. No. 8,921,055 (Chapman), 10,010,882 (White et al.), and 9,889,445 (Chapman et al.); International Application Publication No. WO2017/181135 (Lionberger et al.); and International Application No. PCT/US2018/055918 (Lionberger et al.). Further details of the features of optical apparatuses suitable for use within a system for observing and manipulating micro-objects within a microfluidic device, as described herein, may be found in WO2018/102747 (Lundquist et al.), the disclosure of which is herein incorporated by reference in its entirety.

Additional system components for maintenance of viability of cells within the sequestration pens of the microfluidic device. In order to promote growth and/or expansion of cell populations, environmental conditions conducive to maintaining functional cells may be provided by additional components of the system. For example, such additional components can provide nutrients, cell growth signaling species, pH modulation, gas exchange, temperature control, and removal of waste products from cells.

EXAMPLES

General Methods and Materials.

System and Microfluidic device: The foregoing experiments were performed using an OptoSelect™ microfluidic (or nanofluidic) device manufactured by Berkeley Lights, Inc. and controlled by an optical instrument which was also manufactured by Berkeley Lights, Inc. The instrument included: a mounting stage for the microfluidic device coupled to a temperature controller; a pump and fluid medium conditioning component; an optical train including a camera and a structured light source suitable for activating phototransistors within the microfluidic device; and software for controlling the instrument, including performing image analysis and automated detection and repositioning of micro-objects. The OptoSelect device included a substrate configured with OptoElectroPositioning (OEP™) technology, which provides a phototransistor-activated dielectrophoresis (DEP) force. The device also included a plurality of microfluidic channels, each having a plurality of NanoPen™ chambers (or sequestration pens) fluidically connected thereto. The volume of each sequestration pen was around $1\times10^6$ cubic microns. The microfluidic device included conditioned interior surfaces, which were introduced as described below. Additional details are described in PCT application No. PCT/US2017/034832, filed on May 26, 2017, entitled "Covalently Modified Surfaces, Kits and Methods of Preparation and Use", the contents of which are hereby incorporated by reference in its entirety.

Adherent cell culture medium: 44.5% Eagle's minimal essential medium (EMEM, ATCC Catalog #30-2003); 44.5% Dulbecco's Modified Eagle Medium (DMEM F-12, ATCC Catalog #30/2006); 10% Fetal Bovine Serum (FBS, Seradigm VWR Catalog #97068-085); and 1% Pen Strep (Life Technologies Catalog #15140122).

Non-adherent cell culture medium: CD CHO medium (ThermoFisher Scientific Cat #10743029) was used. Briefly, conditioned media, comprised of fresh 80% standard culture medium: 20% conditioned standard culture medium (i.e., decanted supernatant from suspension culture flasks of the same cell type) (v/v), was used to enhance viability and expansion of single non-adherent CHO cells after isolation in the sequestration pens.

Preparation for culturing: Culture medium (as above) was flowed through the microfluidic device at 5 microliters/sec for 5 min.

Export medium for adherent cells: 59.5% Eagle's minimal essential medium (EMEM, ATCC Catalog #30-2003); 49.5% Dulbecco's Modified Eagle Medium (DMEM F-12, ATCC Catalog #30/2006); and 1% Pen Strep (Life Technologies Catalog #15140122).

Export medium for non-adherent cells: the export medium was 100% standard culture medium (i.e., unconditioned medium).

Perfusion regime. The perfusion method was either of the following two methods:

1. For culturing on the optical instrument. Perfuse 20 ul of culture medium at 2 microliters/sec; perfuse 180 ul of culture medium at 0.01 microliters/sec; dump excess culture medium to waste; pick up 250 ul of culture medium; dump 50 ul of culture medium to waste; repeat. The temperature of the microfluidic device was maintained at 36° C. for the entire culture period.

2. For culturing on a non-optical culturing station. Further details of the non-optical culturing station are described in PCT/US2016/028661, entitled "Culturing Station for Microfluidic Device", and filed on Apr. 21, 2016, the entire disclosure of which is herein incorporated by reference in its entirety. Perfuse 20 ul of culture medium at 2 ul/s; perfuse an additional 20 ul of culture medium at 0.01 microliters/sec for each chip; dump excess culture medium to waste; pick up 250 ul of culture medium; dump 50 ul of culture medium to waste; repeat. The temperature of the microfluidic device was maintained at 36° C. for the entire culture period.

Experiment 1. Culturing and export of adherent cells.

Cells. BE2-M17 human neuroblast cells, ATCC Catalog #CRL-2267, were maintained and passaged according to manufacturer's instructions, to a density of 10e7 and 40-50% confluence, and used after inspection for microbial contamination.

Cell preparation immediately before loading. Maintenance/storage medium was aspirated out, cells were washed with 1× Dulbecco's Phosphate-Buffered Saline (DPBS, no calcium, no magnesium) and left to sit for about 2 minutes. The DPBS was then aspirated out and TrypLE™ Select cell disengagement reagent (recombinant cell-dissociation enzyme mixture, Thermo Fisher Scientific Catalog #A1217701) was added to the flask. 8 ml 10× TrypLE was added for each T25 flask for BE2 cells. Cells were allowed to incubate with the cell disengagement reagent at 37° C. for 2-4 minutes. The flasks were then gently tapped and the cells were observed for detachment. If cells were not fully detached, they were allowed to incubate for an additional 2 minutes. Fresh media containing 10% FBS was then added to the flask. The volume of the medium added was equal to or greater than the volume of the disengagement reagent. If the cells appeared to be aggregating, the cells were vigorously pipetted up and down while holding the pipette flush with the bottom of the flask to facilitate cells detaching from each other. Cells were then immediately transferred to a centrifuge tube to prevent re-adherence to the flask following the inactivation of the disengagement reagent, and centrifuged for 5 min at 0.3 relative centrifugal force (rcf). On completion of centrifugation, the tube was checked for presence of a cell pellet. The supernatant was then aspirated, and cells were resuspended in fresh medium containing 2% B27™ Supplement, Serum Free, (Thermo Fisher Scientific Catalog #17504044). This additive has been shown to improve viability within the microfluidic environment. If cells showed aggregative behavior, they were filtered using cell strainers (Bel-Art™ SP Scienceware™ Flowmi™ Cell Strainers for 1000 ul Pipette Tips or Fisher Cat. #14-100-150; Manufacturer: Bel-Art™ H136800040). Cells were then counted to ensure appropriate cell density (1.5e6/ml to 2.5e6/ml) and viability (>94%). Cells were loaded on to OptoSelect devices quickly after to minimize re-clumping, and maximize single cell loading to individual sequestration pens, ideally within an hour of isolation.

Preparation of internal surface of the microfluidic device. The commercially available Optoselect device includes covalently modified internal surfaces presenting azido reactive functionalities to each surface of the interior enclosure of the device. As shown in FIG. 6A, introduction of fluids under reduced pressure was possible by creating suction at the inlet port of microfluidic device 400 and aspirating (or pulling) reagents or media into the microfluidic device from the outlet port. Alternatively, fluids could be introduced via pumping (e.g., increased pressure) into the microfluidic device 400 via the inlet port, as shown in FIG. 6B. These two modes of fluidic introduction, in combination with temperature control of the device itself and different gaseous mixtures, permitted regioselective differentiated surface modification in the channels compared to that introduced into the sequestration pens. In this experiment, this process was automated, but the method may also be performed manually.

Figure 8A:
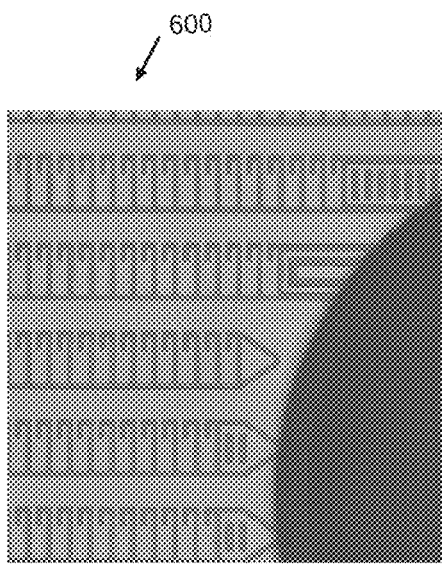
FIGS. 8A to 8E are photographic representations of the process of regioselective and differentiated surface modifications of the channels and sequestration pens of a microfluidic device according to some embodiments of the disclosure.

Initial modification of the surfaces of the channels of the device was performed first. After being dried under an ambient air composition, the device was connected via its outlet port to a completely fluid-filled media line and connected via its inlet port to a vacuum source. The removal of all gaseous gaps in the fluid-filled media line permits precise control of fluid delivery upon application of suction to the inlet port of the device. FIG. 8A shows an image of the channels and pens at the beginning of the process, before any modification to the surfaces of the air-dried microfluidic device 600. The temperature of the microfluidic device was adjusted to 25° C., and reduced pressure was applied to the inlet port device for a period of time sufficient to aspirate 7 ul of 3 mM aqueous solution of dibenzylcyclooctynyl (DBCO) modified-polyethylene glycol (PEG), weight averaged molecular weight 5000 Da (Broadpharm, Cat. #BP-22461), into the device at a rate of 0.2 ul/s. This slowly pulled a plug of the hydrophilic surface modification reagent through the channels and just past the inlet of the microfluidic device.

Figure 8B:
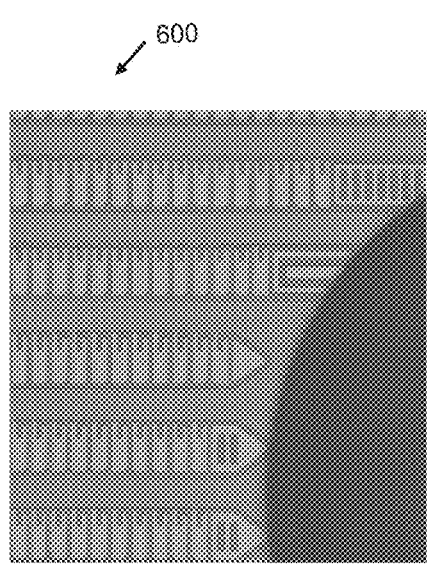

FIG. 7 is a schematic representation of the introduction of the DBCO-PEG 5k solution into the microfluidic device 500, showing contact only with the channel while not entering the sequestration pens. Due to the low pressure of the fluidic introduction, the temperature of the microfluidic device, and the chemical properties of the azido modified surfaces within the microfluidic device, the DBCO-PEG 5k solution does not enter the sequestration pen openings connected to the microfluidic channel. FIG. 8B is a corresponding image of microfluidic device 600, showing the presence of the aqueous reagent only in the channels and none of the reagent in the sequestration pens, where the channels appear darker due to wetting of the surface. Once the channels were wetted, microfluidic device 600 was incubated with the DBCO-PEG 5k solution for 30 minutes at 25° C. to permit coupling of the DBCO-PEG 5k molecules with the azido functionalities on the surfaces of the channels.

Maintenance of the 25° C. temperature throughout the incubation prevented undesired modification of the surfaces of the sequestration pens. A decrease of the temperature of the device would have resulted in compression of the gases inside the pens, allowing entry of DBCO-PEG 5k solution from the channel into the sequestration pens.

Figure 8C:
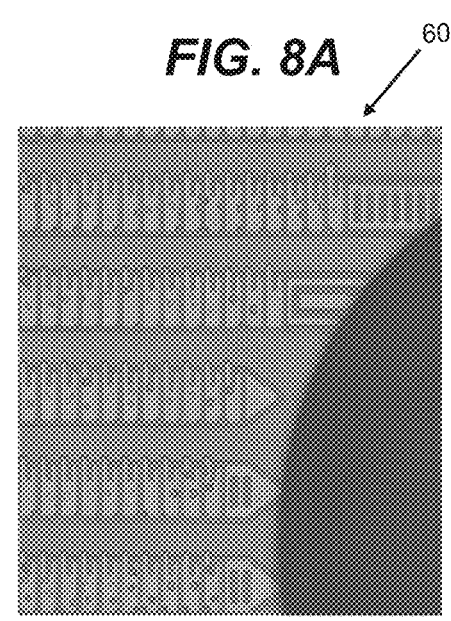

Following the incubation, 250 ul of deionized (DI) water was flushed through the device at a rate of 0.2 ul/s, while the temperature of the device was raised to 50° C. FIG. 8C is an image of microfluidic device 600 after the DI water has displaced the reactive DBCO-PEG 5k solution. In this instance, the higher temperature prevented the DI water from entering the sequestration pens. Although a few small droplets of DI water can be observed in the sequestration pens, there is no significant concentration of DBCO-PEG 5k reagent in the droplets, so the surfaces of the pens were not modified. Thus, the combination of flushing the channel while keeping the gaseous blockage in place in the sequestration pens prevented any of the modification reagent from entering the sequestration pens.

Figure 8D:
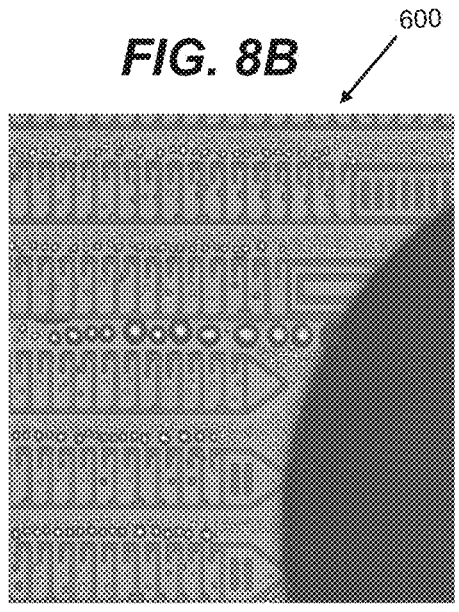

Next, the DI water was removed from the channels of the microfluidic device by applying a vacuum at the inlet port and slowly pulling 25 ul of air, at a rate of 0.2 ul/s, from the outlet port through the channels. This was followed by aspirating a second aliquot of 25 ul DI water, at a rate of 5 ul/s, from the outlet through the device and exiting through the inlet port. Finally, a third aliquot of DI water (200 ul at a rate of 5 ul/s) was aspirated from the outlet port, through the channels, and exited through the inlet port. This process installed a non-adherence promoting hydrophilic surface (presenting PEG 5k surface modifying ligands) to all the surfaces lining the channels of the microfluidic device, while leaving the surfaces in the interiors of the sequestration pens unaltered. FIG. 8D is an image of microfluidic device 600 after aspiration with the third aliquot of DI water. A mixture of air bubbles and deionized water can been seen through the channels and the sequestration pens.

Figure 8E:
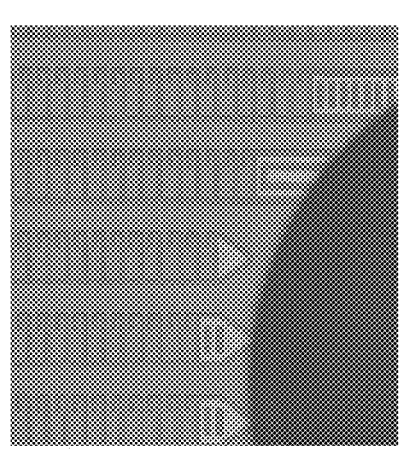

To prepare the interior surfaces of the sequestration pens for modification, 1,250 ul of 100% carbon dioxide ($CO_2$), at an increased pressure of 15 psi, was flushed through the device at 5 ul/s, entering via the inlet port and exiting at the outlet port. The 100% $CO_2$ gas filled the channels and pens, providing an atmosphere much more soluble to aqueous solutions. The device was then flushed 5 times with a total of 1,250 ul of a 2M PBS solution containing 2 micromolar DBCO-PEG13-streptavidin and 0.02% sodium azide. The solution entered via the inlet port and exited through the outlet port. Synthesis of the DBCO-PEG13-streptavidin was performed as described in PCT/US2018/043146, entitled "Antigen-Presenting Synthetic Surfaces, Covalently Functionalized Surfaces, Activated T Cells, and Uses Thereof", and filed on Jul. 20, 2018, the content of which is herein incorporated by reference in its entirety. The pressure resulting from introduction of the DBCO-PEG13-streptavidin solution at the inlet port facilitated entry of the solution into the sequestration pens, and the high solubility of carbon dioxide in the solution assisted with dissolving any bubbles in the pens, thereby ensuring complete fluidic coverage of the surface within the sequestration pens. The temperature was then ramped to 40° C., and the device was incubated for 30 minutes, permitting reaction of the DBCO-PEG13-streptavidin reagent with the azido functionalities on the surfaces within the sequestration pen. The already-modified channel surfaces did not further react with the DBCO-PEG13-streptavidin reagent, and retained non-adherent hydrophilic PEG-presenting surfaces. FIG. 8E shows a photograph of microfluidic device 600 following modification of the sequestration pens with the DBCO-PEG13-streptavidin reagent. The channels and the pens both appear darkened due to the hydrophilic surface in the channel and the streptavidin-presenting surface in the sequestration pens. After incubation was completed, the device was rinsed 3 times with 250 ul of DI water at a rate of 5 ul/s. The rinses permitted diffusive exchange between the DBCO-PEG13-streptavidin solution within the sequestration pen and the DI water contained within the channel. 25 ul of PBS was then aspirated through the chip at a rate of 1 ul/s to protect the surfaces in the channels and sequestration pens until cell loading/final sequestration pen surface modification.

Cell loading and final intra-pen adherent surface modification. A solution of 495 uM biotin-PEG5k (Creative Pegworks Catalog #PLS-2054) and 5 uM biotin-RGD (arginine-glycine-aspartic acid tripeptide, Anaspec Catalog #AS-62347) was diluted in a 1:10 ratio into culture medium (as described above). The resulting culture medium ("modified PEG/RGD medium") was added to a preparation of BE2-M17 human neuroblast cells (prepared as described above) being maintained at 36° C. and exposed to 5% $CO_2$. The cell+modified PEG/RGD medium mixture was then loaded into the channels of the microfluidic device, and the cells were introduced to isolation regions of the sequestration pens using optically actuated dielectrophoretic force, to substantially provide a single cell in each isolation region of the sequestration pens. After cell loading was completed, 70 ul of the modified PEG/RGD medium was aspirated through the channels of the microfluidic device. A second aliquot of 50 ul of modified PEG/RGD medium was then slowly perfused through the microfluidic device for 30 minutes, allowing the biotin-PEG5k and biotin-RGD molecules to diffuse into the pens. The biotinylated PEG and RGD species bound to the surfaces of the sequestration pens via the biotin binding sites of the streptavidin moieties previously covalently immobilized via the Click reaction with the original azido functionalities. The biotin-linked RGD moieties provided a surface offering extracellular matrix-like adhesive binding sites, which promote cell adhesion and propagation. For the BE2-M17 cell type, the ratio of biotin-PEG/biotin RGD of 99%:1% m/m was found to provide a balance of adhesive sites and non-adhesion promoting sites. This ratio may be varied as needed for other types of attachment-dependent cells.

Culturing. The BE2-M17 cells were cultured in the sequestration pens of the microfluidic device for about ten days following introduction of the cells and the attachment-promoting surface to the sequestration pens.

Initial Dissociation: The counting and export of adherent cells requires first detaching the cells from one another and the surface of the microfluidic device. To achieve on-device dissociation, 10× TrypLE cell disengagement reagent was used to cleave adhesive proteins carboxy-terminally to lysine and arginine amino acid moieties. 1000 ul 10× TrypLE at 36° C. was flowed at a rate of 5 ul/s into the channels of the microfluidic device, while the device was mounted within the optical instrument, to displace all media with the cell disengagement reagent. The flow regime in the channels was laminar-like, with a vortex regime inside the connection region of the sequestration pen, and a sedentary diffusion-dominated regime inside the isolation region of the sequestration pen. As shown in FIGS. 9A-B, the sequestration pen 724 includes a connection region 736 and an isolation region 740, where the connection region 736 has an opening to the microfluidic channel 764 of microfluidic device 700. The cell disengagement reagent present in the channel 764 diffuses into the sequestration pen 724, while media diffuses out. Components of the culture media are known to quench the activity of both trypsin and trypsin-like cocktails. To prevent quenching and maintain the concentration gradient, 10× TrypLE cell disengagement reagent was flowed through the channels throughout the entire process. This was done in a pulsatile manner, with alternating pushes and pulls. 50 ul of the cell disengagement reagent were flushed to the channels of the device at 5 ul/s, then pulsatile flow was started, pushing 12 ul at 5 ul/s, then pulling 9 ul at 2 ul/s. This was repeated 50 times for a total net fluid displacement of 150 ul through the device. The flow rate when pulling the 9 ul package was reduced to 2 ul/s to prevent the nucleation of bubbles from the negative pressure. An additional 100 ul of the cell disengagement reagent was then dispensed at 5 ul/s to clear any bubbles from the channel 764. This process was repeated 5 additional times, with the total process (including all repetitions) taking approximately 45 minutes. The alternating pushes and pulls of cell disengagement reagent alternated the direction of the vortex in the connection region 736 of the sequestration pen 724, as depicted in FIGS. 9A-B, helping to dislodge and pull any cells present in the connection region 736 out into the channel during the dissociation process. FIG. 10A shows a pair of sequestration pens having cells that have grown up into the connection regions 736 of the sequestration pens, and FIG. 10B shows the same pens after completion of the cell disengagement process, showing that the expanded cells in the connection regions 736 were removed, while the cells that resided in the isolation region 740 were retained. This removal prevented clonal contamination events during the export process.

With diffusion-dominated mass transfer inside the sequestration pen, the time required for adequate disengagement depended upon cell type, occlusion of the pen neck area, and pen geometry and size. The number of scrub cycles performed for a given cell type can be adjusted on a per-workflow basis, adjusting the exposure and scrub duration of the cell disengagement reagent. FIGS. 11A-E shows the progression of a 45 minute disengagement process for one sequestration pen containing BE2-M17 cells, after approximately 10 days of microfluidic culture. As can be seen, the cells were concentrated into the central portion of the isolation region 740 by this process, and the connection region 736 was cleared of any cells.

Due to the irregular morphology of cells in an adhered state, cell counting was more accurate after the disengagement process.

Periodic Dissociation Step: Optimally, export is performed on cells in a suspension/near-suspension-like state. After performing the disengagement process (e.g., as described above), cells gradually started to re-adhere to one-another as well as the surface of the sequestration pen of the microfluidic device. As their connections to the device surface increase, the mobility of the cells is reduced, and efficiency of removal from the sequestration pen ("unpenning") decreases. To prevent such reattachment, exposure of the cells to a cell disengagement reagent, such as 10× TrypLE, was used at regular intervals throughout the export process. The frequency and length of the dissociation processes required to maintain suspension-like properties depended on the nature of the cell-line, and was adjusted as part of the export process. For the BE2-M17 neuroblastoma cell line of this example, 15-minute treatments with 10× TrypLE were performed at intervals of every 240 minutes during the export process. During the 15-minute treatments, 100 ul of TrypLE was pushed through the microfluidic device at 5 ul/s. 50 ul was then slowly perfused at 0.06 ul/s. The cell disengagement re-exposure process lasted approximately 16 minutes, and was adjusted as needed for other cell types or circumstances.

Laser-Assisted Bubble Export Process. Adherent cells that have undergone a dissociation process as described herein can sometime be exported from the sequestration pen using DEP force. However, more typically, the export of adherent cells from a sequestration pen requires greater force than can be generated using DEP. A laser-generated bubble can provide the force needed to export adherent cells from a sequestration pen.

Before performing a laser-assisted bubble export, the syringe of the pump was loaded with a flush volume of export medium for use both in exporting unpenned cells to the plate and dissolving the bubble after the export process was complete. A typical flush volume was 250 microliters, but more or less volume may be required depending on bubble size, chip temperature, and amount and type of dissolved gasses in the export medium. In this experiment, a serum free export medium was used, permitting subsequent processing of exported cells for nucleic acid sequencing. If follow-on sequencing is not contemplated, the export medium is not required to be serum-free.

Local laser calibration. The stage was positioned so that a target pen was centered under the objective. Local laser calibration was then carried out. The stage was moved such that the objective crosshair was centered in the channel about 100 microns away from the opening to the pen (exact distance from the pen varies with chip type and channel height). The z-offset of the stage was adjusted to the laser focal plane, placing the laser in optimal focus on the interior substrate (base) surface of the microfluidic device. Brightfield illumination of the chip was then deactivated and a 250 mW laser pulse was fired into the channel for 100 ms. The position of the laser spot center was detected and saved in the software for use during the unpenning Calibration for each sequestration pen before export increased accuracy of the unpenning but was not required. After the calibration was complete, the z-offset was set back to the imaging plane and the brightfield illumination was turned back on.

Magnification selection. For microfluidic devices having sequestration pens having larger pen geometries, for example, a width of about 250 microns and a length of about 300-400 microns, exports were typically carried out using a 4× objective in the optical train, where the diameter of the laser dot was typically about 40 microns in diameter (this varied depending on the optics of the machine and the manual focusing of the laser performed during periodic maintenance). Exports were also carried out at higher magnification such as 10×, where the beam spot diameter was reduced to approximately 10 microns, allowing for more accurate exports. However, higher laser power was typically required for higher magnification objectives due to losses in the optical train. Microfluidic devices having small sequestration pens, having a width of about 50 microns or so, were only exported at higher magnifications, as lower magnification resulting in spot diameter what could lead to damage to the pen walls.

Laser Power Selection. Laser pulses with power greater than 750 mW vaporized/burned the material of the pen wall when contacted by the pulse, leading to the rapid formation of a large gas bubble. The rapid formation of this gas bubble was not optimally controllable, so large bubble formation was avoided by ensuring that the laser spot did not contact the pen walls. Bubbles generated by evaporation of the buffer in the pen by locally heating the surface of the substrate of the microfluidic device with the laser were more predictable for use in cell export, causing less damage to the integrity of the pen walls and avoiding clonal contamination.

The size of the generated bubble depended on several factors, including the power of the laser pulse, pulse duration, and distance the stage moved while the pulse was active. The generated bubble shrank by 30-60% when the laser was deactivated, reaching an equilibrium size approximately 2 seconds after the laser was deactivated. The equilibrium size of the nucleated bubble was also dependent on both pressure inside the microfluidic device and device temperature. For media that was introduced as a pre-temperature-equilibrated 5% $CO_2$ buffered medium, the generated laser bubble size stayed static or grew slowly if the microfluidic device was maintained at a temperature 6-8° C. above that of the export buffer. When microfluidic devices were maintained at temperatures lower than that of the export buffer, the vapor in the bubble would spontaneously re-dissolve, leading to bubble shrinkage. When microfluidic devices were maintained at temperatures higher than about 6-8° C. above that of the export buffer, more dissolved gasses entered the gas phase, enlarging the size of the laser-generated bubble. With a device temperature 12° C. above the export buffer temperature, the generated bubble would typically double in size in the first 60 seconds after nucleation.

Laser illumination path. Depending on the geometry of different sequestration pens available and whether complete export or only partial export of the cells within the sequestration pen is desired, different laser illumination paths (or "laser pulse"), time exposures, and repetitions of the laser pulses were used.

Partial Export. As shown in FIG. 12A, the path of laser illumination for a large sequestration pen 724 having a width of about 250 microns can be as shown by the two white arrows. The laser illumination path starts at the base of the arrow and moves toward the head of the arrow, deactivating upon reaching the arrow head. A single laser pulse corresponds to the movement of the laser along the length of the laser illumination path, and the numbers beside the laser illumination paths indicate a possible order of performance when a plurality of laser pulses are performed serially. Typically, for a split export (i.e., export of less than all of the cells in the pen) from a pen having a geometry as shown in FIG. 12A, the laser focal point was moved to a point in the rear left or rear right corner of the isolation region 740 of the sequestration pen 724, about 40 microns away from the rear wall (at the bottom of the image) and about 25 microns from the side wall of the sequestration pen. The first attempt would occur in the rear right region of the isolation region 740 of the pen (see white numerals in FIG. 12A). The z-offset of the stage was changed to bring the surface of the base of the isolation region of the pen into focus, and the laser pulse was activated. The stage was then moved so that the focus of the laser moved 100 microns, in a direction away from the rear wall and parallel to the side wall, at a speed of 300 microns/s, ending at a point 140 microns away from the bottom wall and 25 microns away from the side wall. For a 4× objective, the laser pulse had a power of 460 mW as measured at the surface of the microfluidic device, for the 10× objective, a power of 1180 mW, measured at the surface, was used. After the first laser pulse, the z-offset was changed to the imaging plane. After a two second delay to let the bubble size stabilize, a count of the cells pushed into the channel 764 was performed. If it was equal to or greater than the target number of cells to export, the cells were then exported out of the microfluidic device for further use, analysis or storage. If not enough cells had been unpenned, additional laser pulses were performed, alternating between the left and right side of the isolation region 740 of the pen every two pulses (see white numerals in FIG. 12A) for a maximum of 10 attempts. If the target number of cells had not been unpenned after 10 attempts, no cells were exported to the well plate and the generated bubble was then dissolved.

For the narrower geometry of a sequestration pen 1024 of a microfluidic device 1000, having an isolation region 1040 and a connection region 1036 as illustrated in FIG. 12B, a split (or partial) export used a single laser illumination path. The laser focal point was moved, by moving the stage supporting the microfluidic device, to a point 50 μm away from the rear wall of the pen 1024 within the isolation region 1040, then centered within the width of the pen. The laser was then activated and the stage was moved upwards along the centerline of the pen at a speed of 300 microns/s for a distance of 75 μm. When using the 4× objective with sequestration pen 1024, laser power was set at 1248 mW; when using the 10× objective, laser power was set at 1483 mW. The z-offset was then changed to the imaging plane. After a two second delay to let the bubble size stabilize, a count of the cells pushed into the channel 1064 was performed. If it was equal to or greater than the target number of cells to export, the cells were then exported out of the microfluidic device for further use, analysis or storage. If not enough cells had been unpenned, additional laser pulses were performed for a maximum of 10 attempts. If the target number of cells had not been unpenned after 10 attempts, no cells were exported to the well plate and the generated bubble was then dissolved.

Full export. For a full export (i.e. export of all or substantially all the cells within the sequestration pen) from a sequestration pen 724 having a width of about 250 microns, the laser focal point was moved to the centerline of the pen, about 40 μm away from the rear wall, within the isolation region 740 of the pen, and the z-offset was changed to the laser plane. The laser was then turned on and the stage was moved so that the laser focal point moved at a speed of 300 microns/s in a straight line to a point 25 microns from the right pen wall and 215 microns away from the rear wall of the pen. For the 4× objective, the laser pulse had a power of 1248 mW; for the 10× objective, a power of 2347 mW was used Immediately following this first portion of the first laser pulse, the power of the laser was reduced by 2% and the stage was adjusted such that the focal point of the laser could be moved, in a direction parallel to the right wall of the pen, another 70 microns upwards at 300 microns/s, into the hook region of the sequestration pen. Then the laser was deactivated. For the second laser line pulse, the laser focal point was moved back to the starting point within the isolation region 750, a point 40 microns away from the rear wall of the pen, along the centerline of the pen. The laser was then activated and the stage was moved so that the focal point of the laser moved upward along the centerline of the pen at 300 microns/s to a point 225 microns away from the rear wall of the pen, ending near the upper limit of the isolation region 740. The laser was then turned off. For the 4× objective, the second laser pulse had a power of 1248 mW; for the 10× objective, a power of 2347 mW was used. For the third laser pulse, the focal point of the laser was moved back to the starting point within the isolation region 740, then the laser was activated and moved in straight line to a point 25 microns from the left wall of the pen and 215 microns away from the rear wall of the pen, at a rate of 300 microns/s. The laser was then turned off. For the 4× objective, the laser pulse had a power of 1248 mW; for the 10× objective, a power of 2347 mW was used Immediately following this first portion of the third laser pulse, the laser power was reduced by 2% and the stage was adjusted such that the focal point of the laser could be moved, in a direction parallel to the left wall of the pen, another 70 microns before the laser was deactivated. The z-offset was changed back to the imaging plane and, after a two second delay to let the bubble size stabilize, the number of unpenned cells were counted. If the number of cells unpenned was equal to or greater than the export target, cells were exported to the plate and the generated bubble was dissolved. As persons skilled in the art will readily appreciate, the additional operations of waiting for the bubble size to stabilize and counting unpenned cells are not required in the process of exporting all (or substantially all) the cells from a sequestration pen.

FIG. 12C shows the path of the laser pulses described in the preceding paragraph. The laser pulses were activated at the base of the white vectors, moving in a direction closer to the opening to the channel Thinner sections of the vectors represent portions of the laser illumination path where laser power was reduced 2%. The numbers indicate the sequence in which the laser vectors were drawn in the pen.

For a full export of cells from a sequestration pen 1024 having a geometry as shown in FIG. 12D, the stage was moved so the laser focal point was 50 microns away from the rear wall of the pen, within the isolation region 1040 and on the centerline of the pen. The laser was then activated and moved away from the rear wall, along the centerline of the pen, for 285 microns at a speed of 300 microns/s. The path of the laser pulse went through the connection region 1036, ending at the opening of the pen 1024 into the channel 1064. Laser power with the 4× objective was about 460 mW, while laser power with the 10× objective was about 1130 mW. Then this laser pulse was repeated one more time. The z-offset was changed back to the imaging plane. After a two second delay to let the bubble size stabilize, the number of unpen cells were counted. If the number of cells unpenned was equal to or greater than the export target, cells were exported to the plate and the generated bubble was dissolved. As above, the operation of counting the cells is not required for this process.

Export from smaller sequestration pens (e.g., having shorter length from rear wall to opening, and optionally, a narrower width), was performed similarly to that described in connection with FIG. 12D, above, but was performed with a 10× or higher objective. The laser line was drawn at a point 20 microns away from the rear wall of the pen, within the isolation region, where the cells tend to congregated, and then moved up the centerline of the pen at a speed of 100 microns/s to a point 170 microns away from the rear wall of the pen, with a laser power of 1130 mW, to push the cells out into the microfluidic channel (not shown).

Images were taken after the conclusion of the laser pulses and cells were counted. If the unpenning was successful, the cells were exported out of the microfluidic device sequentially for each individual sequestration pen, again to avoid cross-pen contamination. The bubble was then dissolved by flowing export buffer through the chip at the maximum flow rate (5 microliters/s). The elevated pressure in the device caused by the pumping caused the gas in the bubble to dissolve back into the liquid until the bubble was gone. A final image was taken of the target pen to confirm that the bubble was dissolved.

Figure 13A:
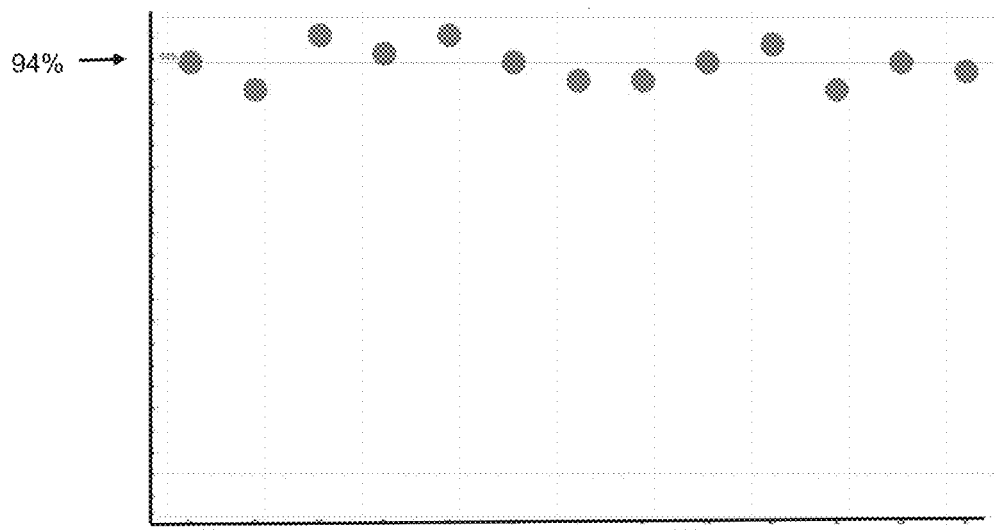
FIG. 13A is a schematic representation of the viability of the first export cells of a split export experiment in 13 microfluidic device experiments.
Figure 13B:
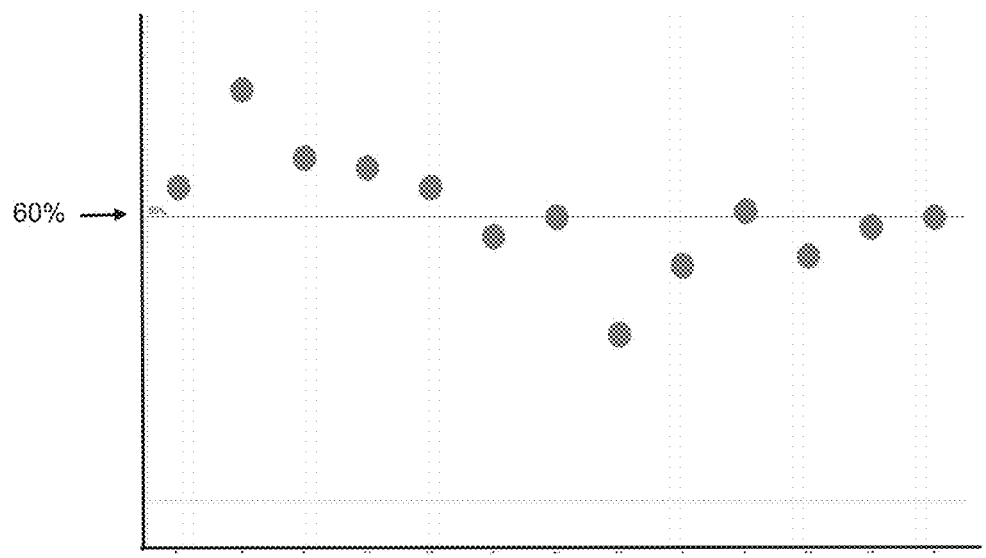
FIG. 13B is a schematic representation of the viability for the remainder of cells cultured for an additional 72 hr after the first export from the same 13 microfluidic device experiments shown in FIG. 13A.
Figures 13C, 13D:
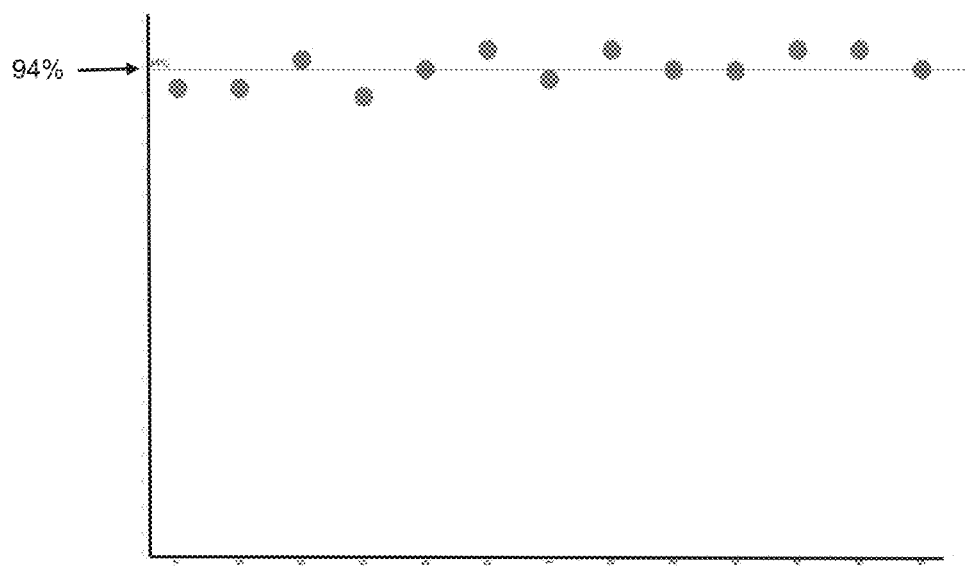
FIG. 13C is a schematic representations of the unpen efficiency of the first export cells of the split export experiment of the same 13 microfluidic device experiments.
FIG. 13D is a schematic representation of the unpen efficiency of the remainder of cells cultured for the additional 72 hr. after the first export from the same 13 microfluidic device experiments.

Viability of exported cells. The cells exported in the first export process were exported individually (per each sequestration pen) to individual wells in an export well plate. Conditioned media was used in the well plates to maximize viability, and included 80% standard culture medium: 20% conditioned standard culture medium (i.e., decanted supernatant from culture flasks of this cell type) (v/v). The conditioned standard culture medium was filtered before use through a 0.45 um mesh filter to remove cellular debris and prevent clonal contamination arising from loose suspended cell. The viability of the first exports of a split-export process (representing over 500 individual cells, over 13 different microfluidic devices as shown in FIG. 13A where the x axis represents a different microfluidic device (e.g., an individual experiment having multiple pens with adherent cells cultured within sequestrations pens and the y axis represents the viability for the set of cells exported in the first export (split) for that microfluidic device, shown as a dot. Viability was defined as whether the group of cells exported from a single sequestration pen established a clonal population in the individual well of the export well plate after 5 days of culturing post-export to the export well plate. As seen in FIG. 13A, the viability across 13 different microfluidic device experiments averaged approximately 94%. The unpen efficiency was defined whether as 5 or more cells unpenned for each sequestration pen where split export was performed. For split export, at least half of the cells present in a specific sequestration pen were left in the sequestration pen for further handling. FIG. 13C shows the un-pen efficiency for the same microfluidic devices/experiments of FIG. 13A, and can be seen to have averaged approximately 94%.

Viability of cells remaining in the sequestration pens after a split-export. The serum-free-medium (SFM) used for export caused a noticeable drop in viability of cells remaining in the sequestration pens after export. The SFM was removed the morning after export and replaced with fresh serum-containing culture medium. The chips were allowed to culture and recover for an additional 48 hours. The list of sequestration pens having successfully exported a portion of cells during the first export process was used for a second export process with the further-cultured cells. The unpen-all method was used for the second export, and as many cells as possible were exported. Many of the pens had continued to grow and divide after the first export in SFM, but some pens did not fully recover. The average export viability for the same over 500 pens for the second export in the same 13 microfluidic devices was approximately 60%, as shown in FIG. 13B and the unpen efficiency for the microfluidic devices, defined as 5 or more cells unpenned, averaged approximately 96% as shown in FIG. 13D. Conditioned media, as described above, was used in the receiving well plates to maximize the viability of exports.

Combined laser-assisted bubble and optically-actuated dielectrophoretic export. In some experiments, cells may not be fully exported from the sequestration pen or other chamber with the laser-assisted bubble export method. However, they are still detached and capable of being moved using dielectrophoretic forces, following the laser-assisted bubble export process. HeLa cells were cultured for 4-5 days, and subsequently exported with this combined unpen method, in combination with initial and regular periodic dissociations of 10× TrypLE at intervals of 90 minutes. The unpen voltage was set to 4.5 V, and the unpen speed was set to 10 microns/s. The unpen efficiency was approximately 60%, and the export viability was approximately 60%.

Experiment 2. Adaptive Laser Assisted Exportation of Non-Adherent Cells.

Non-adherent cells (e.g., non-adherent CHO cells) were used. Cell numbers and viability were counted and cell density was adjusted to 5×10$^5$/ml before loading.

Preparation of internal surface of the microfluidic device for non-adherent cells. All internal surfaces of the microfluidic device, including the channel and sequestration pen surfaces, were prepared as described in International Application No. PCT/US2017/034832 entitled "Covalently Modified Surfaces, Kits, and Methods of Preparation and Use", and filed on May 26, 2017, the entire disclosure of which is herein incorporated by reference in its entirety. The internal surfaces included one of the covalently modified surfaces as described therein.

Culturing. The non-adherent cells were cultured in the sequestration pen for at least three days, and typically no more than five days, prior to initiating the export process. For non-adherent cells, the culture medium was replaced with export medium on day three.

Dissociation of Non-Adherent Cells: In some instances, non-adherent cells (e.g., non-adherent CHO cells) have been engineered to minimize cell aggregation and surface adhesion. However, such behaviors may not always be eliminated. In some variations, cells may be prone to aggregation and surface adhesion, even if they are not attachment dependent cells, for example, the intrinsic or external conditions of the cells may make them more prone to aggregation and surface adhesion. In such cases, cell aggregates prevent accurate counting and export of cells as shown in FIG. 14A, where the white arrow points to an aggregated group of cells. To successfully export cells having such aggregated behavior without killing high proportions of the cells in such an aggregation, methods for disassociating cells may be employed.

To improve cell counting and export for this exemplary method, 1× TrypLE cell disengagement reagent was used to cleave adhesive proteins, cleaving carboxy bond linkages of lysine and arginine amino acid moieties of the adhesive protein. A change in cell morphology was observed upon treatment with 1× TrypIE; cell aggregates dissociated into readily identifiable individual cells (FIG. 14B, white arrow). To effect cell disengagement, the fluidic lines were prepared by flushing 1500 ul of the dissociation reagent at 25 ul/s. Thereafter, the channels of the microfluidic devices were perfused with 1250 ul of dissociation reagent at 36° C. at a rate of 5 ul/s to replace all media in the channels with the cell disengagement reagent. To allow diffusive transport of the dissociation reagent into the sequestration pens, fluidic flow was stopped for 10 min. After the 10 min incubation period at 36° C., the perfusion and incubation steps were repeated a second time. The total treatment time with the 1× TrypIE reagent is approximately 30 min. The incubation time and number of perfusion-incubation cycles are user-defined parameters that can be optimized for a given cell sample or cell type on the microfluidic device, and may vary from the specific example described here. After the final perfusion-incubation cycle was complete, the microfluidic device was flushed with 1250 ul of media at a rate of 5 ul/s, replacing the dissociation reagent with fresh media.

Laser-Assisted Bubble Export Process. Non-adherent cells that have undergone a dissociation process as described herein can sometimes be exported from the sequestration pen using DEP force alone. However, the percentage, and by extension, the absolute number of non-adherent cells recovered from a sequestration pen using only DEP forces may not be sufficient to maximize the probability of cell survival in the export well plates. For non-adherent cells, the probability of cell survival in the export well plates increases rapidly as more cells are recovered from the sequestration pen, as shown in FIG. 15, which presents dual data associations. The left-hand y axis of FIG. 15 shows percent viability and the x axis shows the number of cells per export. The line 1510 shows the percent of off chip viability as the number of cells per export increase, along the x axis. The arrow pointing to the left-hand y axis is to associate line 1510 with they axis attributes. As shown in line 1510 of FIG. 15, once more than nine cells were exported for this non-adherent cell strain, better than 80% viability was ensured. Therefore, extracting as many cells as possible from the sequestration pen was highly desirable. The other data present in FIG. 15 represents the number of cells per export along the x axis, and the right-hand y axis shows the number of observations made, exporting that number of cells. The data is represented within the grey bars for each number of cells per export. Since the number of cells per export was dependent upon the nature of each clonal population and other factors, this data gives weight to confidence in each probability calculation. For instance, for this experiment if all observations of greater than 20 cell exports were binned together, the probability of off-device survival would be 100%.

In other variations, a user may select a sub-set of a plurality of cells (e.g., a clonal population of cells) for export out of the sequestration pen or chamber, while retaining a remaining portion of the plurality of cells for continued culturing, additional experiments, or alternative experiments. A laser-generated bubble can provide a larger force to export non-adherent cells from a sequestration pen than the forces provided by DEP alone.

Before performing a laser-assisted bubble export, the syringe of the pump was loaded with a flush volume of export medium for use both in exporting unpenned cells (e.g., cells that were exported to the flow channel) to the export wellplate and dissolving the bubble after the export process was complete. A typical flush volume was 250 microliters, but a larger or smaller volume may be required depending on bubble size, chip temperature, and amount and type of dissolved gasses in the export medium. Fresh unconditioned medium was used as the export medium. For non-adherent cells, secreted factors in conditioned medium may interfere with in-situ assays utilized to select the best candidates for export and off-chip scale up. In the absence of interfering secreted factors, conditioned media may be used as an acceptable export medium.

Local laser calibration, magnification selection, and laser power selection were performed as described above for Experiment 1.

Adaptive laser-assisted bubble and optically-actuated dielectrophoretic export of non-adherent cells. In this example, all experimental data was collected with four DEP cycles and without a stop threshold, where used, in order to maximize the number of non-adherent cells recovered.

As mentioned, DEP forces may not always be sufficient to extract micro-objects like non-adherent cells or beads (including beads having biomolecules covalently or non-covalently attached to them) from the sequestration pens. Using a DEP process (e.g., four cycles of DEP at 5 V and 1 MHz), the median fraction of the non-adherent CHO extracted (e.g., unpenned) from the sequestration pen was ~20% (FIG. 16A, where n=178), and the average unpenning efficiency, defined as two or more cells extracted from the sequestration pen, was ~81%.

Laser-assistance with dynamic pulse, FIG. 19: When DEP was not sufficient to recover an acceptable number or fraction of cells from the sequestration pen, a dynamic laser-assisted bubble cell extraction process was activated, as shown in FIG. 19 and discussed generally above.

Figures 20A, 20B, 20C, 20D, 20E:
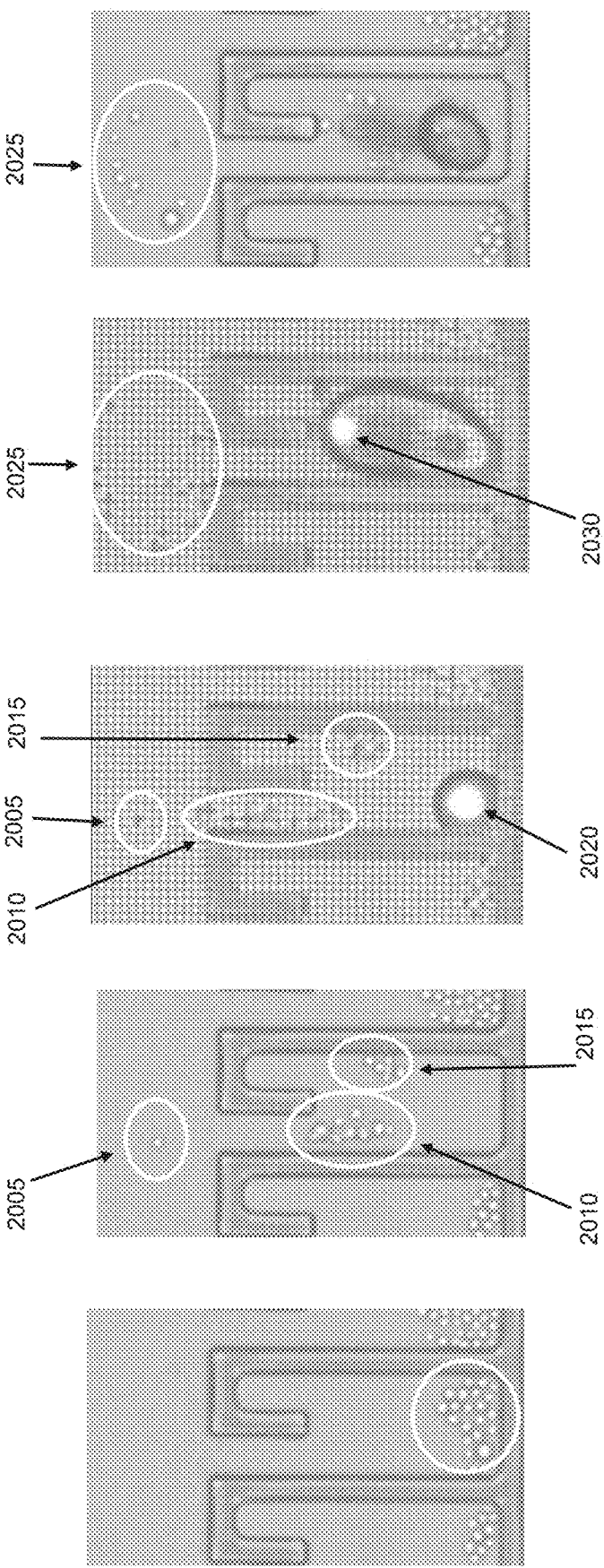
FIGS. 20A to 20E are photographic representations of a method for repositioning cells according to some embodiments of the disclosure.

FIGS. 20A to 20E show various points during the experiment. FIG. 20A is a photograph of a selected sequestration pen having a group of the non-adherent cells (within the white circle), prior to any application of DEP or laser assistance. FIG. 20B shows the sequestration pen after four cycles of DEP, where only one cell 2005 has been extracted out of the sequestration pen, a first group of cells 2010 are repositioned closer to the connection region, and a second group of cells 2015 are moved to the right side of the sequestration pen. To assist extraction (unpenning) of the cells still within the sequestration pen, a dynamic laser pulse was applied, as in individual process 1755, as the cells were not found near the planned initial laser illumination start point. The trajectory of the dynamic laser pulse is shown in the accompanying micrographs at FIG. 20C (start point of the laser 2020) and FIG. 2D (end point of laser 2030), where the laser focal point began approximately 32 microns to the left and 145 microns below the geometric center of the sequestration pen. The optical stage was moved relative to the microscope objective at a rate of 50 microns/s so that the laser focal point ended 3 microns to the right and 40 microns above the geometric center of the sequestration pen. In FIG. 20C, the group of cells 2010 are already moving towards the opening of the sequestration pen to the channel. In FIG. 20D, a larger number of cells 2025 have been extracted from the sequestration pen and repositioned into the channel. The cells are not clearly rounded as the z-offset was set at the laser illumination level during these photographs.

After the laser pulse, the process stopped, the z-offset was changed to the imaging plane to count the cells in the sequestration pen and channel area as needed, and the cells were exported to a well in a plate. As shown in FIG. 20E, the cells 2025 are in the channel and easily available for export. Note that a few cells still remain within the pen.

In this experiment, optimal results for non-adherent CHO cells were obtained using a single laser pulse with the specified trajectory at calibrated laser powers between about 368 to 553 mW, as measured at the surface of the microfluidic device. An observed limitation to increasing the stage translation speed was observed, as stage translation speeds exceeding 50 microns/s by about 20-50%, e.g., to about 75 microns/sec-100 microns/sec caused the cells to come under direct laser illumination due to recirculating flow e.g., including circular laminar flow lines in the very low Reynolds number regime operable within the microfluidic device). Direct laser illumination had deleterious effects on the number or fraction of cells extracted from the sequestration pens due to cell death. It was discovered that DEP repositioning of the cells prior to activating the dynamic laser pulse minimized such cell death resulting from such recirculating flow. This resultingly improved unpenning efficiency and number or fraction of cells extracted from the sequestration pens.

Static laser plus DEP plus dynamic laser pulse, FIG. 22. In some experiments, the dynamic laser pulse after DEP cycles, as described above, still did not unpen (e.g., extract) sufficient numbers of non-adherent cells. A further alternative method, as shown in FIG. 22, was used, which added a static laser pulse to the sequence of DEP and dynamic laser pulse, as described above in detail. All experimental data here utilized a static laser pulse at a fixed location 40 microns to the right and 55 microns above the geometric center of the sequestration pen. The process is shown in FIGS. 23A to 23F. In FIG. 23A, the group of cells in the sequestration pen are visible at the bottom of the pen. FIG. 23 B shows the effect of DEP only (after performing OEP unpen 1705 of FIG. 22), where the nonadherent cells (two subgroups within white circles) were not extracted out of the sequestration pen, but remain within the sequestration pen due to aggregation effects. The adaptive laser-assisted bubble and OEP method proceeded through decision point 1711 to static bubble dislodge 1735 of FIG. 22. In FIG. 23C, a static laser pulse 2305 was performed, illuminating the fixed location. In FIG. 23D, the z-offset was readjusted back to the focal plane of the cells, after the laser pulse. Cells have been repositioned but are still present within the sequestration pen (white circles). Since the cells were not extracted from the sequestration pen, ("unpenned"), the adaptive laser-assisted bubble and OEP method proceeded through OEP unpen 1745 (not shown) and decision points 1713, 1719 to then perform a dynamic bubble unpen 1755 as shown in FIG. 22. As shown in FIG. 23E, the laser was activated at the start point 2310, and at that point in time, a first set of cells 2315 are already moving within the connection region of the sequestration pen towards the channel, while the second group of cells 2320 still remain where they had resided through the static laser pulse shown in FIG. 23C. FIG. 23F shows the ending position 2330 of the dynamic laser pulse, and the group of cells 2340 that have been extracted from the pen into the channel. The dynamic laser pulse was activated with the trajectory, stage translation speed, laser power, and number of laser pulses as described above. The z-offset of the stage was changed to bring the surface of the base of the isolation region of the pen into focus prior to activating the dynamic laser pulse. The z-offset was then changed to the imaging plane, and is shown in FIG. 23G, where the group of cells 2340 were shown clearly in the channel. Counting the cells in the sequestration pen and channel area was performed as needed. The cells were then exported to a single well of an export well plate for culturing.

Figure 16:
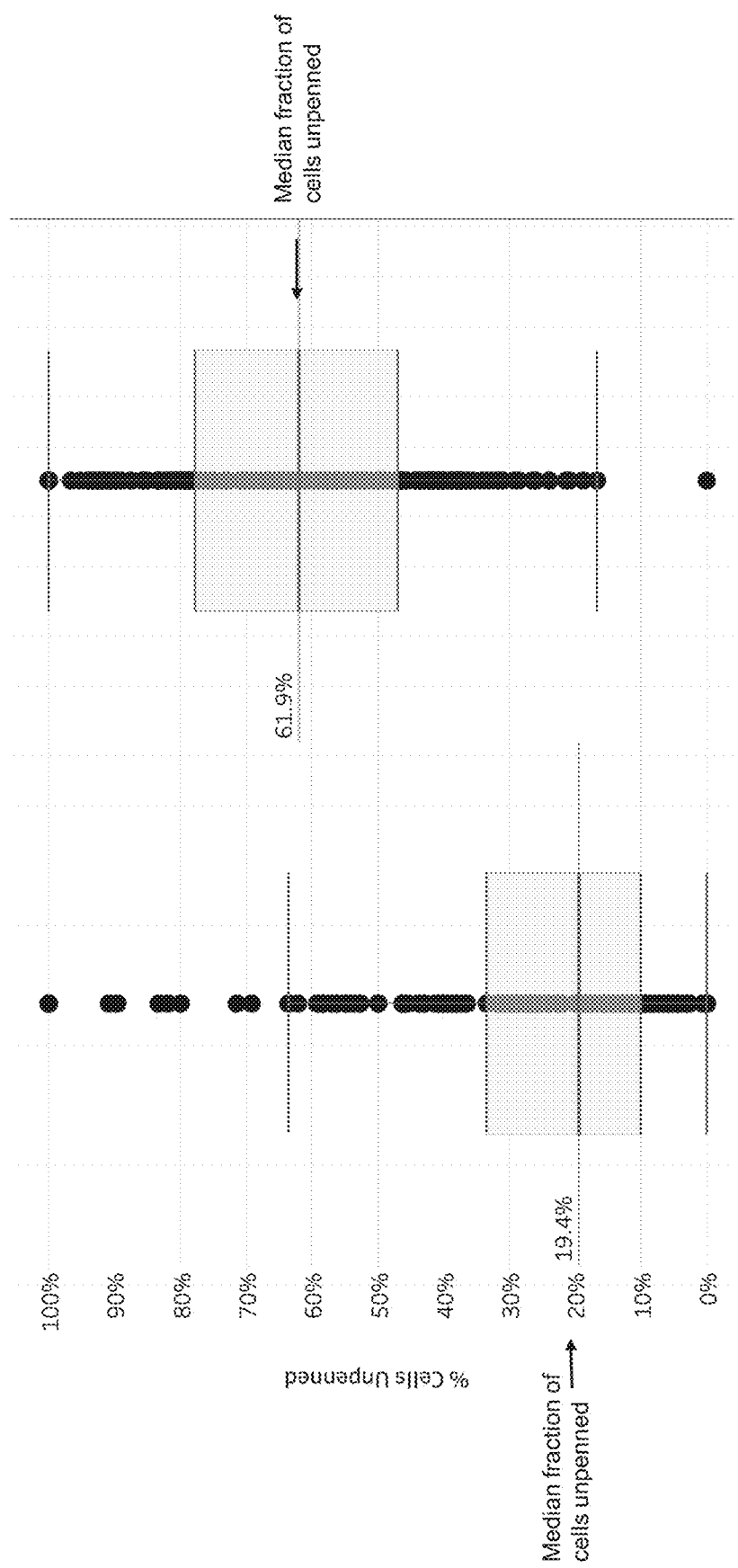
FIGS. 16A to 16B is a graphical representation of median fraction of cells unpenned using DEP only (FIG. 16A) and DEP plus adaptive laser assistance (FIG. 16B according to some embodiments of the disclosure.

In this experiment, the adaptive laser-assisted and DEP method to extract non-adherent CHO cells from sequestration pens yields a median of 62% extraction of cells in the sequestration pens, corresponding to an approximately 3-fold improvement in cell recovery relative to the standard DEP only method, as shown in FIG. 16B, when using the DEP plus Adaptive Laser Assisted methods (n=252). Similarly, average unpenning efficiency for the adaptive laser-assisted and DEP unpenning method was 99.5%, constituting a noticeable improvement over the standard DEP only method.

The non-adherent cells (e.g., CHO non-adherent cells) were delivered to the well plate and remained viable as evidenced by proliferation in the well plate, as shown in FIGS. 24A-24C. Each group of cells from a specific sequestration pen was delivered to an individual well of the well plate containing 80% unconditioned: 20% conditioned medium complemented with 2% B-27™ Supplement (Thermo Fisher Scientific Catalog #17504044). For the non-adherent CHO cells tested, the probability of survival once in the plate reader depended strongly on the number of unpenned cells. For each of FIG. 24 A to 24C, column 1 shows the number of cells extracted from each of the source sequestration pens of FIGS. 24A, 24B, 24C, where it can be seen that for the sequestration pen of FIG. 24A, five cells were extracted and exported. For the sequestration pen of FIG. 24B, fifteen cells were extracted. For the sequestration pen of FIG. 24C, more than 20 cells were extracted. Column 2 shows the number of cells delivered to individual wells of the export wellplate. Column 3 shows the extent of expansion after culturing. Viability was measured based on assessment of proliferation of the exported cells under brightfield microscopic imaging after at least 7-8 days of incubation, where the cells shown in Column 3 in FIGS. 24B and 24C strongly established expanded populations, while for the cells shown in Column 2 for FIG. 24A were less vigorously established. When more than nine non-adherent CHO cells were extracted from the sequestration pen, the probability of survival in the well plate was greater than 80% in the indicated media as shown in FIG. 15, discussed above.

Experiment 3. Laser-assisted bubble export of a bead.

Glass core or plastic core beads including capture moieties were imported into sequestration pens, and nucleic acids were captured to the capture moieties on the beads from biological cells lysed in-situ in the sequestration pen. Laser-assisted bubble export was used to controllably export the nucleic acid-decorated bead from the sequestration pen, as shown in FIGS. 25A and 25B. The variables for laser assisted-bubble export depended on the geometry of the particular sequestration pen and the types of experiment selected by the user. Export could be sequential, exporting only a single bead at a time, or could be performed simultaneously across a group of sequestration pens at the same time.

FIG. 25A shows an experiment where multiple pens were identified for export within a single field of view (FOV). A dynamic laser-assisted bubble dislodge was performed, starting near the distal wall of the sequestration pen 2510. The path of laser illumination 2515 proceeded along the vertical center line of the sequestration pen upwards towards the geometric center point 2505 of center pen of 2410, to dislodge bead 2504 and move it from the isolation region 2535, and into or through connection region 2525, towards the channel 2560. Lysed cell 2502 was left behind. The laser path proceeded along the centerline of the pen and started near the end of the pen opposite to the opening to channel 2560, and proceeded about 50 microns towards the geometric centerpoint 2505, which was about 15-20% of the entire length of the pen (about 300 microns). The laser illumination had a power of about 368 to 553 mW, as measured at the surface of the microfluidic device, and was locally calibrated as described above. This laser assisted-bubble dislodge was performed on each identified pen in the FOV in turn. After all identified pens had laser-assisted bubble dislodge performed, then DEP assisted export was performed on all identified beads/pens and the beads were exported out of the microfluidic device.

FIG. 25B shows a different experiment in smaller sequestration pens, having a length from the base of the isolation region 2535' to the opening of the connection region 2525' to the channel 2560' of about 200 microns Unlike the experiment described for the sequestration pen 2510 of FIG. 25A, individual pens were identified for single bead export, and for each identified pen, DEP assisted export was attempted first. If the DEP-assisted export was not successful, a dynamic laser-assisted bubble export was used to move bead 2504' out of the isolation region 2535', leaving lysed cell 2402' behind, and into or through the connection region 2525' of sequestration pen 2520' towards channel 2560'. The path of the laser illumination proceeded vertically along the vertical centerline of the sequestration pen, and started at a point 90 microns below the geometric center point of the sequestration pen and proceeded upward towards the geometric center point for a distance of about 40 microns. This path was about 20% of the length of the sequestration pen. The laser illumination had a power of about 368 to 553 mW, as measured at the surface of the microfluidic device, and was locally calibrated as described above. After the laser-assisted bubble dislodge, an additional cycle using DEP forces was used to export the bead out of the sequestration pen and out of the microfluidic device to an export well of a wellplate.

List of Selected Embodiments of the Disclosure

1. A method of repositioning a micro-object disposed in a chamber of a microfluidic device, including: directing laser illumination upon a starting position on an inner surface of the chamber to generate an illumination area, where: the microfluidic device may include the chamber and a flow region for containing a first liquid medium, where the chamber may include an opening to the flow region, and the starting position may be disposed within a sub-region of the chamber distal to the opening to the flow region; and moving the laser illumination relative to the microfluidic device, thereby changing the position of the illumination area such that, upon completion of the change, the laser illumination may be at a final position, where the change in the position of the illumination area induces the repositioning of the micro-object at least towards the opening of the chamber to the flow region.

2. The method of embodiment 1, where moving the laser illumination relative to the microfluidic device controllably generates a bubble having a trajectory within the chamber, and where the generated bubble induces the repositioning of the micro-object.

3. The method of embodiment 1 or 2, where the repositioning of the micro-object results in the micro-object being exported from the chamber into the flow region.

4. The method of embodiment 3, where the method further may include exporting the micro-object from the flow region and out of the microfluidic device.

5. The method of embodiment 4, where the micro-object may be a biological cell, where the biological cell may be exported out of the microfluidic device and into a culturing vessel, and where the biological cell has a probability of viability of at least 60% upon further culturing.

6. The method of embodiment 5, where the biological cell may be a plurality of biological cells and exporting may include exporting at least 5, 6, 7, 10, or 20 biological cells out of the microfluidic device and into the culturing vessel.

7. The method of embodiment 5 or 6, where the biological cell may be an adherent biological cell.

8. The method of embodiment 5, where the biological cell has a probability of viability of at least 80% upon further culturing.

9. The method of embodiment 8, where the biological cell may be a plurality of biological cells and exporting may include exporting at least 5, 9, 10, 15, or 20 biological cells out of the microfluidic device to the culturing vessel.

10. The method of embodiment 8 or 9, where the biological cell may be a non-adherent biological cell.

11. The method of any one of embodiments 1 to 10, where the change in the position of the illumination area occurs at a fixed rate, creating a path of laser illumination between the starting position and the final position.

12. The method of any one of embodiments 1 to 11, where the laser illumination may be continuous during the change in the position of the illumination area.

13. The method of any one of embodiments 1 to 12, where the chamber may include a sequestration pen including: an isolation region for containing a second fluidic medium, the isolation region having a single opening; and a connection region fluidically connecting the isolation region to the flow region, where the isolation region of the microfluidic sequestration pen may be an unswept region of the microfluidic device.

14. The method of embodiment 13, where the micro-object may be disposed within the isolation region of the sequestration pen.

15. The method of any one of embodiments 1 to 14, where directing the laser illumination further may include introducing an export medium into the flow region of the microfluidic device, and allowing components of the export medium to diffuse into the chamber.

16. The method of embodiment 15, where a temperature of the export medium may be about 5° C. to about 10° C. cooler than a temperature of the microfluidic device.

17. The method of embodiment 11, where the temperature of the export medium may be about 5° C. to about 10° C. cooler than a temperature of the first liquid medium.

18. The method of any one of embodiments 1 to 17, further including using dielectrophoretic (DEP) forces to reposition the micro-object.

19. The method of embodiment 18, where the micro-object may be repositioned to a position within the chamber closer to the opening to the flow region, the position not disposed at the starting position of the laser illumination.

20. The method of embodiment 17, where the micro-object may be repositioned to a position within the chamber closer to the opening to the flow region, the position not disposed along a path of laser illumination including the starting position and the ending position.

21. The method of any one of embodiments 17 to 20, where repositioning using DEP forces may be performed before directing the laser illumination upon the starting position on the inner surface of the chamber.

22. The method of any one of embodiments 1 to 21, where moving the laser illumination relative to the microfluidic device may include moving the microfluidic device relative to the laser.

23. The method of any one of embodiments 1 to 22, where directing the laser illumination upon the starting position of the inner surface of the chamber may include directing the laser illumination upon a base or a cover of the chamber.

24. The method of any one of embodiments 1 to 23, where directing the laser illumination upon the starting position of the inner surface of the chamber does not may include directing the laser illumination upon a wall of the chamber.

25. The method of embodiment 23 or 24, where the starting position on the inner surface of the chamber may be at least 5 microns or at least 10 microns away from an inner surface of a wall of the chamber.

26. The method of any one of embodiments 1 to 25, where the steps of directing the laser illumination and changing the position of the laser illumination are repeated at least once.

27. The method of embodiment 26, where for each repetition, directing laser illumination upon a starting position of the inner surface of the chamber may include directing the laser illumination upon a unique starting position.

28. The method of embodiment 26, where directing and moving the laser illumination may include illuminating multiple paths from the same starting position upon the inner surface of the chamber, each path stopping at a different final position upon the inner surface of the chamber.

29. The method of any one of embodiments 1 to 28, where changing the position of the illumination area may include illuminating a path along the inner surface of the chamber in a direction parallel to the inner surface of a wall of the chamber.

30. The method of any one of embodiments 1 to 29, where changing the position of the illumination area upon an inner surface of the chamber may include traversing about 20% to about 70% of a length of the inner surface of the chamber.

31. The method of any one of embodiments 1 to 30, where directing the laser illumination upon the starting position on the inner surface of the chamber may include illuminating with a laser having a power of less than about 1300 mW.

32. The method of any one of embodiments 1 to 31, where directing the laser illumination upon the starting position on the inner surface of the chamber may include illuminating with a laser having a power from about 300 mW to about 600 mW.

33. The method of any one of embodiments 1 to 32, where the illumination area may be greater than or equal to a circular area including a diameter of 5 um.

34. The method of any one of embodiments 1 to 33, where the illumination area may be a circular area including a diameter from 5 um to 50 um.

35. The method of any one of embodiments 1 to 34, where changing the position of the illumination area upon the inner surface of the chamber may include illuminating a path along the inner surface of the chamber, where a first section of the path may be illuminated with laser illumination having a first power from about 400 mW to about 600 mW or about 1000 mW to about 1300 mW, and where a second section of the path may be illuminated with laser illumination having a power about 1% to about 10% less than the power of the laser illumination used to illuminate the first section of the path.

36. The method of embodiment 35, where the second section of the path may be closer to the opening of the chamber to the flow region than the first section of the path.

37. The method of any one of embodiments 1 to 36, where the second position on the inner surface of the chamber may be closer to the opening of the chamber than the first position.

38. The method of any one of embodiments 1 to 37, where directing the laser illumination may be performed for about 40 msec to about 200 msec.

39. The method of any one of embodiments 1 to 38, where the laser illumination may be moved at 1 micron/sec to 350 microns/sec (e.g., when the micro-object may be an attachment-dependent cell).

40. The method of any one of embodiments 1 to 38, where the laser illumination may be moved at less than 70 microns/sec (e.g., when the micro-object may be a biological cell that may be a non-adherent cell).

41. The method of any one of embodiments 1 to 40, where the micro-object may be a bead, a biological cell, or a daughter cell derived from the cell.

42. The method of embodiment 41, where when the micro-object may be a bead, the bead may further include moieties covalently or non-covalently associated with the bead, where the moieties may include one or more of fluorescent moieties, nucleic acid moieties, protein or peptide moieties; antigens; small molecule signaling moieties, or chemical/biological species capable of use in an assay.

43. The method of embodiment 13 or 14, where the connection region of the sequestration pen may include a proximal opening into the flow region having a width $W_{con}$ ranging from about 20 microns to about 100 microns and a distal opening into the isolation region of the sequestration pen, and where a length $L_{con}$ of the connection region from the proximal opening to the distal opening may be as least 1.0 times the width $W_{con}$ of the proximal opening of the connection region.

44. The method of any one of embodiments 1 to 43, where the microfluidic device further may include a single inlet through which the first medium can be input into the flow region; and a single outlet through which the first medium can be removed from the flow region.

45. The method of any one of embodiments 1 to 44, where the microfluidic device may include a base, a microfluidic circuit structure disposed on the base, and a cover, where the base, the microfluidic circuit structure, and the cover collectively define the chamber.

46. The method of embodiment 45, where the microfluidic circuit structure may include the flow region.

47. The method of any one of embodiments 1 to 46, where the method further may include relocating the micro-object using dielectrophoretic forces.

48. The method of embodiment 46. where the dielectrophoretic forces are optically actuated.

49. The method of any one of embodiments 1 to 48, where the micro-object may be an attachment-dependent cell.

50. The method of any one of embodiments 1 to 49, where the inner surface of the chamber may include a surface coating.

51. The method of embodiment 50, where the surface coating promotes adhesion of the attachment dependent cell.

52. The method of embodiment 50 or 51, where the inner surface of the chamber may include a surface coating including a mixture of surface modifying ligands.

53. The method of embodiment 52, where at least one of the mixture of surface modifying ligands may include a peptide having an adhesive binding motif.

54. The method of embodiment 53, where the adhesive binding motif of the peptide may be an RGD motif.

55. The method of any one of embodiments 52 to 54, where at least one of the surface modifying ligands does not promote adhesion (e.g., a polymer, such as PEG or dextran).

56. The method of any one of embodiments 52 to 55, where the mixture of surface modifying ligands may include a mixture of adhesion promoting ligands and non-adherent ligands having a ratio from 0:100 to 10:90 m/m or about 0.1:99.9 m/m.

57. The method of any one of embodiments 1 to 56, further including contacting the micro-object in the chamber with a disengagement reagent prior to directing laser illumination upon the starting position on the inner surface of the chamber.

58. The method of embodiment 57, where the disengagement reagent may include a peptidase (e.g., trypsin).

59. The method of embodiment 58, where the peptidase may include a recombinant cell-dissociation enzyme.

60. The method of any one of embodiments 57 to 59, further including maintaining the disengagement reagent in contact with the micro-object for a predetermined period of time based at least in part on a shape or a size of the chamber.

61. The method of any one of embodiments 1 to 60, where the chamber may include a plurality of micro-objects disposed therein, and where the method further may include counting the number of micro-objects in the plurality.

62. The method of embodiment 61, where the counting may be automated.

63. The method of embodiment 61 or 62, where the counting may be performed before (or after) the repositioning of the plurality of micro-objects.

64. The method of any one of embodiments 1 to 63, where the chamber may include a plurality of micro-objects disposed therein, and the repositioning further may include exporting a subset of the plurality of micro-objects from the chamber into the flow region.

65. The method of any one of embodiments 1 to 64, where the microfluidic device may include a plurality of chambers, where each of the plurality of chambers may include at least one micro-object disposed therein, and where the micro-object(s) in at least a subset of the plurality of chambers are repositioned.

66. The method of embodiment 65, where the micro-object(s) in the subset of the plurality of chambers are exported from their respective chambers into the flow region.

67. The method of embodiment 66, where exporting from each chamber of the subset of the plurality of chambers may be performed sequentially.

68. The method of embodiment 67, where, when the micro-object(s) disposed in each of the plurality of chambers are attachment-dependent cells, the method further may include repeatedly contacting the attachment-dependent cells with a disengagement reagent during the sequential exports.

69. A method of culturing an attachment-dependent cell within a microfluidic environment, including: introducing an attachment-dependent cell into a chamber of a microfluidic device, where the microfluidic device may include a base, a microfluidic circuit structure disposed on the base, and a cover which collectively define a microfluidic circuit, where said microfluidic circuit may include: a flow region for containing a flow of a first fluidic medium, where an inner surface of the flow region (e.g., one or more surfaces, or all surfaces of the flow region) may include a first surface coating; and the chamber, where the chamber has a single opening to the flow region, and where an inner surface of the chamber (e.g., one or more surfaces, or all surfaces of the chamber) may include a second surface coating, where the second surface coating promotes adhesion of the attachment-dependent cell; culturing the attachment-dependent cell in the chamber for a first period of time; disengaging the attachment-dependent cell from the coated inner surface of the chamber; and exporting the attachment-dependent cell from the chamber.

70. The method of embodiment 69, where exporting the attachment-dependent cell from the chamber may include the method of any one of embodiments 1 to 67.

71. The method of embodiment 69 or 70, where the second surface coating promotes cell spreading of the attachment dependent cell.

72. The method of any one of embodiments 69 to 71, where the chamber may include a sequestration pen, and further where the sequestration pen may include: an isolation region for containing a second fluidic medium, the isolation region having a single opening; and a connection region fluidically connecting the isolation region to the flow region, where the isolation region of the microfluidic sequestration pen may be an unswept region of the microfluidic device.

73. The method of embodiment 72, where the connection region of the sequestration pen may include a proximal opening into the flow region having a width $W_{con}$ ranging from about 20 microns to about 100 microns and a distal opening into the isolation region of the sequestration pen, and where a length $L_{con}$ of the connection region from the proximal opening to the distal opening may be as least 1.0 times the width $W_{con}$ of the proximal opening of the connection region 74. The method of any one of embodiments 69 to 73, where the flow region may include a microfluidic channel and the chamber opens to the microfluidic channel.

75. The method of any one of embodiments 69 to 74, where the first surface coating may include covalently bound surface modifying ligands.

76. The method of any one of embodiments 69 to 75, where the first surface coating may include polyethylene oxide moieties, carboxylic acid moieties, or a combination of polyethylene oxide moieties and carboxylic acid moieties.

77. The method of any one of embodiments 69 to 76, further including contacting an inner surface of the chamber with a chamber surface coating reagent, thereby forming the second surface coating.

78. The method of embodiment 76, where introducing the attachment-dependent cell and contacting the inner surface of the chamber with a chamber surface coating reagent may be performed by introducing the attachment-dependent cell in a solution including the chamber coating reagent.

79. The method of any one of embodiments 69 to 78, where disengaging the attachment-dependent cell from the coated inner surface may include introducing a cell disengagement reagent into the flow region (or microfluidic channel) and letting it diffuse into the chamber, thereby disrupting the adhesion of the at least one attachment-dependent cell.

80. The method of embodiment 79, where the cell disengagement reagent may include a peptidase.

81. The method of embodiment 79 or 80, further including maintaining the cell disengagement reagent in contact with the attachment-dependent cell for a predetermined period of time based at least in part on a shape of the chamber or a size of the chamber.

82. The method of any one of embodiments 69 to 81, where exporting the attachment-dependent cell from the chamber may include directing laser illumination along a portion of a surface of the chamber.

83. The method of embodiment 82, where the surface of the chamber may be the inner surface of the chamber.

84. The method of embodiment 82 or 83, where directing laser illumination along the portion of the surface of the chamber may include moving the microfluidic device relative to the laser.

85. The method of any one of embodiments 82 to 84, where directing laser illumination may include illuminating with a laser having a power of less than about 1300 mW.

86. The method of any one of embodiments 69 to 85, where exporting the attachment dependent cell from the chamber further may include introducing an export medium into the flow region (or microfluidic channel) of the microfluidic device and allowing components of the export medium to diffuse into the chamber.

87. The method of embodiment 86, where a temperature of the export medium may be about 5° C. to about 10° C. cooler than a temperature of the microfluidic device.

88. The method of embodiment 86 or 87, where a temperature of the export medium may be about 5° C. to about 10° C. cooler than a temperature of the first liquid medium.

89. The method of any one of embodiments 69 to 88, where exporting the at least one attachment-dependent cell from the chamber may include exporting the at least one attachment-dependent cell into the flow region.

90. The method of embodiment 89, where exporting the at least one attachment-dependent cell from the chamber into the flow region further may include using dielectrophoretic forces.

91. The method of any one of embodiments 69 to 86, further including exporting the at least one attachment-dependent cell from the chamber into a staging area in the flow region.

92. The method of embodiment 91, where exporting the at least one attachment-dependent cell from the chamber into the staging area in the flow region further may include using dielectrophoretic forces.

93. The method of any one of embodiments 69 to 92, where the first period of time may include a period of time sufficient for the attachment-dependent cell to divide into one or more daughter cells.

94. The method of embodiment 93, where exporting the attachment-dependent cell may include exporting at least a subset of the one or more daughter cells.

95. The method of any one of embodiments 69 to 94, where the first period of time may include a period of time sufficient for the attachment-dependent cell to form a clonal population of daughter cells.

96. The method of embodiment 95, where exporting the attachment-dependent cell may include exporting at least a subset of the clonal population of daughter cells.

97. The method of any one of embodiments 94 to 96, further including culturing a remaining population of daughter cells for a second period of time after exporting has been performed.

98. The method of any one of embodiments 69 to 97, where the second surface coating may include a mixture of surface modifying ligands.

99. The method of embodiment 98, where at least one ligand of the mixture of surface modifying ligands may include a peptide having an adhesive binding motif.

100. The method of embodiment 99, where the adhesive binding motif of the peptide may be an RGD motif.

101. The method of any one of embodiments 98 to 100, where at least one ligand of the mixture of surface modifying ligands does not promote adhesion (e.g., a polymer, such as PEG or dextran).

102. The method of any one of embodiments 98 to 100, where at least 0.5% of ligands in the mixture of surface modifying ligands may include a peptide having an adhesive binding motif.

103. The method of any one of embodiments 69 to 102, where the microfluidic device further may include a single inlet through which the first medium can be input into the flow region; and a single outlet through which the first medium can be removed from the flow region.

104. The method of any one of embodiments 69 to 103, where introducing the attachment-dependent cell into the chamber may include using dielectrophoretic forces.

105. The method of any one of embodiments 69 to 104, where the microfluidic circuit structure and the cover is an integral structure of the microfluidic device.

106. A kit for culturing attachment-dependent cells, including a chamber surface functionalization reagent.

107. The kit of embodiment 106, where the chamber surface functionalization reagent comprises a first molecule comprising a first reactive moiety for reacting with a prepared surface of a chamber of a microfluidic device and a first surface functionalization moiety, wherein the first reactive moiety is covalently attached to the first surface functionalization moiety.

108. The kit of embodiment 107, where the first reactive moiety may include an alkynyl moiety.

109. The kit of embodiment 107 or 108, where the first surface functionalization moiety may be a biotin moiety or a streptavidin moiety.

110. The kit of any one of embodiments 106 to 109, further including a chamber surface coating reagent, where the chamber surface coating reagent may include a first molecule including a reactive moiety for reacting with a functionalized surface of a chamber (e.g., a surface functionalization moiety of the functionalized surface of the chamber) and a first surface modifying ligand, and where the reactive moiety of the first molecule of the chamber surface coating reagent is covalently attached to the first surface modifying ligand.

111. The kit of embodiment 110, where the reactive moiety of the first molecule of the chamber surface coating reagent may be a streptavidin moiety or a biotin moiety.

112. The kit of embodiment 110 or 111, where the first surface modifying ligand may promote micro-object adhesion.

113. The kit of embodiment 112, where the first surface modifying ligand may be a peptide including an adhesive motif.

114. The kit of embodiment 112 or 113, where the first surface modifying ligand may be a peptide including a RGD sequence, a LDV sequence, an IKVAV sequence (SEQ ID NO: 1), or a YIGSR sequence (SEQ ID NO: 2).

115. The kit of any one of embodiments 110 to 114, where the chamber surface coating reagent may include a mixture of the first molecule and a second molecule, where the second molecule may include a second reactive moiety for reacting with the functionalized surface of the chamber (e.g., a surface functionalization moiety of the functionalized surface of the chamber), and a second surface modifying ligand, where the second reactive moiety may be covalently attached to the second surface modifying ligand, and where the second surface modifying ligand may not promote micro-object adhesion.

116. The kit of embodiment 115, where the ratio of the first molecule of the chamber surface coating reagent to the second molecule of the chamber surface coating reagent may be from about 0.1:99.9 m/m to about 10:90 m/m.

117. The kit of embodiment 115 or 116, where the second surface modifying ligand may include polyethylene oxide moieties, carboxylic acid moieties or a combination of polyethylene oxide moieties and carboxylic acid moieties.

118. The kit of embodiment 115, where the second surface modifying ligand may include a PEG polymer.

119. The kit of any one of embodiments 113 to 116, where the first molecule of the chamber surface coating reagent and the second molecule of the chamber surface coating reagent may be provided in separate containers.

120. The kit of any one of embodiments 106 to 119, where the chamber surface functionalization reagent may include a first molecule including a reactive moiety for reacting with a prepared surface of a chamber of a microfluidic device and a first surface functionalization moiety, and where the reactive moiety of the first molecule of the chamber surface coating reagent is covalently attached to the first surface functionalization moiety.

121. The kit of embodiment 120, where the first reactive moiety of the first molecule of the chamber surface functionalization reagent may include an alkynyl moiety.

122. The kit of embodiment 120 or 121, where the first surface functionalization moiety of the first molecule of the chamber surface functionalization reagent may promote micro-object adhesion.

123. The kit of embodiment 122, where the first surface functionalization moiety of the first molecule of the chamber surface functionalization reagent may be a peptide including an adhesive motif.

124. The kit of embodiment 123, where the first surface modifying ligand of the first molecule of the chamber surface functionalization reagent may be a peptide including a RGD sequence, a LDV sequence, an IKVAV sequence (SEQ ID NO: 1), or a YIGSR sequence (SEQ ID NO: 2).

125. The kit of any one of embodiments 120 to 124, where the chamber surface functionalization reagent may include a mixture of the first molecule and a second molecule, where the second molecule may include a reactive moiety for reacting with the prepared surface of the chamber of the microfluidic device and a second surface modifying ligand, where the reactive moiety of the second molecule is covalently attached to the second surface modifying ligand, and where the second surface modifying ligand may not promote micro-object adhesion.

126. The kit of embodiment 125, where the ratio of the first molecule of the chamber surface functionalization reagent to the second molecule of the chamber surface functionalization reagent may be from about 0.1:99.9 to about 10:90 on a m/m basis.

127. The kit of embodiment 125 or 126, where the second surface modifying ligand may include polyethylene oxide moieties, carboxylic acid moieties or a combination of polyethylene oxide moieties and carboxylic acid moieties.

128. The kit of embodiment 127, where the second surface modifying ligand may include a PEG polymer.

129. The kit of any one of embodiments 125 to 128, where the first molecule of the chamber surface functionalization reagent and the second molecule of the chamber surface functionalization reagent may be provided in separate containers.

130. The kit of any one of embodiments 106 to 129, further including the microfluidic device including the chamber having the prepared surface.

131. The kit of any one of embodiments 106 to 130, further including a disengagement reagent, and optionally, where the disengagement reagent may be a peptidase.

132. The kit of embodiment 131, where the peptidase may be a trypsin or a trypsin-like peptidase.

133. The kit of any one of embodiments 106 to 132, further including an export medium.

134. The kit of embodiment 133, where the export medium may be a serum-free medium.

135. A method of repositioning a micro-object disposed in a chamber of a microfluidic device, the chamber having an opening to a flow region of the microfluidic device, the method including: directing a pulse of laser illumination upon a first position on an inner surface of the chamber; directing laser illumination upon a second position on the inner surface of the chamber to generate an illumination area, the second position being different than the first position; and moving the laser illumination relative to the microfluidic device, thereby changing the position of the illumination area to a third position on the inner surface of the chamber, where the change in the position of the illumination area induces (or contributes to) the repositioning of the micro-object.

136. The method of embodiment 135, where the moving of the laser illumination may controllably generate a bubble having a trajectory within the chamber, where the bubble and its trajectory induces (or contributes to) the repositioning of the micro-object.

137. The method of embodiment 135 or 136, where the repositioning of the micro-object may move the micro-object towards the opening of the chamber.

138. The method of embodiment 135 or 136, where the repositioning of the micro-object may result in the micro-object being exported from the chamber into the flow region.

139. The method of any one of embodiments 135 to 138, further including applying a dynamic dielectrophoretic force to the micro-object, where the dynamic dielectrophoretic force may be moved at least in part toward the opening of the chamber.

140. The method of embodiment 139, where the dynamic dielectrophoretic force may be applied to the micro-object prior to directing the pulse of laser illumination upon the first position.

141. The method of embodiment 139 or 140, where the dynamic dielectrophoretic force may be applied to the micro-object after directing the pulse of laser illumination upon the first position and before directing the laser illumination upon the second position and moving the laser illumination.

142. The method of any one of embodiments 139 to 141, where the dynamic dielectrophoretic force may contribute to the repositioning of the micro-object.

143. The method of any one of embodiments 135 to 142, where the third position may be proximal to the opening of the chamber.

144. The method of any one of embodiments 135 to 143, where the chamber may include a single opening to the flow region.

145. The method of embodiment 144, where the flow region may be configured to contain a first fluidic medium and the chamber includes a sequestration pen including: an isolation region for containing a second fluidic medium, the isolation region having a single opening; and a connection region fluidically connecting the isolation region to the flow region, where the isolation region of the microfluidic sequestration pen is an unswept region of the micro-fluidic device.

146. The method of embodiment 145 where, prior to being repositioned, the micro-object may be disposed within the isolation region of the sequestration pen.

147. The method of embodiment 145 or 146, where the first position on the inner surface of the chamber may be in or proximal to the connection region.

148. The method of any one of embodiments 145 to 147, where the second position may be in the isolation region of the sequestration pen.

149. The method of any one of embodiments 145 to 148, where the third position may be in or proximal to the connection region of the sequestration pen.

150. The method of any one of embodiments 145 to 149, where the sequestration pen may further include a hook region.

151. The method of embodiment 150, where the first position on the inner surface of the chamber may be in or proximal to the hook region of the sequestration pen.

152. The method of embodiment 150 or 151, where the third position of laser illumination may be proximal to the hook region.

153. The method of any one of embodiments 145 to 152, where the third position of laser illumination may be closer to the connection region than the second position of laser illumination.

154. The method of any one of embodiments 135 to 153, where the change in the position of the laser illumination may occur at a fixed rate, creating a path of laser illumination between the starting position and the ending position.

155. The method of embodiment 153 or 154, where the change in the position of the illumination area may occur with constant illumination.

156. The method of any one of embodiments 135 to 155, where: the micro-object may be a biological cell; the repositioning of the micro-object may result in the micro-object being exported from the chamber into the flow region; and the method may further include: exporting the biological cell from the flow region and out of the microfluidic device to a culturing vessel, where the biological cell has a probability of viability of at least 80% upon further culturing.

157. The method of embodiment 156, where the biological cell is a plurality of biological cells and exporting may include exporting at least 9, 10, 15, or 20 biological cells out of the microfluidic device to the culturing vessel.

158. The method of any one of embodiments 135 to 157, where the biological cell may be a non-adherent biological cell.

159. The method of any one of embodiments 135 to 158, where changing the position of the laser illumination may be performed at less than 70 microns/sec when the micro-object is a biological cell that is a non-adherent cell.

160. The method of any one of embodiments 135 to 159, where changing the position of the laser illumination may be performed at 50 microns/sec when the micro-object is a biological cell that is a non-adherent cell.

161. The method of any one of embodiments 135 to 160, where the illumination area is greater than or equal to a circular area including a diameter of 5 um.

162. The method of any one of embodiments 135 to 161, where the illumination area may be equivalent to a circular area including a diameter from 5 um to 50 um.

```
Informal SEQ ID Listing:

<210> 1

<211> 5

<212> PRT

<213> ACT_SITE

<400> 1

Ile Lys Val Ala Val
        1                 5

<210> 2

<211> 5

<212> PRT

<213> ACT_SITE

<400> 2

Tyr Ile Gly Ser Arg
        1                 5
```

```
                        SEQUENCE LISTING

<160> NUMBER OF SEQ ID NOS: 2

<210> SEQ ID NO 1
<211> LENGTH: 5
<212> TYPE: PRT
<213> ORGANISM: Artificial Sequence
<220> FEATURE:
<223> OTHER INFORMATION: Surface Modifying Ligand

<400> SEQUENCE: 1

Ile Lys Val Ala Val
1                 5

<210> SEQ ID NO 2
<211> LENGTH: 5
<212> TYPE: PRT
<213> ORGANISM: Artificial Sequence
<220> FEATURE:
<223> OTHER INFORMATION: Surface Modifying Ligand

<400> SEQUENCE: 2

Tyr Ile Gly Ser Arg
1                 5
``` change in the position of the illumination area induces the repositioning of the micro-object at least towards the opening of the chamber;

wherein moving the laser illumination relative to the microfluidic device controllably generates a bubble having a trajectory within the chamber, and wherein the generated bubble induces the repositioning of the micro-object.

2. The method of claim 1, wherein the repositioning of the micro-object results in the micro-object being exported from the chamber into the flow region.

3. The method of claim 2, wherein the method further comprises exporting the micro-object from the flow region and out of the microfluidic device.

4. The method of claim 3, wherein the micro-object is a biological cell, wherein the biological cell is exported out of the microfluidic device and into a culturing vessel, and wherein the biological cell has a probability of viability of at least 60% upon further culturing.

5. The method of claim 4, wherein the biological cell has a probability of viability of at least 80% upon further culturing.

6. The method of claim 1, wherein the change in the position of the illumination area occurs at a fixed rate,

What is claimed is:

1. A method of repositioning a micro-object disposed in a chamber of a microfluidic device, comprising:

directing laser illumination upon a starting position on an inner surface of the chamber to generate an illumination area, wherein:

the microfluidic device comprises the chamber and a flow region containing a first liquid medium, wherein the chamber comprises an opening to the flow region, and the starting position is disposed within a sub-region of the chamber distal to the opening to the flow region; and moving the laser illumination relative to the microfluidic device, thereby changing the position of the illumination area such that, upon completion of the change, the laser illumination is at a final position, wherein the creating a path of laser illumination between the starting position and the final position.

7. The method of claim 1, wherein the chamber comprises a sequestration pen comprising:

an isolation region for containing a second fluidic medium, the isolation region having a single opening; and a connection region fluidically connecting the isolation region to the flow region, wherein the isolation region of the microfluidic sequestration pen is an unswept region of the micro-fluidic device.

8. The method of claim 7, wherein the micro-object is disposed within the isolation region of the sequestration pen.

9. The method of claim 1, wherein directing the laser illumination further comprises introducing an export medium into the flow region of the microfluidic device, and allowing components of the export medium to diffuse into the chamber.

10. The method of claim 9, wherein a temperature of the export medium is about 5° C. to about 10° C. cooler than a temperature of the microfluidic device or a temperature of the first liquid medium.

11. The method of claim 1, further comprising using dielectrophoretic (DEP) forces to reposition the micro-object.

12. The method of claim 1, wherein changing the position of the illumination area upon an inner surface of the chamber comprises traversing about 20% to about 70% of a length of the inner surface of the chamber.

13. The method of claim 1, wherein directing the laser illumination upon the starting position on the inner surface of the chamber comprises illuminating with a laser having a power of less than about 1300 mW.

14. The method of claim 1, wherein directing the laser illumination upon the starting position on the inner surface of the chamber comprises illuminating with a laser having a power from about 300 mW to about 600 mW.

15. The method of claim 1, wherein the laser illumination is performed for about 40 msec to about 200 msec.

16. The method of claim 1, wherein the micro-object is a bead, a biological cell, or a daughter cell derived therefrom.

17. The method of claim 16, wherein when the micro-object is a bead, the bead further comprises nucleic acid moieties covalently or non-covalently associated with the bead.

18. The method of claim 1, wherein the micro-object is an attachment-dependent cell.

19. The method of claim 18, wherein the inner surface of the chamber comprises a surface coating promoting adhesion of the attachment dependent cell.

20. The method of claim 1, wherein the inner surface of the chamber comprises a surface coating comprising a mixture of surface modifying ligands; and further wherein at least one of the surface modifying ligands comprises a peptide having an adhesive binding motif.

21. The method of claim 20, wherein at least one of the surface modifying ligands does not promote adhesion.

22. The method of claim 1, further comprising contacting the micro-object in the chamber with a disengagement reagent prior to directing laser illumination upon the starting position on the inner surface of the chamber.

23. The method of claim 1, wherein the chamber includes a plurality of micro-objects disposed therein, and wherein the method further comprises counting the number of micro-objects in the plurality.

24. The method of claim 1, wherein the microfluidic device comprises a plurality of chambers and each of the plurality of chambers comprises at least one micro-object disposed therein, further comprising exporting the micro-object(s) in the subset of the plurality of chambers from their respective chambers into the flow region.

25. The method of claim 1, wherein directing the laser illumination upon the starting position on the inner surface of the chamber comprises illuminating with a laser having a wavelength of about 720 nm to 1060 nm.

* * * * *